(12) United States Patent
Wang et al.

(10) Patent No.: US 11,487,088 B2
(45) Date of Patent: Nov. 1, 2022

(54) IMAGING LENS ASSEMBLY INCLUDING SEVEN LENSES OF ++–+–+– OR ++–––+– REFRACTIVE POWERS, IMAGE CAPTURING UNIT AND ELECTRONIC DEVICE

(71) Applicant: LARGAN PRECISION CO., LTD., Taichung (TW)

(72) Inventors: Kuo-Jui Wang, Taichung (TW); Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 290 days.

(21) Appl. No.: 16/928,950

(22) Filed: Jul. 14, 2020

(65) Prior Publication Data
US 2021/0389565 A1  Dec. 16, 2021

(30) Foreign Application Priority Data
Jun. 10, 2020 (TW) .................. 109119437

(51) Int. Cl.
G02B 13/00 (2006.01)
G02B 9/64 (2006.01)
G02B 13/02 (2006.01)
G02B 13/06 (2006.01)

(52) U.S. Cl.
CPC ........... *G02B 13/0045* (2013.01); *G02B 9/64* (2013.01); *G02B 13/02* (2013.01); *G02B 13/06* (2013.01)

(58) Field of Classification Search
CPC .............................. G02B 13/0045; G02B 9/64
See application file for complete search history.

(56) References Cited

U.S. PATENT DOCUMENTS

| 5,087,989 A | 2/1992 | Igarashi |
| 5,543,970 A | 8/1996 | Hata et al. |
| 10,222,590 B1 | 3/2019 | Sato et al. |

(Continued)

FOREIGN PATENT DOCUMENTS

| CN | 109298515 A | 2/2019 |
| CN | 110673300 A | 1/2020 |

(Continued)

OTHER PUBLICATIONS

TW Office Action in Application No. 109119437 dated Sep. 28, 2020.

(Continued)

*Primary Examiner* — Wen Huang
(74) *Attorney, Agent, or Firm* — Maschoff Brennan

(57) ABSTRACT

An imaging lens assembly includes seven lens elements which are, in order from an object side to an image side along an optical path: a first lens element, a second lens element, a third lens element, a fourth lens element, a fifth lens element, a sixth lens element and a seventh lens element. Each of the seven lens elements has an object-side surface facing toward the object side and an image-side surface facing toward the image side. The second lens element has positive refractive power. The sixth lens element has positive refractive power, and the image-side surface of the sixth lens element is convex in a paraxial region thereof. The seventh lens element has negative refractive power. At least one of the object-side surface and the image-side surface of at least one lens element of the imaging lens assembly is aspheric and has at least one inflection point.

30 Claims, 30 Drawing Sheets

(56) References Cited

U.S. PATENT DOCUMENTS

| | | |
|---|---|---|
| 2014/0043694 A1 | 2/2014 | Tsai et al. |
| 2017/0160519 A1 | 6/2017 | Katsuragi |
| 2018/0106979 A1 | 4/2018 | Chang et al. |
| 2018/0188484 A1 | 7/2018 | Gong et al. |
| 2019/0004285 A1 | 1/2019 | Tang et al. |
| 2019/0049700 A1 | 2/2019 | Kunimatsu et al. |
| 2019/0079270 A1 | 3/2019 | Tseng et al. |
| 2019/0121102 A1 | 4/2019 | Zhang et al. |
| 2019/0146189 A1 | 5/2019 | Lyu |
| 2019/0258028 A1 | 8/2019 | Huang |
| 2019/0302424 A1 | 10/2019 | Kuo et al. |
| 2019/0346663 A1 | 11/2019 | Tang et al. |
| 2020/0116980 A1 | 4/2020 | Chen et al. |
| 2020/0150392 A1 | 5/2020 | Fukaya |
| 2021/0165187 A1 | 6/2021 | Nagahara |
| 2021/0356713 A1 | 11/2021 | Jia et al. |

FOREIGN PATENT DOCUMENTS

| | | |
|---|---|---|
| CN | 110850556 A | 2/2020 |
| CN | 110989146 A | 4/2020 |
| CN | 111007632 A | 4/2020 |
| CN | 111025548 A | 4/2020 |
| CN | 111061034 A | 4/2020 |
| CN | 111580251 A | 8/2020 |
| CN | 211318863 U | 8/2020 |
| CN | 113740997 A | 12/2021 |
| JP | 2012133298 A | 7/2012 |
| JP | 2013130820 A | 7/2013 |
| TW | I677731 B | 11/2019 |
| TW | 201947274 A | 12/2019 |
| TW | I715502 B | 1/2021 |
| WO | 2018218889 A | 12/2018 |
| WO | 2019196572 A | 10/2019 |
| WO | 2020007069 A | 1/2020 |
| WO | 2020024635 A | 2/2020 |
| WO | 2020078451 A | 4/2020 |
| WO | 2021117497 A1 | 6/2021 |

OTHER PUBLICATIONS

IN Examination Report in Application 202034033077 dated Jan. 4, 2022.

TW Office Action in Application No. 109119437 dated Jul. 3, 2020.

IMAGING LENS ASSEMBLY INCLUDING SEVEN LENSES OF ++−+−+− OR ++−−−+− REFRACTIVE POWERS, IMAGE CAPTURING UNIT AND ELECTRONIC DEVICE

RELATED APPLICATIONS

This application claims priority to Taiwan Application 109119437, filed on Jun. 10, 2020, which is incorporated by reference herein in its entirety.

BACKGROUND

Technical Field

The present disclosure relates to an imaging lens assembly, an image capturing unit and an electronic device, more particularly to an imaging lens assembly and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an imaging lens assembly includes seven lens elements. The seven lens elements are, in order from an object side to an image side along an optical path, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

The second lens element has positive refractive power, and the image-side surface of the second lens element is convex in a paraxial region thereof. The sixth lens element has positive refractive power, the object-side surface of the sixth lens element is convex in a paraxial region thereof, and the image-side surface of the sixth lens element is convex in a paraxial region thereof. The seventh lens element has negative refractive power, and the image-side surface of the seventh lens element is concave in a paraxial region thereof. At least one of the object-side surface and the image-side surface of at least one lens element of the imaging lens assembly is aspheric and has at least one inflection point.

When an Abbe number of the third lens element is V3, an Abbe number of the fourth lens element is V4, an Abbe number of the fifth lens element is V5, a central thickness of the first lens element is CT1, and a central thickness of the fifth lens element is CT5, the following conditions are satisfied:

$$30.0 < V3 + V4 + V5 < 90.0;\text{ and}$$

$$0.10 < CT1/CT5 < 1.5.$$

According to another aspect of the present disclosure, an imaging lens assembly includes seven lens elements. The seven lens elements are, in order from an object side to an image side along an optical path, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

The second lens element has positive refractive power. The image-side surface of the third lens element is concave in a paraxial region thereof. The sixth lens element has positive refractive power, and the image-side surface of the sixth lens element is convex in a paraxial region thereof. The seventh lens element has negative refractive power. At least one of the object-side surface and the image-side surface of at least one lens element of the imaging lens assembly is aspheric and has at least one inflection point.

When an Abbe number of the third lens element is V3, an Abbe number of the fourth lens element is V4, an Abbe number of the fifth lens element is V5, a central thickness of the first lens element is CT1, a central thickness of the second lens element is CT2, and an axial distance between the first lens element and the second lens element is T12, the following conditions are satisfied:

$$30.0 < V3 + V4 + V5 < 90.0;\text{ and}$$

$$0.20 < (CT1 + CT2)/T12 < 6.5.$$

According to another aspect of the present disclosure, an imaging lens assembly includes seven lens elements. The seven lens elements are, in order from an object side to an image side along an optical path, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

The second lens element has positive refractive power, and the image-side surface of the second lens element is convex in a paraxial region thereof. The sixth lens element has positive refractive power, and the image-side surface of the sixth lens element is convex in a paraxial region thereof. The seventh lens element has negative refractive power. At least one of the object-side surface and the image-side surface of at least one lens element of the imaging lens assembly is aspheric and has at least one inflection point.

When an Abbe number of the third lens element is V3, an Abbe number of the fourth lens element is V4, an Abbe number of the fifth lens element is V5, a focal length of the imaging lens assembly is f, and a central thickness of the sixth lens element is CT6, the following conditions are satisfied:

$$30.0 < V3 + V4 + V5 < 90.0;\text{ and}$$

$$0.50 < f/CT6 < 6.3.$$

According to another aspect of the present disclosure, an image capturing unit includes one of the aforementioned imaging lens assemblies and an image sensor, wherein the image sensor is disposed on an image surface of the imaging lens assembly.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
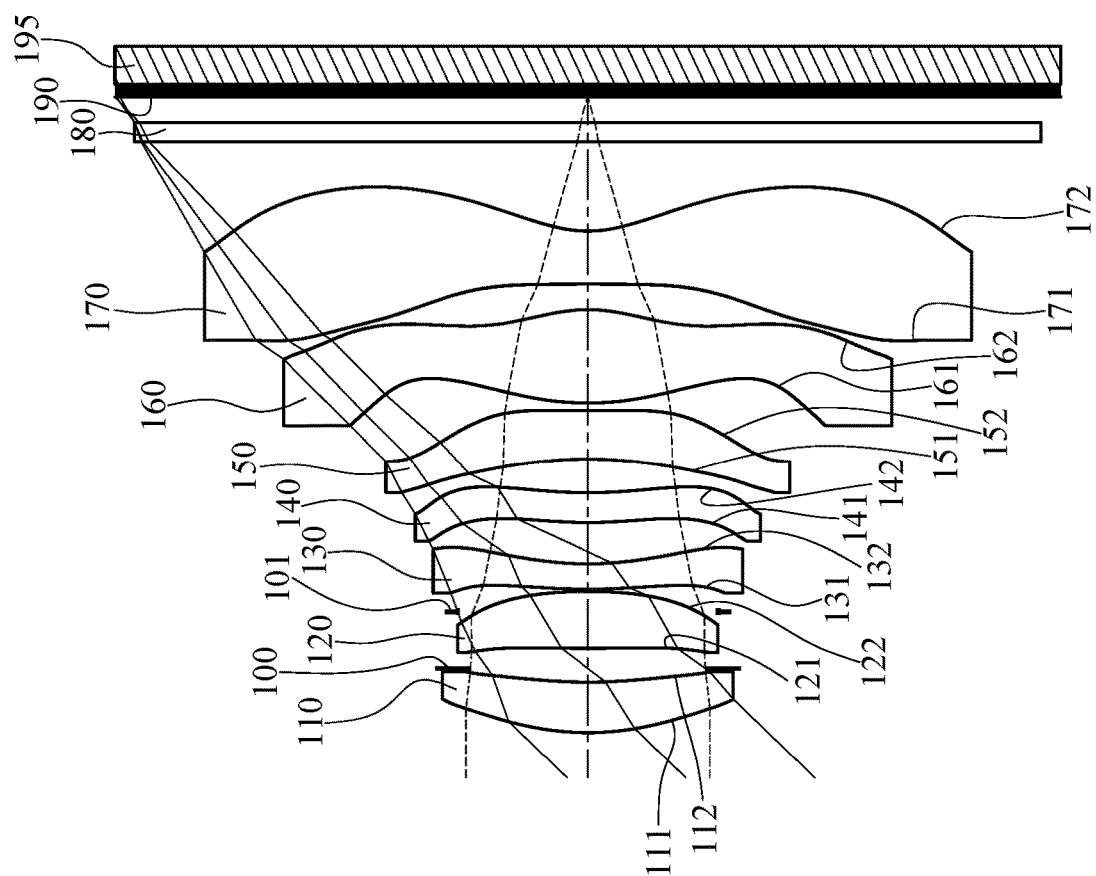
FIG. 1 is a schematic view of an image capturing unit according to the 1st embodiment of the present disclosure.

An imaging lens assembly includes seven lens elements. The seven lens elements are, in order from an object side to an image side along an optical path, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

The first lens element can have positive refractive power. Therefore, it is favorable for reducing the size of the object side of the imaging lens assembly. The object-side surface of the first lens element can be convex in a paraxial region thereof. Therefore, it is favorable for light in various fields of view to evenly enter the imaging lens assembly.

The second lens element has positive refractive power. Therefore, it is favorable for increasing the field of view and reducing the size. The image-side surface of the second lens element can be convex in a paraxial region thereof. Therefore, it is favorable for adjusting the light path, thereby increasing image quality on the periphery of the image surface.

The third lens element can have negative refractive power. Therefore, it is favorable for correcting aberrations such as spherical aberration generated due to size reduction. The image-side surface of the third lens element can be concave in a paraxial region thereof. Therefore, it is favorable for correcting aberrations such as astigmatism.

The object-side surface of the fourth lens element can be convex in a paraxial region thereof. Therefore, it is favorable for adjusting the surface shape of the fourth lens element, thereby properly arranging the size distribution between the object side and the image side of the imaging lens assembly. The image-side surface of the fourth lens element can be concave in a paraxial region thereof. Therefore, it is favorable for adjusting the surface shape of the fourth lens element, thereby obtaining a balance among the field of view, the overall size and the size of the image surface.

The fifth lens element can have negative refractive power. Therefore, it is favorable for balancing refractive power at the image side of the imaging lens assembly so as to reduce aberrations. The object-side surface of the fifth lens element can be concave in a paraxial region thereof. Therefore, it is favorable for adjusting the travelling direction of the light, thereby obtaining a balance among the field of view, the overall size and image quality.

The sixth lens element has positive refractive power. Therefore, it is favorable for properly distributing positive refractive power, thereby reducing the size and sensitivity. The object-side surface of the sixth lens element can be convex in a paraxial region thereof. Therefore, it is favorable for adjusting the surface shape and refractive power of the sixth lens element so as to correct aberrations. The image-side surface of the sixth lens element is convex in a paraxial region thereof. Therefore, it is favorable for adjusting the surface shape and refractive power of the sixth lens element, thereby increasing the field of view and the size of the image surface.

The seventh lens element has negative refractive power. Therefore, it is favorable for correcting aberrations such as spherical aberration and adjusting the back focal length to be in a proper range. The image-side surface of the seventh lens element can be concave in a paraxial region thereof. Therefore, it is favorable for adjusting the back focal length and correcting off-axis aberrations.

Figure 27:
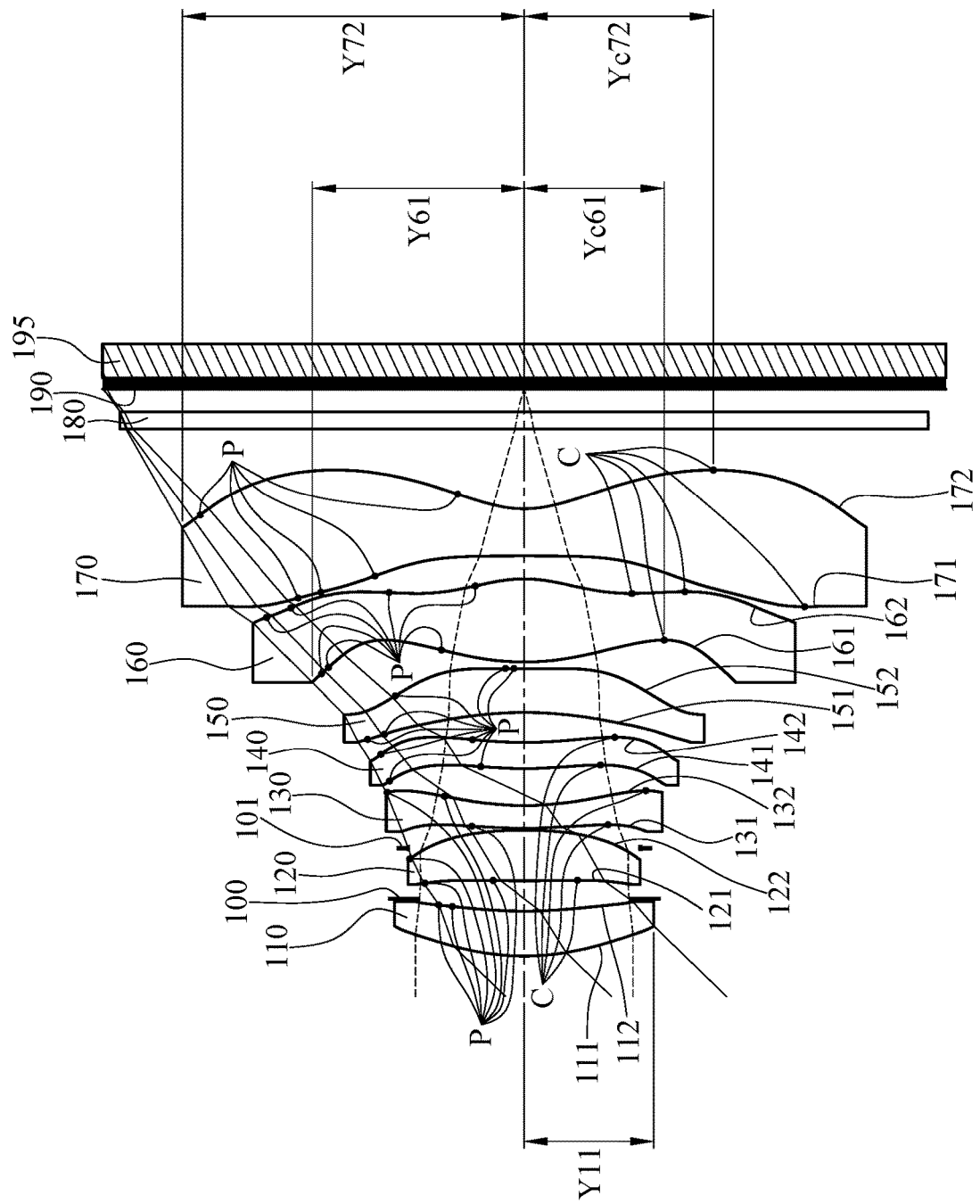
FIG. 27 shows a schematic view of Y11, Y61, Y72, Yc61, Yc72, inflection points and critical points of the lens elements according to the 1st embodiment of the present disclosure.

At least one of the object-side surface and the image-side surface of at least one lens element of the imaging lens assembly is aspheric and has at least one inflection point. Therefore, it is favorable for increasing the variation of lens surface, thereby reducing the lens size and improving image quality. Moreover, at least one of the object-side surface and the image-side surface of each of at least two lens elements of the imaging lens assembly can also be aspheric and have at least one inflection point. Moreover, at least one of the object-side surface and the image-side surface of each of at least three lens elements of the imaging lens assembly can also be aspheric and have at least one inflection point. Please refer to FIG. 27, which shows a schematic view of inflection points P of the lens elements according to the 1st embodiment of the present disclosure.

At least one of the object-side surface and the image-side surface of at least one lens element of the imaging lens assembly can have at least one critical point in an off-axis region thereof. Therefore, it is favorable for further increasing the variation of lens surface, thereby reducing the size of the imaging lens assembly, correcting off-axis aberrations and increasing the field of view and the size of the image surface. Moreover, at least one of the object-side surface and the image-side surface of each of at least two lens elements of the imaging lens assembly can also have at least one critical point in an off-axis region thereof. Please refer to FIG. 27, which shows a schematic view of critical points C of the lens elements according to the 1st embodiment of the present disclosure.

The object-side surface of the sixth lens element can have at least one critical point in an off-axis region thereof. Therefore, it is favorable for adjusting the surface shape of the sixth lens element so as to correct off-axis aberrations such as field curvature. When a vertical distance between the at least one critical point on the object-side surface of the sixth lens element and an optical axis is Yc61, and a maximum effective radius of the object-side surface of the sixth lens element is Y61, the following condition can be satisfied: 0.50<Yc61/Y61<0.80. Therefore, it is favorable for further adjusting the surface shape of the sixth lens element so as to further correct off-axis aberrations. Please refer to FIG. 27, which shows a schematic view of Yc61, Y61 and critical points C on the sixth lens element 160 according to the 1st embodiment of the present disclosure.

The image-side surface of the seventh lens element can have at least one critical point in an off-axis region thereof. Therefore, it is favorable for adjusting the light incident angle on the image surface so as to increase the response efficiency of the image sensor and the illuminance on the periphery of the image surface. When a vertical distance between the at least one critical point on the image-side surface of the seventh lens element and the optical axis is Yc72, and a maximum effective radius of the image-side surface of the seventh lens element is Y72, the following condition can be satisfied: 0.40<Yc72/Y72<0.75. Therefore, it is favorable for further adjusting the surface shape of the seventh lens element so as to increase the illuminance on the periphery of the image surface and improve image quality. Please refer to FIG. 27, which shows a schematic view of Yc72, Y72 and critical points C on the seventh lens element 170 according to the 1st embodiment of the present disclosure.

When an Abbe number of the third lens element is V3, an Abbe number of the fourth lens element is V4, and an Abbe number of the fifth lens element is V5, the following condition is satisfied: 30.0<V3+V4+V5<90.0. Therefore, it is favorable for the materials of the third through the fifth lens elements to collaborate with one another so as to correct aberrations such as chromatic aberration. Moreover, the following condition can also be satisfied: 45.0<V3+V4+V5<87.0. Moreover, the following condition can also be satisfied: 60.0<V3+V4+V5<84.0.

When a central thickness of the first lens element is CT1, and a central thickness of the fifth lens element is CT5, the following condition can be satisfied: 0.10<CT1/CT5<1.5. Therefore, it is favorable for adjusting the lens distribution so as to reduce the overall size, and it is also favorable for forming a wide field of view configuration. Moreover, the following condition can also be satisfied: 0.60<CT1/CT5<1.3. Moreover, the following condition can also be satisfied: 0.70<CT1/CT5<1.1.

When the central thickness of the first lens element is CT1, a central thickness of the second lens element is CT2, and an axial distance between the first lens element and the second lens element is T12, the following condition can be satisfied: 0.20<(CT1+CT2)/T12<6.5. Therefore, it is favorable for the first and the second lens elements to collaborate with each other so as to form a wide field of view configuration. Moreover, the following condition can also be satisfied: 1.5<(CT1+CT2)/T12<6.0. Moreover, the following condition can also be satisfied: 2.0<(CT1+CT2)/T12<5.5. Moreover, the following condition can also be satisfied: 2.6<(CT1+CT2)/T12<4.9.

When a focal length of the imaging lens assembly is f, and a central thickness of the sixth lens element is CT6, the following condition can be satisfied: 0.50<f/CT6<6.3. Therefore, it is favorable for adjusting the thickness and refractive power of the sixth lens element so as to adjust the field of view and reduce the size. Moreover, the following condition can also be satisfied: 3.1<f/CT6<5.8. Moreover, the following condition can also be satisfied: 3.9<f/CT6<5.3.

When the Abbe number of the third lens element is V3, the Abbe number of the fourth lens element is V4, the Abbe number of the fifth lens element is V5, an Abbe number of the sixth lens element is V6, and an Abbe number of the seventh lens element is V7, the following condition can be satisfied: 0.45<(V3+V4+V5)/(V6+V7)<0.80. Therefore, it is favorable for the materials of the third through the seventh lens elements to collaborate with one another so as to further correct aberrations such as chromatic aberration.

When the central thickness of the first lens element is CT1, and the axial distance between the first lens element and the second lens element is T12, the following condition can be satisfied: 0.10<CT1/T12<3.0. Therefore, it is favorable for the first and the second lens elements to collaborate with each other so as to increase the field of view. Moreover, the following condition can also be satisfied: $0.55<CT1/T12<2.3$. Moreover, the following condition can also be satisfied: $0.90<CT1/T12<2.0$.

When the axial distance between the first lens element and the second lens element is T12, and an axial distance between the sixth lens element and the seventh lens element is T67, the following condition can be satisfied: $0.60<T12/T67<2.2$. Therefore, it is favorable for adjusting distances between the lens elements, thereby reducing the total track length and correcting aberrations.

When a maximum effective radius of the object-side surface of the first lens element is Y11, and a maximum effective radius of the image-side surface of the seventh lens element is Y72, the following condition can be satisfied: $0.20<Y11/Y72<0.50$. Therefore, it is favorable for adjusting the proportion of outer diameters of the lens elements, thereby reducing the size at the object side of the imaging lens assembly and increasing the size of the image surface. Please refer to FIG. 27, which shows a schematic view of Y11 and Y72 according to the 1st embodiment of the present disclosure.

When a curvature radius of the object-side surface of the second lens element is R3, and a curvature radius of the image-side surface of the second lens element is R4, the following condition can be satisfied: $|R4/R3|<1.50$. Therefore, it is favorable for adjusting the surface shape of the second lens element, thereby reducing the size and increasing the field of view. Moreover, the following condition can also be satisfied: $|R4/R3|<0.80$. Moreover, the following condition can also be satisfied: $|R4/R3|<0.60$.

When a focal length of the imaging lens assembly is f, a curvature radius of the object-side surface of the sixth lens element is R11, and a curvature radius of the image-side surface of the sixth lens element is R12, the following condition can be satisfied: $2.0<f/|R11|+f/|R12|<8.0$. Therefore, it is favorable for adjusting the surface shape and refractive power of the sixth lens element so as to reduce the total track length. Moreover, the following condition can also be satisfied: $3.0<f/|R11|+f/|R12|<6.0$. Moreover, the following condition can also be satisfied: $3.5<f/|R11|+f/|R12|<5.0$.

When a focal length of the sixth lens element is f6, and the central thickness of the sixth lens element is CT6, the following condition can be satisfied: $1.0<f6/CT6<2.5$. Therefore, it is favorable for adjusting the thickness and refractive power of the sixth lens element so as to reduce the total track length.

When half of a maximum field of view of the imaging lens assembly is HFOV, the following condition can be satisfied: $42.5 [deg.]<HFOV<60.0 [deg.]$. Therefore, it is favorable for the imaging lens assembly to have the characteristics of wide field of view, and it is also favorable for preventing aberrations such as distortion generated due to an overly large field of view. Moreover, the following condition can also be satisfied: $44.0 [deg.]<HFOV<52.5 [deg.]$.

When the focal length of the imaging lens assembly is f, and a curvature radius of the object-side surface of the first lens element is R1, the following condition can be satisfied: $1.20<f/R1<1.85$. Therefore, it is favorable for adjusting the surface shape and refractive power of the first lens element, thereby reducing the size at the object side of the imaging lens assembly and increasing the field of view.

When the Abbe number of the third lens element is V3, the Abbe number of the fourth lens element is V4, the Abbe number of the fifth lens element is V5, and the Abbe number of the sixth lens element is V6, the following condition can be satisfied: $0.80<(V3+V4+V5)/V6<1.6$. Therefore, it is favorable for the materials of the third to the sixth lens elements to collaborate with one another so as to further correct aberrations such chromatic aberration.

When a focal length of the second lens element is f2, and the focal length of the sixth lens element is f6, the following condition can be satisfied: $1.7<f2/f6<6.0$. Therefore, it is favorable for adjusting refractive power distribution of the lens elements, thereby reducing the size and sensitivity. Moreover, the following condition can also be satisfied: $2.2<f2/f6<4.8$.

When an axial distance between the object-side surface of the first lens element and the image-side surface of the seventh lens element is TD, and an entrance pupil diameter of the imaging lens assembly is EPD, the following condition can be satisfied: $1.0<TD/EPD<4.0$. Therefore, it is favorable for obtaining a balance between the size of the aperture stop and the size of the lens elements.

When a maximum image height of the imaging lens assembly (half of a diagonal length of an effective photosensitive area of an image sensor) is ImgH, and the focal length of the imaging lens assembly is f, the following condition can be satisfied: $0.80<ImgH/f<2.0$. Therefore, it is favorable for obtaining a balance between the field of view and the size of the image surface. Moreover, the following condition can also be satisfied: $0.90<ImgH/f<1.5$.

When an Abbe number of the first lens element is V1, an Abbe number of the second lens element is V2, the Abbe number of the third lens element is V3, the Abbe number of the fourth lens element is V4, the Abbe number of the fifth lens element is V5, the Abbe number of the sixth lens element is V6, and the Abbe number of the seventh lens element is V7, the following condition can be satisfied: $2.5<(V1+V2+V6+V7)/(V3+V4+V5)<5.0$. Therefore, it is favorable for adjusting material distribution of the lens elements so as to further correct aberrations such as chromatic aberration.

When a central thickness of the third lens element is CT3, a central thickness of the fourth lens element is CT4, and an axial distance between the third lens element and the fourth lens element is T34, the following condition can be satisfied: $0.50<(CT3+CT4)/T34<1.6$. Therefore, it is favorable for adjusting the thicknesses of the third and fourth lens elements and the distance therebetween, thereby correcting aberrations.

When the axial distance between the third lens element and the fourth lens element is T34, and an axial distance between the fourth lens element and the fifth lens element is T45, the following condition can be satisfied: $1.0<T34/T45<3.2$. Therefore, it is favorable for adjusting the distances between the lens elements so as to properly distribute the size at the object and image sides of the imaging lens assembly.

When the focal length of the imaging lens assembly is f, and a focal length of the fourth lens element is f4, the following condition can be satisfied: $|f/f4|<0.45$. Therefore, it is favorable for adjusting refractive power of the fourth lens element so as to properly distribute refractive power at the object and image sides of the imaging lens assembly.

When the central thickness of the sixth lens element is CT6, and the axial distance between the sixth lens element and the seventh lens element is T67, the following condition can be satisfied: $2.0<CT6/T67<8.0$. Therefore, it is favorable for the sixth and the seventh lens elements to collaborate with each other so as to adjust the back focal length and correct aberrations.

When an f-number of the imaging lens assembly is Fno, the following condition can be satisfied: $1.0<Fno<2.5$.

Therefore, it is favorable for obtaining a balance between the depth of view and illuminance.

When an axial distance between the object-side surface of the first lens element and an image surface is TL, and the focal length of the imaging lens assembly is f, the following condition can be satisfied: $1.1<TL/f<3.0$. Therefore, it is favorable for obtaining a balance between the total track length and the field of view. Moreover, the following condition can also be satisfied: $1.2<TL/f<2.0$.

According to the present disclosure, the aforementioned features and conditions can be utilized in numerous combinations so as to achieve corresponding effects.

According to the present disclosure, the lens elements of the imaging lens assembly can be made of either glass or plastic material. When the lens elements are made of glass material, the refractive power distribution of the imaging lens assembly may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric, wherein the former reduces manufacturing difficulty, and the latter allows more control variables for eliminating aberrations thereof, the required number of the lens elements can be reduced, and the total track length of the imaging lens assembly can be effectively shortened. Furthermore, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which alters the lens elements' transmittance in a specific range of wavelength for a reduction in unwanted stray light or colour deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the imaging lens assembly, based on the corresponding image sensor, can be flat or curved, especially a curved surface being concave facing towards the object side of the imaging lens assembly.

According to the present disclosure, an image correction unit, such as a field flattener, can be optionally disposed between the lens element closest to the image side of the imaging lens assembly along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 28:
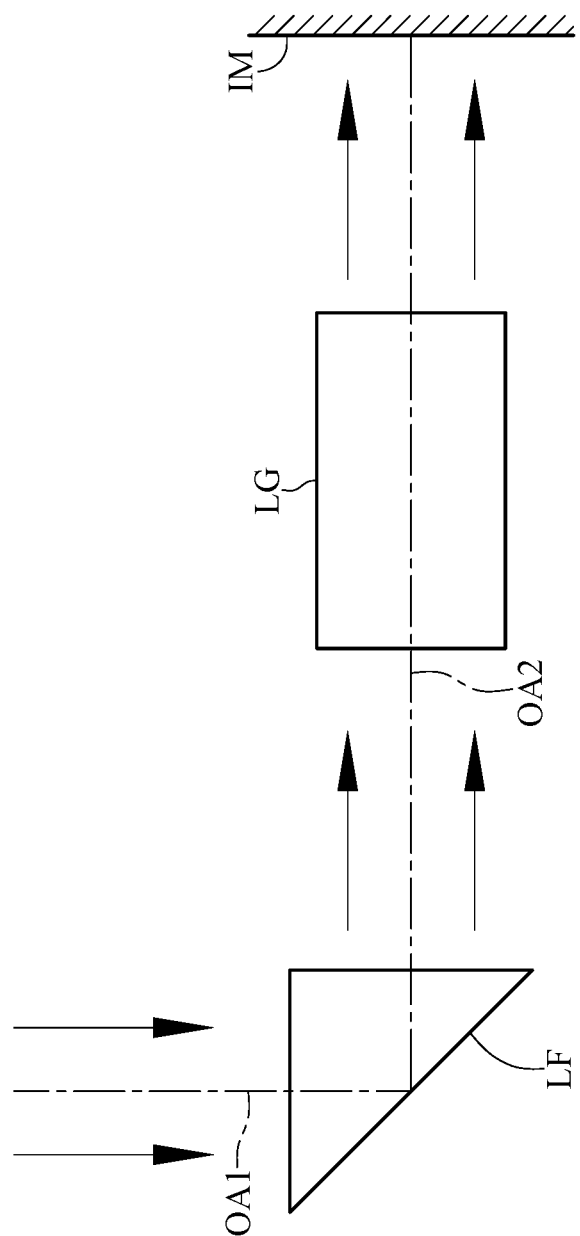
FIG. 28 shows a schematic view of a configuration of a light-folding element in an imaging lens assembly according to one embodiment of the present disclosure.
Figure 29:
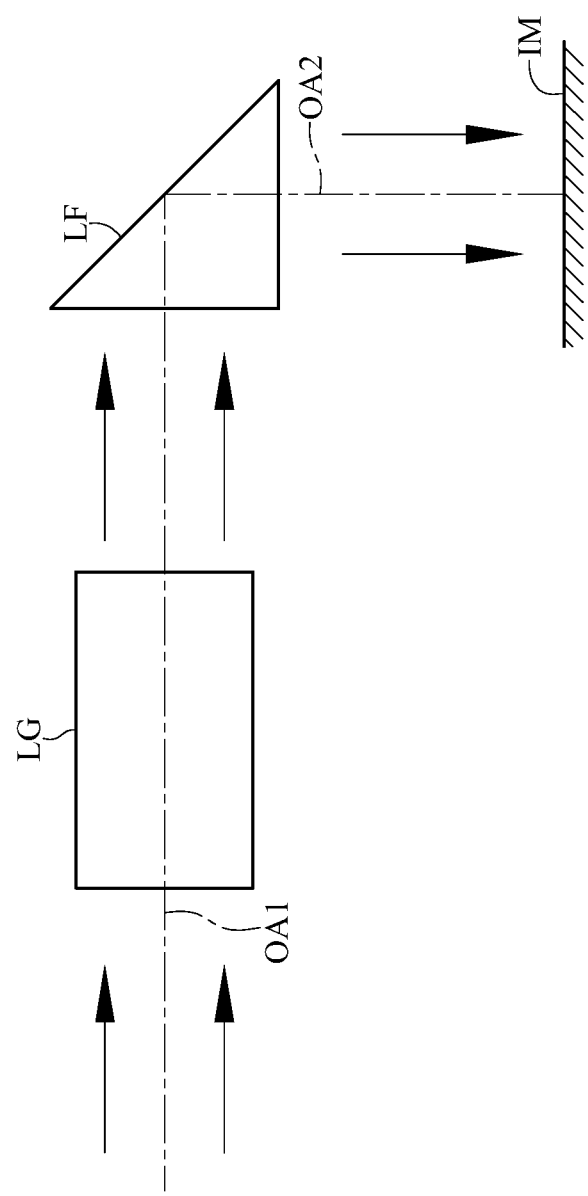
FIG. 29 shows a schematic view of another configuration of a light-folding element in an imaging lens assembly according to one embodiment of the present disclosure.
Figure 30:
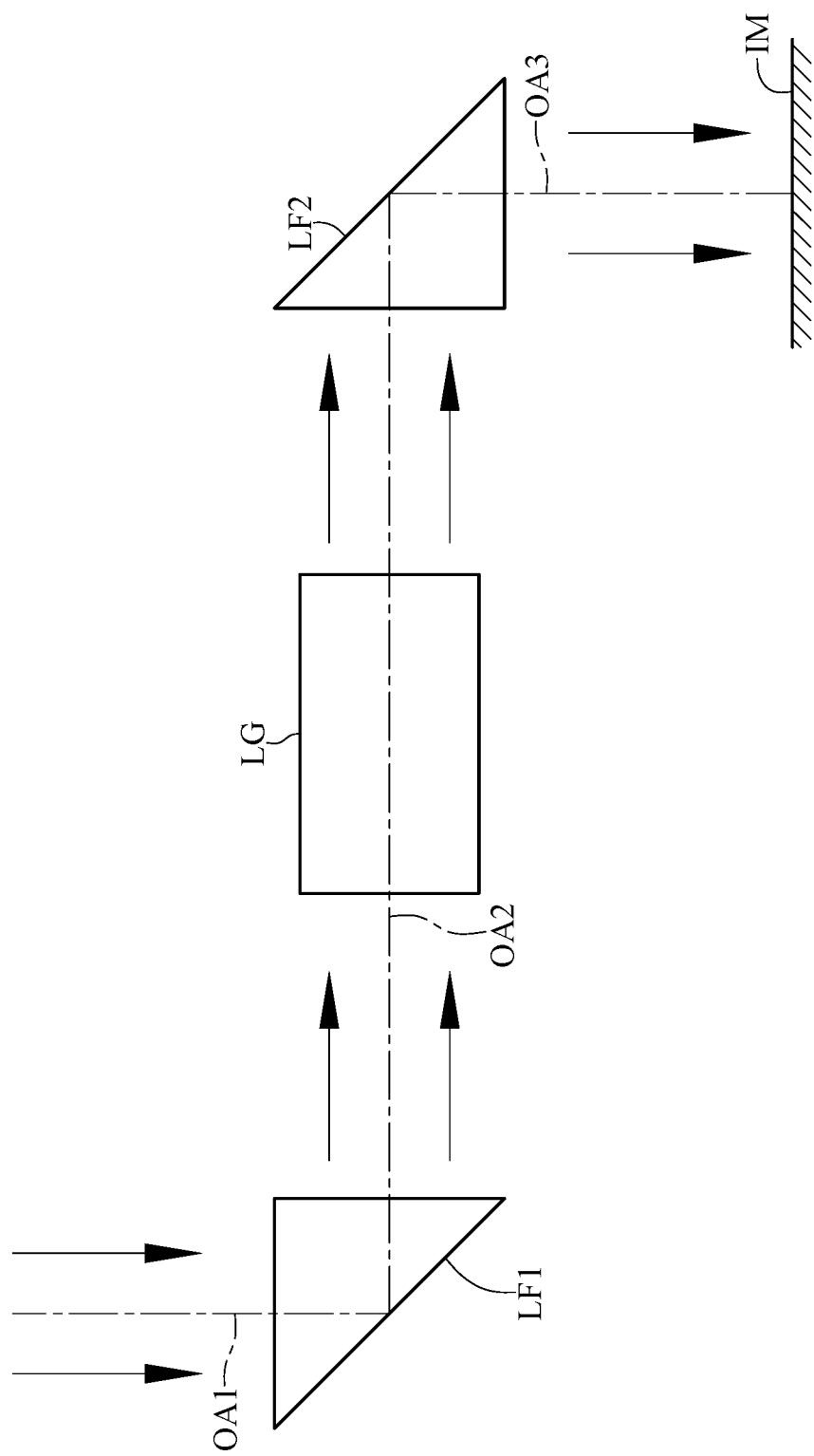
FIG. 30 shows a schematic view of a configuration of two light-folding elements in an imaging lens assembly according to one embodiment of the present disclosure.

According to the present disclosure, at least one light-folding element, such as a prism or a mirror, can be optionally disposed between an imaged object and the image surface on the imaging optical path, such that the imaging lens assembly can be more flexible in space arrangement, and therefore the dimensions of an electronic device is not restricted by the total track length of the imaging lens assembly. Specifically, please refer to FIG. 28 and FIG. 29. FIG. 28 shows a schematic view of a configuration of a light-folding element in an imaging lens assembly according to one embodiment of the present disclosure, and FIG. 29 shows a schematic view of another configuration of a light-folding element in an imaging lens assembly according to one embodiment of the present disclosure. In FIG. 28 and FIG. 29, the imaging lens assembly can have, in order from an imaged object (not shown in the figures) to an image surface IM along an optical path, a first optical axis OA1, a light-folding element LF and a second optical axis OA2. The light-folding element LF can be disposed between the imaged object and a lens group LG of the imaging lens assembly as shown in FIG. 28 or disposed between a lens group LG of the imaging lens assembly and the image surface IM as shown in FIG. 29. Furthermore, please refer to FIG. 30, which shows a schematic view of a configuration of two light-folding elements in an imaging lens assembly according to one embodiment of the present disclosure. In FIG. 30, the imaging lens assembly can have, in order from an imaged object (not shown in the figure) to an image surface IM along an optical path, a first optical axis OA1, a first light-folding element LF1, a second optical axis OA2, a second light-folding element LF2 and a third optical axis OA3. The first light-folding element LF1 is disposed between the imaged object and a lens group LG of the imaging lens assembly, the second light-folding element LF2 is disposed between the lens group LG of the imaging lens assembly and the image surface IM, and the travelling direction of light on the first optical axis OA1 can be the same direction as the travelling direction of light on the third optical axis OA3 as shown in FIG. 30. The imaging lens assembly can be optionally provided with three or more light-folding elements, and the present disclosure is not limited to the type, amount and position of the light-folding elements of the embodiments disclosed in the aforementioned figures.

According to the present disclosure, the imaging lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the imaging lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the imaging lens assembly and thereby provides a wider field of view for the same.

According to the present disclosure, the imaging lens assembly can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 2:
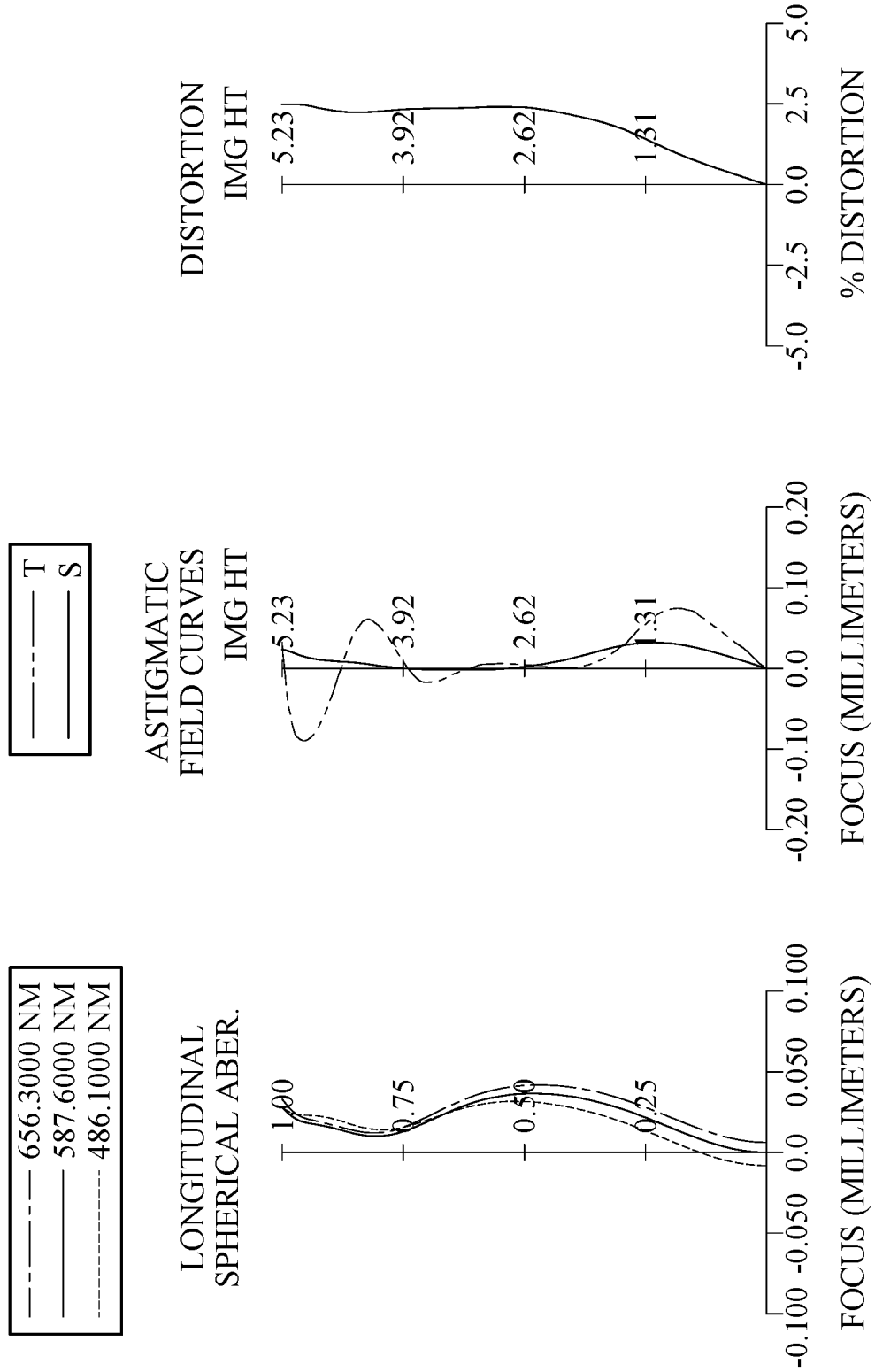
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the imaging lens assembly (its reference numeral is omitted) of the present disclosure and an image sensor 195. The imaging lens assembly includes, in order from an object side to an image side along an optical path, a first lens element 110, an aperture stop 100, a second lens element 120, a stop 101, a third lens element 130, a fourth lens element 140, a fifth lens element 150, a sixth lens element 160, a seventh lens element 170, a filter 180 and an image surface 190. The imaging lens assembly includes seven lens elements (110, 120, 130, 140, 150, 160 and 170) with no additional lens element disposed between each of the adjacent seven lens elements.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric. The image-side surface 112 of the first lens element 110 has two inflection points.

The second lens element 120 with positive refractive power has an object-side surface 121 being convex in a paraxial region thereof and an image-side surface 122 being convex in a paraxial region thereof. The second lens element 120 is made of plastic material and has the object-side surface 121 and the image-side surface 122 being both aspheric. The object-side surface 121 of the second lens element 120 has two inflection points. The image-side surface 122 of the second lens element 120 has one inflection point. The object-side surface 121 of the second lens element 120 has one critical point in an off-axis region thereof.

The third lens element 130 with negative refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric. The object-side surface 131 of the third lens element 130 has one inflection point. The image-side surface 132 of the third lens element 130 has two inflection points. The object-side surface 131 of the third lens element 130 has one critical point in an off-axis region thereof. The image-side surface 132 of the third lens element 130 has one critical point in an off-axis region thereof.

The fourth lens element 140 with positive refractive power has an object-side surface 141 being convex in a paraxial region thereof and an image-side surface 142 being concave in a paraxial region thereof. The fourth lens element 140 is made of plastic material and has the object-side surface 141 and the image-side surface 142 being both aspheric. The object-side surface 141 of the fourth lens element 140 has two inflection points. The image-side surface 142 of the fourth lens element 140 has two inflection points. The object-side surface 141 of the fourth lens element 140 has one critical point in an off-axis region thereof. The image-side surface 142 of the fourth lens element 140 has one critical point in an off-axis region thereof.

The fifth lens element 150 with negative refractive power has an object-side surface 151 being concave in a paraxial region thereof and an image-side surface 152 being convex in a paraxial region thereof. The fifth lens element 150 is made of plastic material and has the object-side surface 151 and the image-side surface 152 being both aspheric. The object-side surface 151 of the fifth lens element 150 has two inflection points. The image-side surface 152 of the fifth lens element 150 has three inflection points.

The sixth lens element 160 with positive refractive power has an object-side surface 161 being convex in a paraxial region thereof and an image-side surface 162 being convex in a paraxial region thereof. The sixth lens element 160 is made of plastic material and has the object-side surface 161 and the image-side surface 162 being both aspheric. The object-side surface 161 of the sixth lens element 160 has three inflection points. The image-side surface 162 of the sixth lens element 160 has four inflection points. The object-side surface 161 of the sixth lens element 160 has one critical point in an off-axis region thereof. The image-side surface 162 of the sixth lens element 160 has two critical points in an off-axis region thereof.

The seventh lens element 170 with negative refractive power has an object-side surface 171 being concave in a paraxial region thereof and an image-side surface 172 being concave in a paraxial region thereof. The seventh lens element 170 is made of plastic material and has the object-side surface 171 and the image-side surface 172 being both aspheric. The object-side surface 171 of the seventh lens element 170 has three inflection points. The image-side surface 172 of the seventh lens element 170 has two inflection points. The object-side surface 171 of the seventh lens element 170 has one critical point in an off-axis region thereof. The image-side surface 172 of the seventh lens element 170 has one critical point in an off-axis region thereof.

The filter 180 is made of glass material and located between the seventh lens element 170 and the image surface 190, and will not affect the focal length of the imaging lens assembly. The image sensor 195 is disposed on or near the image surface 190 of the imaging lens assembly.

The equation of the aspheric surface profiles of the aforementioned lens elements of the 1st embodiment is expressed as follows:

$$X(Y) = (Y^2/R)/(1 + \text{sqrt}(1 - (1+k) \times (Y/R)^2)) + \sum_i (Ai) \times (Y^i),$$

where,

X is the displacement in parallel with an optical axis from the intersection point of the aspheric surface and the optical axis to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18, 20, 22, 24, 26 and 28.

In the imaging lens assembly of the image capturing unit according to the 1st embodiment, when a focal length of the imaging lens assembly is f, an f-number of the imaging lens assembly is Fno, and half of a maximum field of view of the imaging lens assembly is HFOV, these parameters have the following values: f=4.94 millimeters (mm), Fno=1.82, HFOV=45.9 degrees (deg.).

When an Abbe number of the first lens element 110 is V1, an Abbe number of the second lens element 120 is V2, an Abbe number of the third lens element 130 is V3, an Abbe number of the fourth lens element 140 is V4, an Abbe number of the fifth lens element 150 is V5, an Abbe number of the sixth lens element 160 is V6, and an Abbe number of the seventh lens element 170 is V7, the following conditions are satisfied: (V1+V2+V6+V7)/(V3+V4+V5)=2.82; V3+V4+V5=79.4; (V3+V4+V5)/V6=1.42; and (V3+V4+V5)/(V6+V7)=0.71.

When a central thickness of the first lens element 110 is CT1, and a central thickness of the fifth lens element 150 is CT5, the following condition is satisfied: CT1/CT5=1.03.

When the central thickness of the first lens element 110 is CT1, and an axial distance between the first lens element 110 and the second lens element 120 is T12, the following condition is satisfied: CT1/T12=1.49. In this embodiment, an axial distance between two adjacent lens elements is a distance in a paraxial region between two adjacent lens surfaces of the two adjacent lens elements.

When the central thickness of the first lens element 110 is CT1, a central thickness of the second lens element 120 is CT2, and the axial distance between the first lens element 110 and the second lens element 120 is T12, the following condition is satisfied: (CT1+CT2)/T12=3.16.

When a central thickness of the third lens element 130 is CT3, a central thickness of the fourth lens element 140 is CT4, and an axial distance between the third lens element 130 and the fourth lens element 140 is T34, the following condition is satisfied: (CT3+CT4)/T34=1.33.

When a central thickness of the sixth lens element 160 is CT6, and an axial distance between the sixth lens element 160 and the seventh lens element 170 is T67, the following condition is satisfied: CT6/T67=3.61.

When the axial distance between the first lens element 110 and the second lens element 120 is T12, and the axial distance between the sixth lens element 160 and the seventh lens element 170 is T67, the following condition is satisfied: T12/T67=1.31.

When the axial distance between the third lens element 130 and the fourth lens element 140 is T34, and an axial distance between the fourth lens element 140 and the fifth lens element 150 is T45, the following condition is satisfied: T34/T45=1.22.

When an axial distance between the object-side surface 111 of the first lens element 110 and the image-side surface 172 of the seventh lens element 170 is TD, and an entrance pupil diameter of the imaging lens assembly is EPD, the following condition is satisfied: TD/EPD=2.06.

When an axial distance between the object-side surface 111 of the first lens element 110 and the image surface 190 is TL, and the focal length of the imaging lens assembly is f, the following condition is satisfied: TL/f=1.43.

When a curvature radius of the object-side surface 121 of the second lens element 120 is R3, and a curvature radius of the image-side surface 122 of the second lens element 120 is R4, the following condition is satisfied: |R4/R3|=0.26.

When the focal length of the imaging lens assembly is f, and the central thickness of the sixth lens element 160 is CT6, the following condition is satisfied: f/CT6=4.78.

When the focal length of the imaging lens assembly is f, and a focal length of the fourth lens element 140 is f4, the following condition is satisfied: |f/f4|=0.04.

When the focal length of the imaging lens assembly is f, and a curvature radius of the object-side surface 111 of the first lens element 110 is R1, the following condition is satisfied: f/R1=1.60.

When the focal length of the imaging lens assembly is f, a curvature radius of the object-side surface 161 of the sixth lens element 160 is R11, and a curvature radius of the image-side surface 162 of the sixth lens element 160 is R12, the following condition is satisfied: f/|R11|+f/|R12|=4.33.

When a focal length of the second lens element 120 is f2, and a focal length of the sixth lens element 160 is f6, the following condition is satisfied: f2/f6=3.19.

When the focal length of the sixth lens element 160 is f6, and the central thickness of the sixth lens element 160 is CT6, the following condition is satisfied: f6/CT6=2.18.

When a maximum image height of the imaging lens assembly is ImgH, and the focal length of the imaging lens assembly is f, the following condition is satisfied: ImgH/f=1.06.

When a maximum effective radius of the object-side surface 111 of the first lens element 110 is Y11, and a maximum effective radius of the image-side surface 172 of the seventh lens element 170 is Y72, the following condition is satisfied: Y11/Y72=0.38.

When a vertical distance between a non-axial critical point on the object-side surface 161 of the sixth lens element 160 and the optical axis is Yc61, and a maximum effective radius of the object-side surface 161 of the sixth lens element 160 is Y61, the following condition is satisfied: Yc61/Y61=0.66.

When a vertical distance between a non-axial critical point on the image-side surface 172 of the seventh lens element 170 and the optical axis is Yc72, and the maximum effective radius of the image-side surface 172 of the seventh lens element 170 is Y72, the following condition is satisfied: Yc72/Y72=0.55.

The detailed optical data of the 1st embodiment are shown in Table 1 and the aspheric surface data are shown in Table 2 below.

TABLE 1

1st Embodiment
f = 4.94 mm, Fno = 1.82, HFOV = 45.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.0851 | (ASP) | 0.562 | Plastic | 1.545 | 56.1 | 11.16 |
| 2 | | 5.8578 | (ASP) | 0.152 | | | | |
| 3 | Ape. Stop | Plano | | 0.224 | | | | |
| 4 | Lens 2 | 18.8582 | (ASP) | 0.628 | Plastic | 1.545 | 56.1 | 7.20 |
| 5 | | −4.8929 | (ASP) | −0.225 | | | | |
| 6 | Stop | Plano | | 0.250 | | | | |
| 7 | Lens 3 | 7.8074 | (ASP) | 0.282 | Plastic | 1.679 | 18.4 | −10.91 |
| 8 | | 3.7454 | (ASP) | 0.459 | | | | |
| 9 | Lens 4 | 5.0054 | (ASP) | 0.329 | Plastic | 1.639 | 23.5 | 124.34 |
| 10 | | 5.2053 | (ASP) | 0.375 | | | | |
| 11 | Lens 5 | −4.3810 | (ASP) | 0.547 | Plastic | 1.566 | 37.4 | −7.90 |
| 12 | | −221.8779 | (ASP) | 0.080 | | | | |
| 13 | Lens 6 | 3.4134 | (ASP) | 1.033 | Plastic | 1.544 | 56.0 | 2.25 |
| 14 | | −1.7106 | (ASP) | 0.286 | | | | |
| 15 | Lens 7 | −38.0185 | (ASP) | 0.583 | Plastic | 1.544 | 56.0 | −2.39 |
| 16 | | 1.3527 | (ASP) | 1.000 | | | | |
| 17 | Filter | Plano | | 0.210 | Glass | 1.517 | 64.2 | — |
| 18 | | Plano | | 0.286 | | | | |
| 19 | Image | Plano | | — | | | | |

Note:
Reference wavelength is 587.6 nm (d-line).
An effective radius of the stop 101 (Surface 6) is 1.445 mm.

TABLE 2

Aspheric Coefficients

| Surface # | 1 | 2 | 4 | 5 | 7 |
|---|---|---|---|---|---|
| k= | 0.00000E+00 | 0.00000E+00 | 2.14252E+01 | −7.79855E−01 | 0.00000E+00 |
| A4= | −6.78068313E−03 | −1.13966576E−02 | −2.93812775E−02 | −7.32688422E−03 | 8.39179390E−03 |
| A6= | −4.55739282E−03 | −2.10224741E−02 | 5.53666531E−03 | −4.79890115E−02 | −7.88324545E−02 |
| A8= | 1.10494610E−03 | 4.33829433E−03 | −2.39094046E−02 | 3.69665752E−02 | 1.39495740E−01 |
| A10= | 5.46163447E−04 | −5.80153689E−02 | 2.97453534E−02 | −1.57826977E−02 | −2.10379500E−01 |
| A12= | −1.23523004E−03 | 4.53005685E−02 | −1.77908751E−02 | 4.32825892E−03 | 2.16573269E−01 |
| A14= | 5.00973996E−04 | −1.87957702E−02 | 4.79037986E−03 | −1.44123339E−03 | −1.41132549E−01 |
| A16= | −4.38689950E−05 | 3.35128358E−03 | −2.70343134E−04 | 3.45559356E−04 | 5.48685545E−02 |
| A18= | — | — | — | — | −1.15441870E−02 |
| A20= | — | — | — | — | 1.00877321E−03 |

| Surface # | 8 | 9 | 10 | 11 | 12 |
|---|---|---|---|---|---|
| k= | 0.00000E+00 | −7.65550E+01 | 0.00000E+00 | 0.00000E+00 | 0.00000E+00 |
| A4= | −2.02152526E−02 | 1.20433741E−02 | −8.48426716E−03 | 6.19507128E−02 | 2.85685465E−02 |
| A6= | 4.06203592E−03 | −7.63279353E−02 | −7.83803458E−02 | −9.42118044E−02 | −1.69917674E−01 |
| A8= | 4.69598930E−03 | 7.21599333E−02 | 1.03148870E−01 | 7.53554711E−02 | 1.45505417E−01 |
| A10= | −3.01043498E−02 | −3.74855957E−02 | −8.04089681E−02 | −3.18682546E−02 | −7.70730028E−02 |
| A12= | 4.10844206E−02 | 1.23437515E−03 | 3.91396629E−02 | 8.96037779E−03 | 2.93812067E−02 |
| A14= | −2.82339698E−02 | 9.51287537E−03 | −1.22664536E−02 | −2.61517168E−03 | −7.84119977E−03 |
| A16= | 1.06645289E−02 | −4.92032216E−03 | 2.38961717E−03 | 7.31361642E−04 | 1.35543556E−03 |
| A18= | −2.11171968E−03 | 1.00846380E−03 | −2.62914538E−04 | −1.19525174E−04 | −1.33907324E−04 |
| A20= | 1.71610500E−04 | −7.43232549E−05 | 1.28256742E−05 | 7.68678184E−06 | 5.67864458E−06 |

| Surface # | 13 | 14 | 15 | 16 |
|---|---|---|---|---|
| k= | 0.00000E+00 | −9.07240E+00 | 0.00000E+00 | −4.21718E+00 |
| A4= | 2.84299879E−02 | −1.21332526E−02 | 1.32851157E−02 | −4.43569153E−02 |
| A6= | −7.06785133E−02 | 1.14501580E−01 | −5.31395399E−02 | 1.27999625E−02 |
| A8= | 6.06044117E−02 | −1.01623389E−01 | 3.63760368E−02 | −2.49511248E−03 |
| A10= | −4.15800142E−02 | 4.94745745E−02 | −1.46930509E−02 | 2.39189070E−04 |
| A12= | 2.31429019E−02 | −1.58042072E−02 | 4.03954337E−03 | 2.16590078E−05 |
| A14= | −1.01562093E−02 | 3.49619922E−03 | −7.73649863E−04 | −1.23152405E−05 |
| A16= | 3.41835650E−03 | −5.47066523E−04 | 1.03681499E−04 | 2.28904135E−06 |
| A18= | −8.63906636E−04 | 6.08688849E−05 | −9.72274059E−06 | −2.56090779E−07 |
| A20= | 1.59486630E−04 | −4.77752133E−06 | 6.32806573E−07 | 1.87905606E−08 |
| A22= | −2.06625048E−05 | 2.58199230E−07 | −2.79320884E−08 | −9.10517868E−10 |
| A24= | 1.76624887E−06 | −9.13524689E−09 | 7.95461299E−10 | 2.81009173E−11 |
| A26= | −8.90116857E−08 | 1.90341187E−10 | −1.31418679E−11 | −5.00893657E−13 |
| A28= | 1.99666557E−09 | −1.76950275E−12 | 9.52578304E−14 | 3.92677782E−15 |

In Table 1, the curvature radius, the thickness and the focal length are shown in millimeters (mm). Surface numbers 0-19 represent the surfaces sequentially arranged from the object side to the image side along the optical axis. In Table 2, k represents the conic coefficient of the equation of the aspheric surface profiles. A4-A28 represent the aspheric coefficients ranging from the 4th order to the 28th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
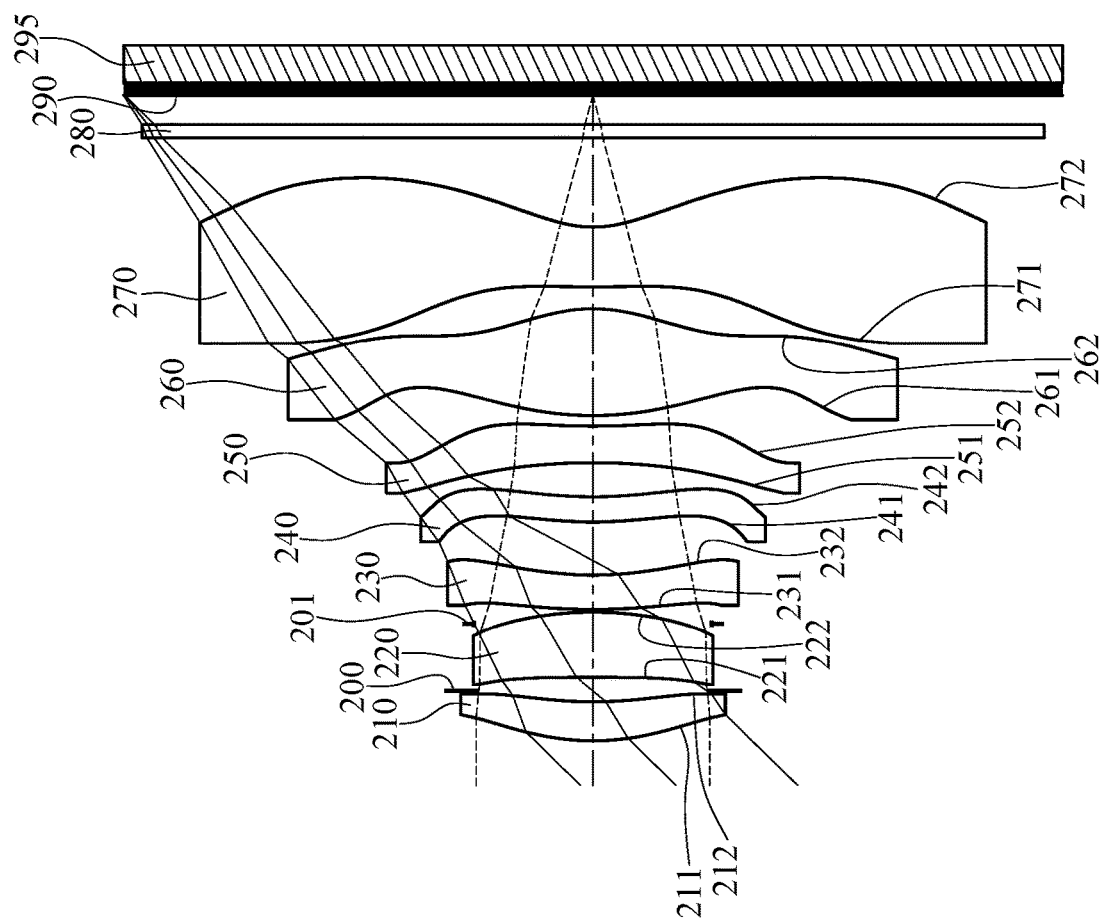
FIG. 3 is a schematic view of an image capturing unit according to the 2nd embodiment of the present disclosure.
Figure 4:
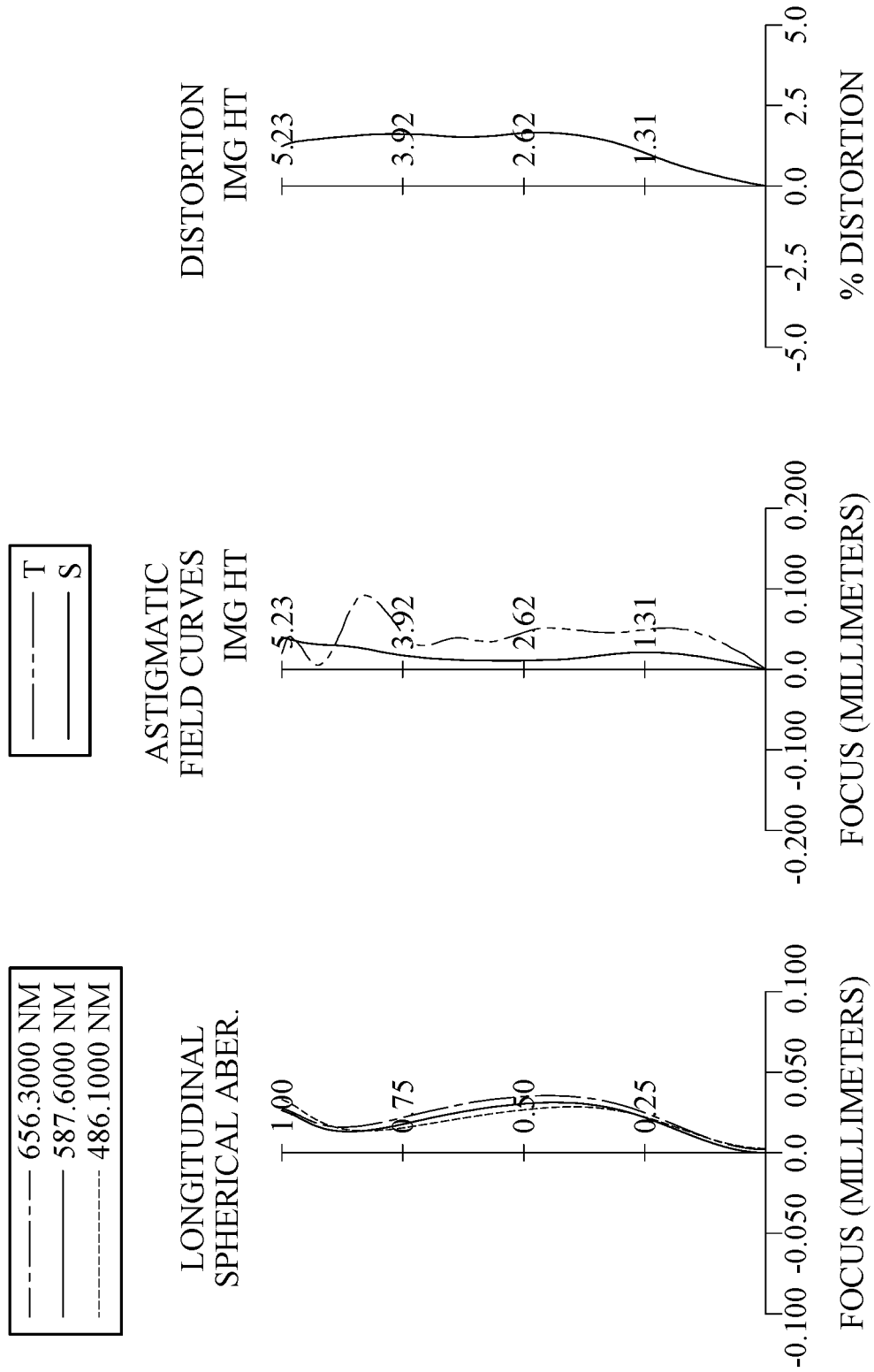
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the imaging lens assembly (its reference numeral is omitted) of the present disclosure and an image sensor 295. The imaging lens assembly includes, in order from an object side to an image side along an optical path, a first lens element 210, an aperture stop 200, a second lens element 220, a stop 201, a third lens element 230, a fourth lens element 240, a fifth lens element 250, a sixth lens element 260, a seventh lens element 270, a filter 280 and an image surface 290. The imaging lens assembly includes seven lens elements (210, 220, 230, 240, 250, 260 and 270) with no additional lens element disposed between each of the adjacent seven lens elements.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric. The object-side surface 211 of the first lens element 210 has two inflection points. The image-side surface 212 of the first lens element 210 has two inflection points.

The second lens element 220 with positive refractive power has an object-side surface 221 being concave in a paraxial region thereof and an image-side surface 222 being convex in a paraxial region thereof. The second lens element 220 is made of plastic material and has the object-side surface 221 and the image-side surface 222 being both aspheric. The object-side surface 221 of the second lens element 220 has one inflection point.

The third lens element 230 with negative refractive power has the object-side surface 231 being convex in a paraxial region thereof and an image-side surface 232 being concave in a paraxial region thereof. The third lens element 230 is made of plastic material and has the object-side surface 231 and the image-side surface 232 being both aspheric. The object-side surface 231 of the third lens element 230 has one inflection point. The image-side surface 232 of the third lens element 230 has one inflection point. The object-side surface 231 of the third lens element 230 has one critical point in an off-axis region thereof. The image-side surface 232 of the third lens element 230 has one critical point in an off-axis region thereof.

The fourth lens element 240 with positive refractive power has an object-side surface 241 being convex in a paraxial region thereof and an image-side surface 242 being concave in a paraxial region thereof. The fourth lens element 240 is made of plastic material and has the object-side surface 241 and the image-side surface 242 being both aspheric. The object-side surface 241 of the fourth lens element 240 has one inflection point. The image-side surface 242 of the fourth lens element 240 has two inflection points. The object-side surface 241 of the fourth lens element 240 has one critical point in an off-axis region thereof. The image-side surface 242 of the fourth lens element 240 has one critical point in an off-axis region thereof.

The fifth lens element 250 with negative refractive power has an object-side surface 251 being concave in a paraxial region thereof and an image-side surface 252 being concave in a paraxial region thereof. The fifth lens element 250 is made of plastic material and has the object-side surface 251 and the image-side surface 252 being both aspheric. The object-side surface 251 of the fifth lens element 250 has two inflection points. The image-side surface 252 of the fifth lens element 250 has two inflection points. The image-side surface 252 of the fifth lens element 250 has two critical points in an off-axis region thereof.

The sixth lens element 260 with positive refractive power has an object-side surface 261 being convex in a paraxial region thereof and an image-side surface 262 being convex in a paraxial region thereof. The sixth lens element 260 is made of plastic material and has the object-side surface 261 and the image-side surface 262 being both aspheric. The object-side surface 261 of the sixth lens element 260 has two inflection points. The image-side surface 262 of the sixth lens element 260 has four inflection points. The object-side surface 261 of the sixth lens element 260 has one critical point in an off-axis region thereof. The image-side surface 262 of the sixth lens element 260 has two critical points in an off-axis region thereof.

The seventh lens element 270 with negative refractive power has an object-side surface 271 being convex in a paraxial region thereof and an image-side surface 272 being concave in a paraxial region thereof. The seventh lens element 270 is made of plastic material and has the object-side surface 271 and the image-side surface 272 being both aspheric. The object-side surface 271 of the seventh lens element 270 has two inflection points. The image-side surface 272 of the seventh lens element 270 has two inflection points. The object-side surface 271 of the seventh lens element 270 has two critical points in an off-axis region thereof. The image-side surface 272 of the seventh lens element 270 has one critical point in an off-axis region thereof.

The filter 280 is made of glass material and located between the seventh lens element 270 and the image surface 290, and will not affect the focal length of the imaging lens assembly. The image sensor 295 is disposed on or near the image surface 290 of the imaging lens assembly.

The detailed optical data of the 2nd embodiment are shown in Table 3 and the aspheric surface data are shown in Table 4 below.

TABLE 3

2nd Embodiment
f = 5.07 mm, Fno = 1.94, HFOV = 45.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.8536 | (ASP) | 0.437 | Plastic | 1.545 | 56.1 | 12.08 |
| 2 | | 4.7664 | (ASP) | 0.119 | | | | |
| 3 | Ape. Stop | Plano | | 0.154 | | | | |
| 4 | Lens 2 | −86.9565 | (ASP) | 0.736 | Plastic | 1.545 | 56.1 | 7.39 |
| 5 | | −3.8586 | (ASP) | −0.133 | | | | |
| 6 | Stop | Plano | | 0.163 | | | | |
| 7 | Lens 3 | 7.1123 | (ASP) | 0.384 | Plastic | 1.701 | 14.8 | −12.35 |
| 8 | | 3.8177 | (ASP) | 0.593 | | | | |
| 9 | Lens 4 | 4.4329 | (ASP) | 0.280 | Plastic | 1.584 | 28.2 | 63.82 |
| 10 | | 4.9138 | (ASP) | 0.382 | | | | |
| 11 | Lens 5 | −6.5876 | (ASP) | 0.411 | Plastic | 1.566 | 37.4 | −6.79 |
| 12 | | 9.4496 | (ASP) | 0.116 | | | | |
| 13 | Lens 6 | 3.9584 | (ASP) | 1.200 | Plastic | 1.544 | 56.0 | 2.38 |
| 14 | | −1.7205 | (ASP) | 0.247 | | | | |
| 15 | Lens 7 | 15.9414 | (ASP) | 0.665 | Plastic | 1.534 | 55.9 | −2.64 |
| 16 | | 1.2753 | (ASP) | 1.000 | | | | |
| 17 | Filter | Plano | | 0.145 | Glass | 1.517 | 64.2 | — |
| 18 | | Plano | | 0.327 | | | | |
| 19 | Image | Plano | | — | | | | |

Note:
Reference wavelength is 587.6 nm (d-line).
An effective radius of the stop 201 (Surface 6) is 1.330 mm.

TABLE 4

Aspheric Coefficients

| Surface # | 1 | 2 | 4 | 5 | 7 |
|---|---|---|---|---|---|
| k= | 1.29332E−01 | 7.26392E+00 | 9.50000E+01 | 0.00000E+00 | 0.00000E+00 |
| A4= | −1.10182670E−02 | −3.18838443E−02 | −2.66326630E−02 | 1.78808843E−02 | −2.98994815E−03 |
| A6= | −2.87926676E−03 | 1.43483437E−03 | −1.12719039E−03 | −4.35943003E−02 | −3.41954696E−03 |
| A8= | −3.33635612E−03 | −1.87152919E−02 | −2.34649966E−03 | 4.41728741E−02 | −1.31517711E−02 |
| A10= | 2.58233261E−03 | 1.42906166E−02 | 9.43779941E−04 | −3.53944287E−02 | 1.80229195E−02 |
| A12= | −2.17692489E−03 | −6.53209790E−03 | 8.83410602E−04 | 1.93795904E−02 | −1.32285366E−02 |
| A14= | 6.04188401E−04 | 1.55787622E−03 | −2.13425600E−04 | −6.21617563E−03 | 4.80144469E−03 |
| A16= | — | — | — | 8.13299133E−04 | −7.26637191E−04 |

| Surface # | 8 | 9 | 10 | 11 | 12 |
|---|---|---|---|---|---|
| k= | 0.00000E+00 | −6.71906E+01 | 0.00000E+00 | 0.00000E+00 | 0.00000E+00 |
| A4= | −3.37061213E−02 | 3.21202746E−02 | −2.79283859E−02 | 2.02022499E−02 | 1.92606759E−04 |
| A6= | 2.63091480E−02 | −5.61701423E−02 | 3.22168978E−02 | −2.00836265E−02 | −5.43990041E−02 |
| A8= | −2.67623967E−02 | 7.77949103E−03 | −8.27770226E−02 | −6.99381970E−03 | 2.02949321E−02 |
| A10= | 1.63249028E−02 | 3.29654504E−02 | 9.29545442E−02 | 1.62854237E−02 | −1.52209733E−02 |
| A12= | −6.78295168E−03 | −3.73803355E−02 | −6.01854731E−02 | −7.38524387E−03 | −1.03557083E−03 |
| A14= | 1.61315625E−03 | 1.83874230E−02 | 2.34839872E−02 | 9.83901912E−04 | 3.86565600E−04 |
| A16= | −1.71114911E−04 | −4.41761188E−03 | −5.45259612E−03 | 1.60718327E−04 | −5.46785155E−05 |
| A18= | — | 4.17409096E−04 | 6.86774987E−04 | −5.61681129E−05 | 2.82731128E−06 |
| A20= | — | — | −3.54808120E−05 | 4.19567988E−06 | — |

| Surface # | 13 | 14 | 15 | 16 |
|---|---|---|---|---|
| k= | 0.00000E+00 | −6.81768E+00 | 0.00000E+00 | −4.41405E+00 |
| A4= | 1.74560212E−02 | −1.03466621E−02 | −4.78013183E−02 | −3.52819811E−02 |
| A6= | −2.34340662E−02 | 3.09657382E−02 | 2.49491516E−04 | 8.68993559E−03 |
| A8= | 9.11969677E−03 | −1.12946896E−02 | 2.93472764E−03 | −1.49835180E−03 |
| A10= | −2.08892954E−03 | 1.83227654E−03 | −6.62506328E−04 | 1.71754223E−04 |
| A12= | 2.24003423E−04 | −1.40745957E−04 | 7.09898075E−05 | −1.27238841E−05 |
| A14= | −4.98476567E−06 | 2.15739103E−06 | −4.19720396E−06 | 5.87068524E−07 |
| A16= | −7.78939916E−07 | 4.30349429E−07 | 1.32159101E−07 | −1.58277752E−08 |
| A18= | 4.14350829E−08 | −2.95045900E−08 | −1.73953610E−09 | 2.17996429E−10 |
| A20= | — | 5.97549169E−10 | — | −1.06305929E−12 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 5.07 | TD/EPD | 2.20 |
| Fno | 1.94 | TL/f | 1.42 |
| HFOV [deg.] | 45.5 | \|R4/R3\| | 0.04 |
| (V1 + V2 + V6 + V7)/ (V3 + V4 + V5) | 2.79 | f/CT6 | 4.23 |
| V3 + V4 + V5 | 80.4 | \|f/f4\| | 0.08 |
| (V3 + V4 + V5)/V6 | 1.44 | f/R1 | 1.78 |
| (V3 + V4 + V5)/(V6 + V7) | 0.72 | f/\|R11\| + f/\|R12\| | 4.23 |
| CT1/CT5 | 1.06 | f2/f6 | 3.10 |
| CT1/T12 | 1.60 | f6/CT6 | 1.98 |
| (CT1 + CT2)/T12 | 4.30 | ImgH/f | 1.03 |
| (CT3 + CT4)/T34 | 1.12 | Y11/Y72 | 0.34 |
| CT6/T67 | 4.86 | Yc61/Y61 | 0.66 |
| T12/T67 | 1.11 | Yc72/Y72 | 0.58 |
| T34/T45 | 1.55 | — | — |

3rd Embodiment

Figure 5:
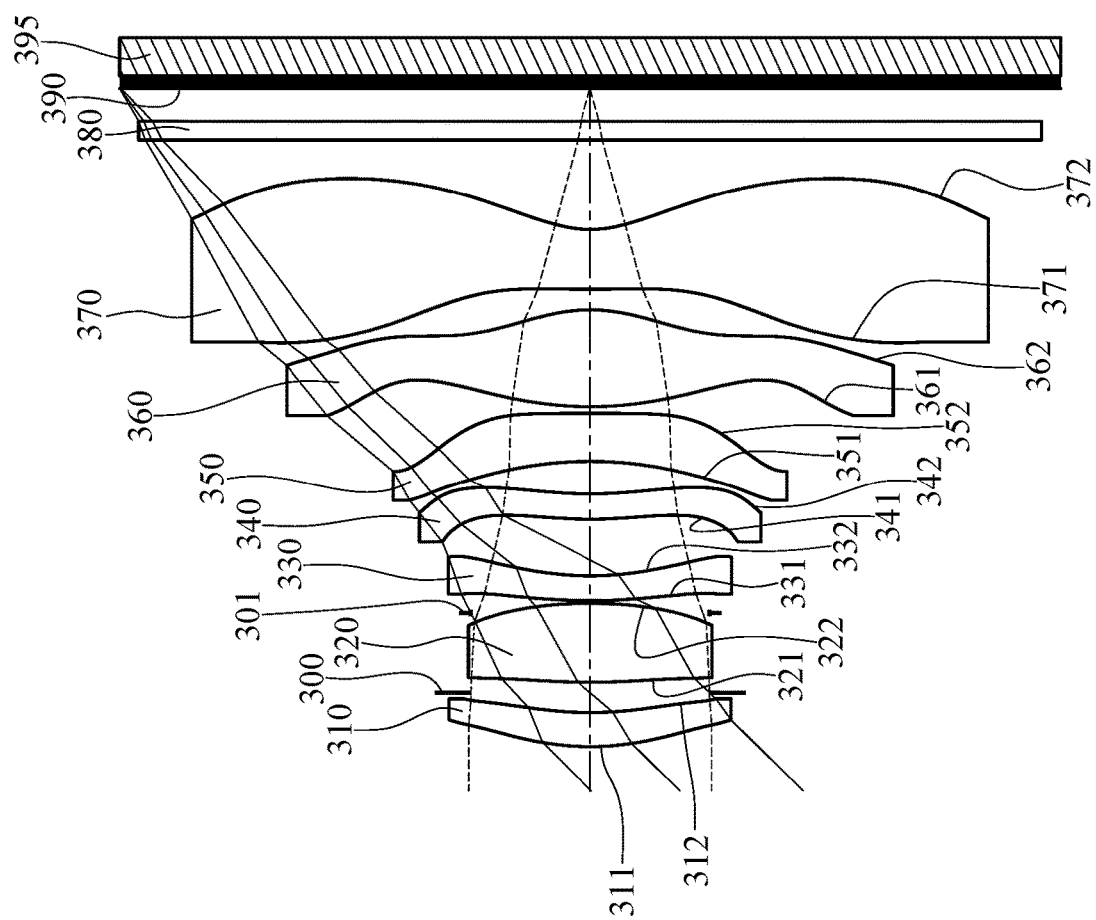
FIG. 5 is a schematic view of an image capturing unit according to the 3rd embodiment of the present disclosure.
Figure 6:
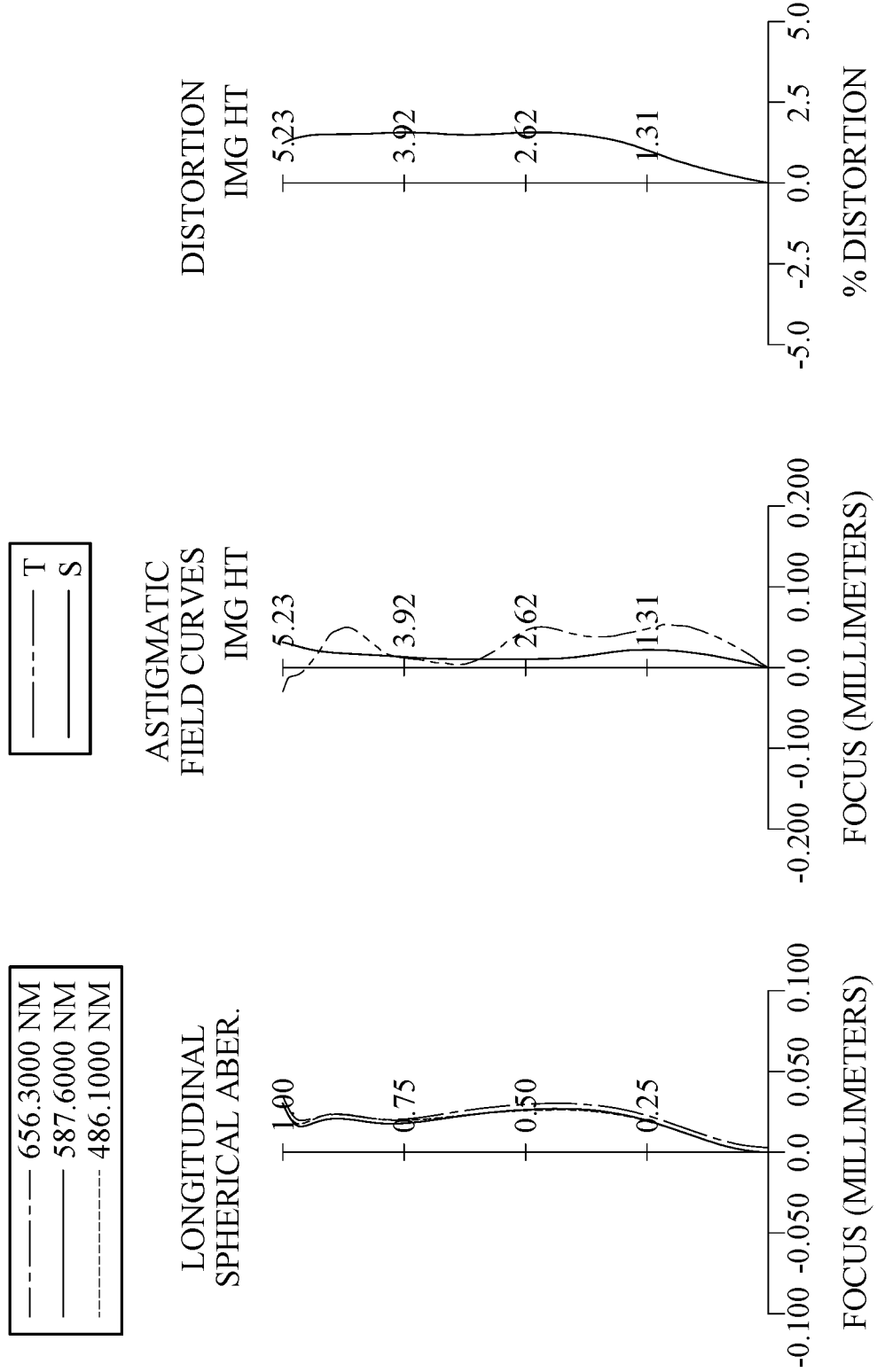
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the imaging lens assembly (its reference numeral is omitted) of the present disclosure and an image sensor 395. The imaging lens assembly includes, in order from an object side to an image side along an optical path, a first lens element 310, an aperture stop 300, a second lens element 320, a stop 301, a third lens element 330, a fourth lens element 340, a fifth lens element 350, a sixth lens element 360, a seventh lens element 370, a filter 380 and an image surface 390. The imaging lens assembly includes seven lens elements (310, 320, 330, 340, 350, 360 and 370) with no additional lens element disposed between each of the adjacent seven lens elements.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric. The object-side surface 311 of the first lens element 310 has two inflection points. The image-side surface 312 of the first lens element 310 has two inflection points.

The second lens element 320 with positive refractive power has an object-side surface 321 being convex in a paraxial region thereof and an image-side surface 322 being convex in a paraxial region thereof. The second lens element 320 is made of plastic material and has the object-side surface 321 and the image-side surface 322 being both aspheric. The object-side surface 321 of the second lens element 320 has two inflection points.

The third lens element 330 with negative refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric. The object-side surface 331 of the third lens element 330 has one inflection point. The image-side surface 332 of the third lens element 330 has one inflection point. The object-side surface 331 of the third lens element 330 has one critical point in an off-axis region thereof. The image-side surface 332 of the third lens element 330 has one critical point in an off-axis region thereof.

The fourth lens element 340 with negative refractive power has an object-side surface 341 being convex in a paraxial region thereof and an image-side surface 342 being concave in a paraxial region thereof. The fourth lens element 340 is made of plastic material and has the object-side surface 341 and the image-side surface 342 being both aspheric. The object-side surface 341 of the fourth lens element 340 has one inflection point. The image-side surface 342 of the fourth lens element 340 has two inflection points. The object-side surface 341 of the fourth lens element 340 has one critical point in an off-axis region thereof. The image-side surface 342 of the fourth lens element 340 has one critical point in an off-axis region thereof.

The fifth lens element 350 with negative refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric. The object-side surface 351 of the fifth lens element 350 has two inflection points. The image-side surface 352 of the fifth lens element 350 has one inflection point.

The sixth lens element 360 with positive refractive power has an object-side surface 361 being convex in a paraxial region thereof and an image-side surface 362 being convex in a paraxial region thereof. The sixth lens element 360 is made of plastic material and has the object-side surface 361 and the image-side surface 362 being both aspheric. The object-side surface 361 of the sixth lens element 360 has two inflection points. The image-side surface 362 of the sixth lens element 360 has four inflection points. The object-side surface 361 of the sixth lens element 360 has one critical point in an off-axis region thereof.

The seventh lens element 370 with negative refractive power has an object-side surface 371 being convex in a paraxial region thereof and an image-side surface 372 being concave in a paraxial region thereof. The seventh lens element 370 is made of plastic material and has the object-side surface 371 and the image-side surface 372 being both aspheric. The object-side surface 371 of the seventh lens element 370 has two inflection points. The image-side surface 372 of the seventh lens element 370 has two inflection points. The object-side surface 371 of the seventh lens element 370 has two critical points in an off-axis region thereof. The image-side surface 372 of the seventh lens element 370 has one critical point in an off-axis region thereof.

The filter 380 is made of glass material and located between the seventh lens element 370 and the image surface 390, and will not affect the focal length of the imaging lens assembly. The image sensor 395 is disposed on or near the image surface 390 of the imaging lens assembly.

The detailed optical data of the 3rd embodiment are shown in Table 5 and the aspheric surface data are shown in Table 6 below.

TABLE 5

3rd Embodiment
f = 5.14 mm, Fno = 1.90, HFOV = 45.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.9347 | (ASP) | 0.380 | Plastic | 1.545 | 56.1 | 17.82 |
| 2 | | 4.0140 | (ASP) | 0.221 | | | | |
| 3 | Ape. Stop | Plano | | 0.117 | | | | |
| 4 | Lens 2 | 7.9580 | (ASP) | 0.878 | Plastic | 1.545 | 56.1 | 5.55 |
| 5 | | −4.6924 | (ASP) | −0.109 | | | | |
| 6 | Stop | Plano | | 0.139 | | | | |
| 7 | Lens 3 | 6.5232 | (ASP) | 0.275 | Plastic | 1.669 | 19.5 | −10.85 |
| 8 | | 3.3777 | (ASP) | 0.633 | | | | |
| 9 | Lens 4 | 4.8256 | (ASP) | 0.280 | Plastic | 1.669 | 19.5 | −158.17 |
| 10 | | 4.5078 | (ASP) | 0.365 | | | | |
| 11 | Lens 5 | −4.1784 | (ASP) | 0.535 | Plastic | 1.582 | 30.2 | −7.44 |
| 12 | | −120.7182 | (ASP) | 0.074 | | | | |
| 13 | Lens 6 | 4.1276 | (ASP) | 1.081 | Plastic | 1.544 | 56.0 | 2.37 |
| 14 | | −1.6989 | (ASP) | 0.227 | | | | |
| 15 | Lens 7 | 13.5886 | (ASP) | 0.666 | Plastic | 1.534 | 55.9 | −2.62 |
| 16 | | 1.2479 | (ASP) | 1.000 | | | | |
| 17 | Filter | Plano | | 0.210 | Glass | 1.517 | 64.2 | — |
| 18 | | Plano | | 0.363 | | | | |
| 19 | Image | Plano | | — | | | | |

Note:
Reference wavelength is 587.6 nm (d-line).
An effective radius of the stop 301 (Surface 6) is 1.330 mm.

TABLE 6

Aspheric Coefficients

| Surface # | 1 | 2 | 4 | 5 | 7 |
|---|---|---|---|---|---|
| k= | 6.33193E−02 | 6.13604E+00 | 1.10818E+01 | 0.00000E+00 | 0.00000E+00 |
| A4= | −1.47678934E−02 | −3.78139069E−02 | −2.30668594E−02 | 1.19256231E−02 | −7.81726017E−03 |
| A6= | −9.88613388E−03 | −4.27852304E−03 | −3.82268752E−03 | −4.69724150E−02 | 2.44661128E−03 |
| A8= | 8.06287279E−03 | −6.55802069E−03 | −1.58200841E−04 | 4.67478108E−02 | −2.31151703E−02 |
| A10= | −7.86083906E−03 | 1.63420867E−03 | 3.98917418E−04 | −3.52231394E−02 | 2.89067142E−02 |
| A12= | 3.06010305E−03 | 9.90616369E−04 | 8.41584587E−04 | 1.87556104E−02 | −1.83836480E−02 |
| A14= | −3.42962339E−04 | −3.25313777E−04 | −1.56258057E−04 | −5.93864383E−03 | 5.89423455E−03 |
| A16= | — | — | — | 8.10483554E−04 | −7.88059582E−04 |

| Surface # | 8 | 9 | 10 | 11 | 12 |
|---|---|---|---|---|---|
| k= | 0.00000E+00 | −9.19259E+01 | 0.00000E+00 | 0.00000E+00 | 0.00000E+00 |
| A4= | −3.54510485E−02 | 8.63212468E−03 | −6.80604067E−02 | 1.45222179E−02 | −1.09480857E−02 |
| A6= | 3.62188414E−02 | −4.34496395E−02 | 6.32778886E−02 | −2.70565020E−02 | −3.68637724E−02 |
| A8= | −4.36315867E−02 | 6.77197504E−03 | −8.69867010E−02 | 4.19388531E−02 | 7.04178915E−03 |
| A10= | 3.19347846E−02 | 2.23164411E−02 | 7.67486605E−02 | −5.21136401E−02 | 4.76645239E−03 |
| A12= | −1.47223863E−02 | −2.47569826E−02 | −4.36149443E−02 | 4.16638096E−02 | −3.08597971E−03 |
| A14= | 3.76854898E−03 | 1.09703112E−02 | 1.58867573E−02 | −1.91905532E−02 | 8.12604874E−04 |
| A16= | −4.27203470E−04 | −2.14882942E−03 | −3.60661614E−03 | 4.92917117E−03 | −1.02522489E−04 |
| A18= | — | 1.35759313E−04 | 4.59966994E−04 | −6.57085693E−04 | 4.98594809E−06 |
| A20= | — | — | −2.46654559E−05 | 3.54586288E−05 | — |

| Surface # | 13 | 14 | 15 | 16 |
|---|---|---|---|---|
| k= | 0.00000E+00 | −7.13106E+00 | 0.00000E+00 | −4.47643E+00 |
| A4= | 9.93486739E−03 | −1.95241766E−02 | −6.18390877E−02 | −3.74746463E−02 |
| A6= | −1.81125255E−02 | 4.36623070E−02 | 9.02309617E−03 | 1.04492955E−02 |
| A8= | 8.27135431E−03 | −1.78891917E−02 | 6.17393493E−04 | −2.05213313E−03 |
| A10= | −2.38239677E−03 | 3.63522871E−03 | −3.32155950E−05 | 2.73777879E−04 |
| A12= | 3.71640333E−04 | −4.38715035E−04 | 4.35895966E−05 | −2.43281091E−05 |
| A14= | −3.01779402E−05 | 3.30623775E−05 | −2.88040120E−06 | 1.40647238E−06 |
| A16= | 1.17239370E−06 | −1.53772127E−06 | 9.84645187E−08 | −5.07047947E−08 |
| A18= | −1.61126045E−08 | 4.08260802E−08 | −1.38986902E−09 | 1.03534494E−09 |
| A20= | — | −4.82962933E−10 | — | −9.14667554E−12 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 5.14 | TD/EPD | 2.13 |
| Fno | 1.90 | TL/f | 1.43 |
| HFOV [deg.] | 45.1 | |R4/R3| | 0.59 |
| (V1 + V2 + V6 + V7)/ (V3 + V4 + V5) | 3.24 | f/CT6 | 4.75 |
| V3 + V4 + V5 | 69.1 | |f/f4| | 0.03 |
| (V3 + V4 + V5)/V6 | 1.24 | f/R1 | 1.75 |
| (V3 + V4 + V5)/(V6 + V7) | 0.62 | f/|R11| + f/|R12| | 4.27 |
| CT1/CT5 | 0.71 | f2/f6 | 2.35 |
| CT1/T12 | 1.12 | f6/CT6 | 2.19 |
| (CT1 + CT2)/T12 | 3.72 | ImgH/f | 1.02 |
| (CT3 + CT4)/T34 | 0.88 | Y11/Y72 | 0.35 |
| CT6/T67 | 4.76 | Yc61/Y61 | 0.65 |
| T12/T67 | 1.49 | Yc72/Y72 | 0.61 |
| T34/T45 | 1.73 | — | — |

4th Embodiment

Figure 7:
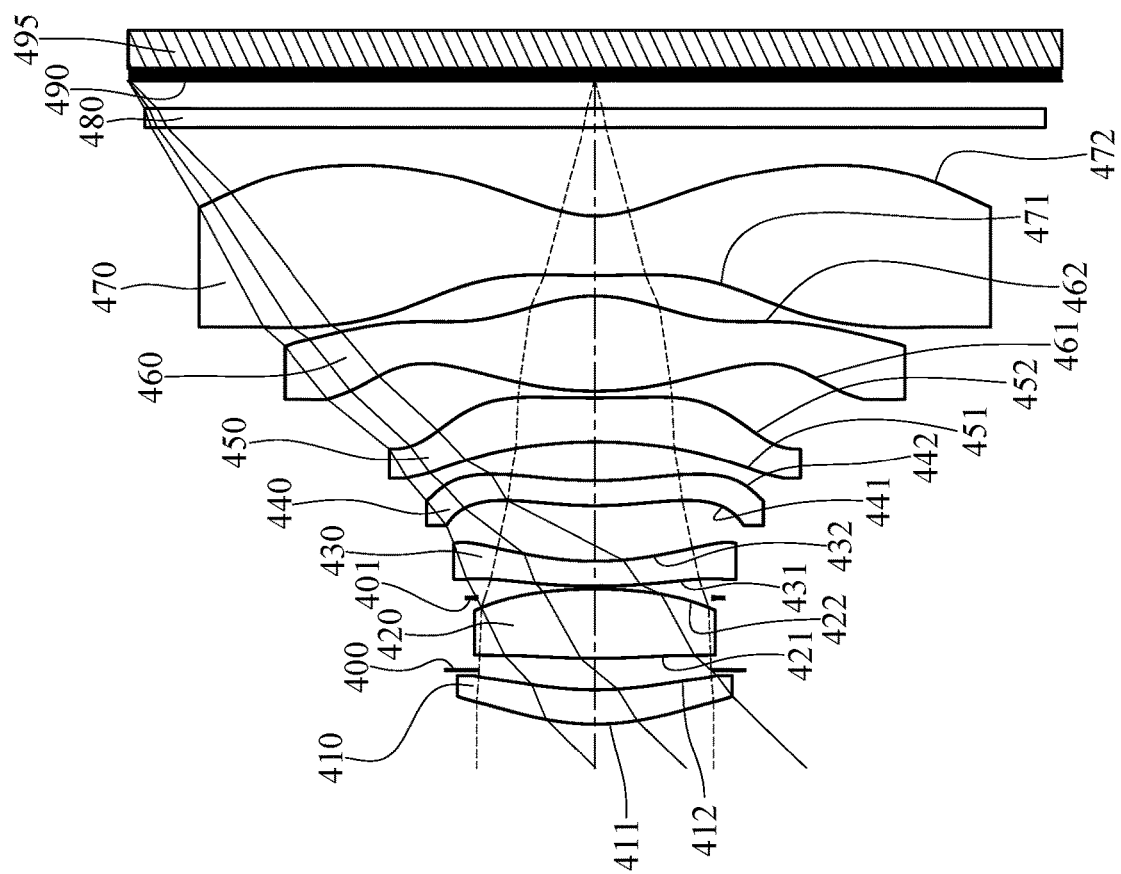
FIG. 7 is a schematic view of an image capturing unit according to the 4th embodiment of the present disclosure.
Figure 8:
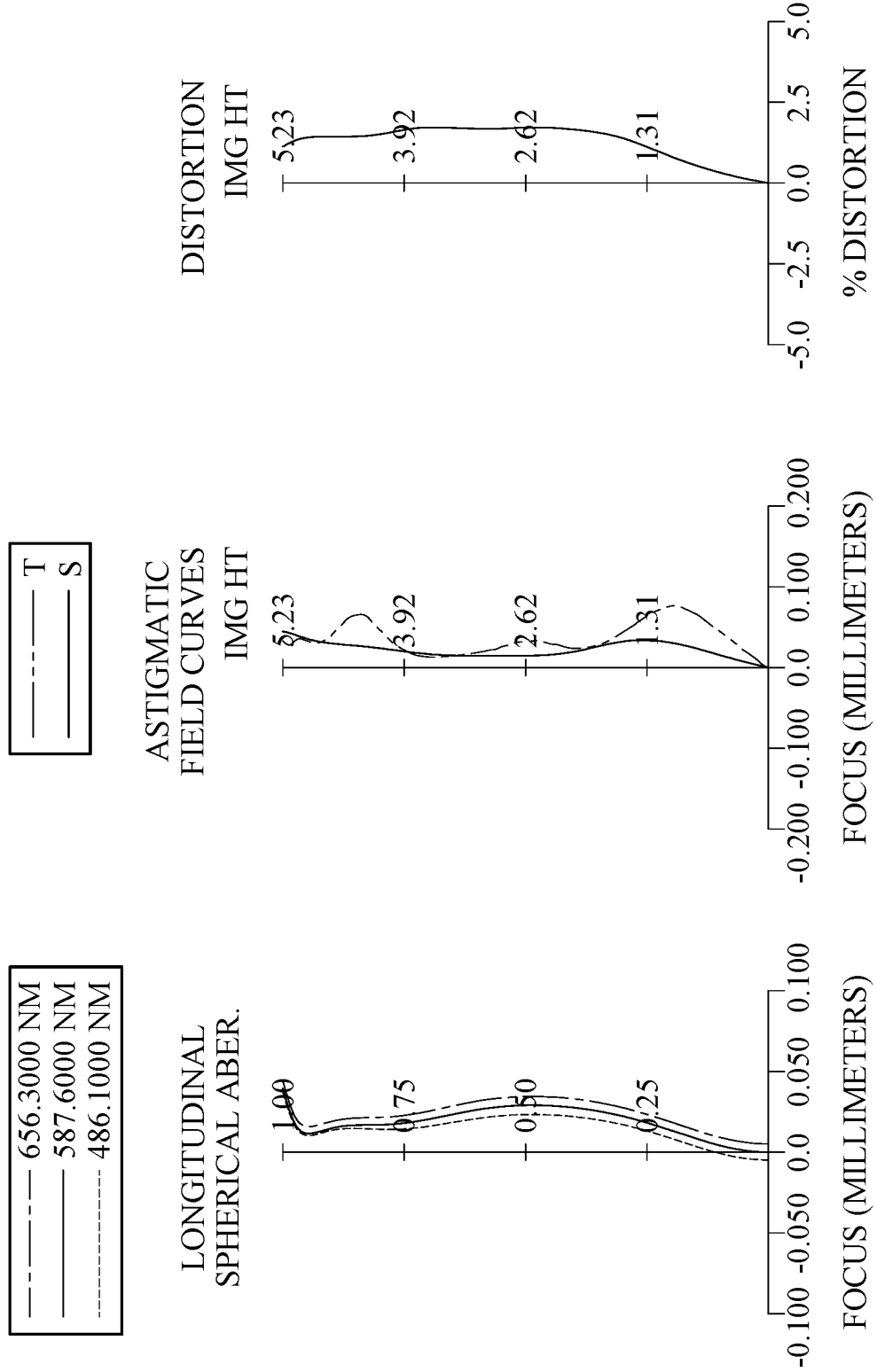
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the imaging lens assembly (its reference numeral is omitted) of the present disclosure and an image sensor 495. The imaging lens assembly includes, in order from an object side to an image side along an optical path, a first lens element 410, an aperture stop 400, a second lens element 420, a stop 401, a third lens element 430, a fourth lens element 440, a fifth lens element 450, a sixth lens element 460, a seventh lens element 470, a filter 480 and an image surface 490. The imaging lens assembly includes seven lens elements (410, 420, 430, 440, 450, 460 and 470) with no additional lens element disposed between each of the adjacent seven lens elements.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric. The object-side surface 411 of the first lens element 410 has two inflection points. The image-side surface 412 of the first lens element 410 has two inflection points.

The second lens element 420 with positive refractive power has an object-side surface 421 being convex in a paraxial region thereof and an image-side surface 422 being convex in a paraxial region thereof. The second lens element 420 is made of plastic material and has the object-side surface 421 and the image-side surface 422 being both aspheric. The object-side surface 421 of the second lens element 420 has two inflection points.

The third lens element 430 with negative refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric. The object-side surface 431 of the third lens element 430 has one inflection point. The image-side surface 432 of the third lens element 430 has one inflection point. The object-side surface 431 of the third lens element 430 has one critical point in an off-axis region thereof. The image-side surface 432 of the third lens element 430 has one critical point in an off-axis region thereof.

The fourth lens element 440 with positive refractive power has an object-side surface 441 being convex in a paraxial region thereof and an image-side surface 442 being concave in a paraxial region thereof. The fourth lens element 440 is made of plastic material and has the object-side surface 441 and the image-side surface 442 being both aspheric. The object-side surface 441 of the fourth lens element 440 has one inflection point. The image-side surface 442 of the fourth lens element 440 has two inflection points. The object-side surface 441 of the fourth lens element 440 has one critical point in an off-axis region thereof. The image-side surface 442 of the fourth lens element 440 has one critical point in an off-axis region thereof.

The fifth lens element 450 with negative refractive power has an object-side surface 451 being concave in a paraxial region thereof and an image-side surface 452 being concave in a paraxial region thereof. The fifth lens element 450 is made of plastic material and has the object-side surface 451 and the image-side surface 452 being both aspheric. The object-side surface 451 of the fifth lens element 450 has two inflection points. The image-side surface 452 of the fifth lens element 450 has three inflection points. The image-side surface 452 of the fifth lens element 450 has one critical point in an off-axis region thereof.

The sixth lens element 460 with positive refractive power has an object-side surface 461 being convex in a paraxial region thereof and an image-side surface 462 being convex in a paraxial region thereof. The sixth lens element 460 is made of plastic material and has the object-side surface 461 and the image-side surface 462 being both aspheric. The object-side surface 461 of the sixth lens element 460 has three inflection points. The image-side surface 462 of the sixth lens element 460 has four inflection points. The object-side surface 461 of the sixth lens element 460 has one critical point in an off-axis region thereof. The image-side surface 462 of the sixth lens element 460 has two critical points in an off-axis region thereof.

The seventh lens element 470 with negative refractive power has an object-side surface 471 being convex in a paraxial region thereof and an image-side surface 472 being concave in a paraxial region thereof. The seventh lens element 470 is made of plastic material and has the object-side surface 471 and the image-side surface 472 being both aspheric. The object-side surface 471 of the seventh lens element 470 has two inflection points. The image-side surface 472 of the seventh lens element 470 has two inflection points. The object-side surface 471 of the seventh lens element 470 has two critical points in an off-axis region thereof. The image-side surface 472 of the seventh lens element 470 has one critical point in an off-axis region thereof.

The filter 480 is made of glass material and located between the seventh lens element 470 and the image surface 490, and will not affect the focal length of the imaging lens assembly. The image sensor 495 is disposed on or near the image surface 490 of the imaging lens assembly.

The detailed optical data of the 4th embodiment are shown in Table 7 and the aspheric surface data are shown in Table 8 below.

TABLE 7

4th Embodiment
f = 5.06 mm, Fno = 1.90, HFOV = 45.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.9056 | (ASP) | 0.385 | Plastic | 1.545 | 56.1 | 17.39 |
| 2 | | 3.9948 | (ASP) | 0.220 | | | | |
| 3 | Ape. Stop | Plano | | 0.134 | | | | |
| 4 | Lens 2 | 8.9127 | (ASP) | 0.779 | Plastic | 1.545 | 56.1 | 5.70 |
| 5 | | −4.6210 | (ASP) | −0.104 | | | | |
| 6 | Stop | Plano | | 0.134 | | | | |
| 7 | Lens 3 | 6.6684 | (ASP) | 0.277 | Plastic | 1.686 | 18.4 | −10.17 |
| 8 | | 3.3518 | (ASP) | 0.625 | | | | |
| 9 | Lens 4 | 4.4642 | (ASP) | 0.280 | Plastic | 1.686 | 18.4 | 85.13 |
| 10 | | 4.7103 | (ASP) | 0.441 | | | | |
| 11 | Lens 5 | −5.0230 | (ASP) | 0.495 | Plastic | 1.566 | 37.4 | −6.98 |
| 12 | | 19.1330 | (ASP) | 0.075 | | | | |
| 13 | Lens 6 | 3.9738 | (ASP) | 1.064 | Plastic | 1.544 | 56.0 | 2.34 |
| 14 | | −1.6968 | (ASP) | 0.233 | | | | |
| 15 | Lens 7 | 12.8572 | (ASP) | 0.664 | Plastic | 1.534 | 55.9 | −2.61 |
| 16 | | 1.2347 | (ASP) | 1.000 | | | | |
| 17 | Filter | Plano | | 0.210 | Glass | 1.517 | 64.2 | — |
| 18 | | Plano | | 0.312 | | | | |
| 19 | Image | Plano | | — | | | | |

Note:
Reference wavelength is 587.6 nm (d-line).
An effective radius of the stop 401 (Surface 6) is 1.330 mm.

TABLE 8

| Aspheric Coefficients | | | | | |
|---|---|---|---|---|---|
| Surface # | 1 | 2 | 4 | 5 | 7 |
| k= | 2.54285E−01 | 6.38697E+00 | 1.11020E+01 | 0.00000E+00 | 0.00000E+00 |
| A4= | −1.28148395E−02 | −3.48467207E−02 | −2.20301247E−02 | 9.30442705E−03 | −1.48280881E−02 |
| A6= | −1.07854779E−02 | −4.80846265E−03 | −8.28419254E−03 | −2.86720560E−02 | 2.15997075E−02 |
| A8= | 8.08358847E−03 | −7.03713412E−03 | 4.91975601E−03 | 1.26749402E−02 | −4.24799529E−02 |
| A10= | −7.04462152E−03 | 2.58070339E−03 | −2.53712997E−03 | −7.29849658E−04 | 4.19955127E−02 |
| A12= | 2.52436214E−03 | 2.71944024E−04 | 1.54156706E−03 | −1.72272090E−03 | −2.49484531E−02 |
| A14= | −2.36114887E−04 | −1.59084441E−04 | −1.08972534E−04 | 6.40727153E−04 | 7.98120934E−03 |
| A16= | — | — | — | −5.22604313E−05 | −1.07473715E−03 |

| Surface # | 8 | 9 | 10 | 11 | 12 |
|---|---|---|---|---|---|
| k= | 0.00000E+00 | −7.14370E+01 | 0.00000E+00 | 0.00000E+00 | 0.00000E+00 |
| A4= | −4.51700515E−02 | 1.63705208E−02 | −4.82795272E−02 | 2.17854039E−02 | 1.74444849E−03 |
| A6= | 4.82550000E−02 | −2.69547723E−02 | 4.68422299E−02 | −3.14207116E−02 | −5.50614697E−02 |
| A8= | −5.09345078E−02 | −3.54166423E−02 | −8.44144400E−02 | 2.95464449E−02 | 1.86008483E−02 |
| A10= | 3.44599651E−02 | 6.81489937E−02 | 8.02667576E−02 | −2.77372505E−02 | −2.44211479E−04 |
| A12= | −1.54767169E−02 | −5.23859097E−02 | −4.54851654E−02 | 1.94326152E−02 | −1.56743432E−03 |
| A14= | 3.98443854E−03 | 2.11255721E−02 | 1.55740833E−02 | −8.24407430E−03 | 5.20723070E−04 |
| A16= | −4.54526761E−04 | −4.37419617E−03 | −3.11035623E−03 | 1.98951131E−03 | −7.20380745E−05 |
| A18= | — | 3.58747951E−04 | 3.17320881E−04 | −2.51459797E−04 | 3.69604057E−06 |
| A20= | — | — | −1.11063492E−05 | 1.29140519E−05 | — |

| Surface # | 13 | 14 | 15 | 16 |
|---|---|---|---|---|
| k= | 0.00000E+00 | −6.99740E+00 | 0.00000E+00 | −4.32277E+00 |
| A4= | 1.80094084E−02 | −1.87473909E−02 | −6.03588060E−02 | −3.91639079E−02 |
| A6= | −2.62397657E−02 | 4.45425714E−02 | 6.26707284E−03 | 1.11788257E−02 |
| A8= | 1.18740423E−02 | −1.80869139E−02 | 1.51116568E−03 | −2.24434146E−03 |
| A10= | −3.34968352E−03 | 3.52376889E−03 | −4.51609964E−04 | 3.05305364E−04 |
| A12= | 5.29709139E−04 | −3.82156492E−04 | 5.04326471E−05 | −2.75141052E−05 |
| A14= | −4.51335642E−05 | 2.26920210E−05 | −2.92976989E−06 | 1.59859750E−06 |
| A16= | 1.91721510E−06 | −5.84724818E−07 | 8.78528387E−08 | −5.72459397E−08 |
| A18= | −3.11455480E−08 | −3.29605167E−09 | −1.07539537E−09 | 1.14622778E−09 |
| A20= | — | 3.39201715E−10 | — | −9.79947679E−12 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 5.06 | TD/EPD | 2.14 |
| Fno | 1.90 | TL/f | 1.43 |
| HFOV [deg.] | 45.6 | |R4/R3| | 0.52 |
| (V1 + V2 + V6 + V7)/(V3 + V4 + V5) | 3.02 | f/CT6 | 4.75 |
| V3 + V4 + V5 | 74.2 | |f/f4| | 0.06 |
| (V3 + V4 + V5)/V6 | 1.33 | f/R1 | 1.74 |
| (V3 + V4 + V5)/(V6 + V7) | 0.66 | f/|R11| + f/|R12| | 4.25 |
| CT1/CT5 | 0.78 | f2/f6 | 2.44 |
| CT1/T12 | 1.09 | f6/CT6 | 2.20 |
| (CT1 + CT2)/T12 | 3.29 | ImgH/f | 1.03 |
| (CT3 + CT4)/T34 | 0.89 | Y11/Y72 | 0.35 |
| CT6/T67 | 4.57 | Yc61/Y61 | 0.64 |
| T12/T67 | 1.52 | Yc72/Y72 | 0.60 |
| T34/T45 | 1.42 | — | — |

5th Embodiment

Figure 9:
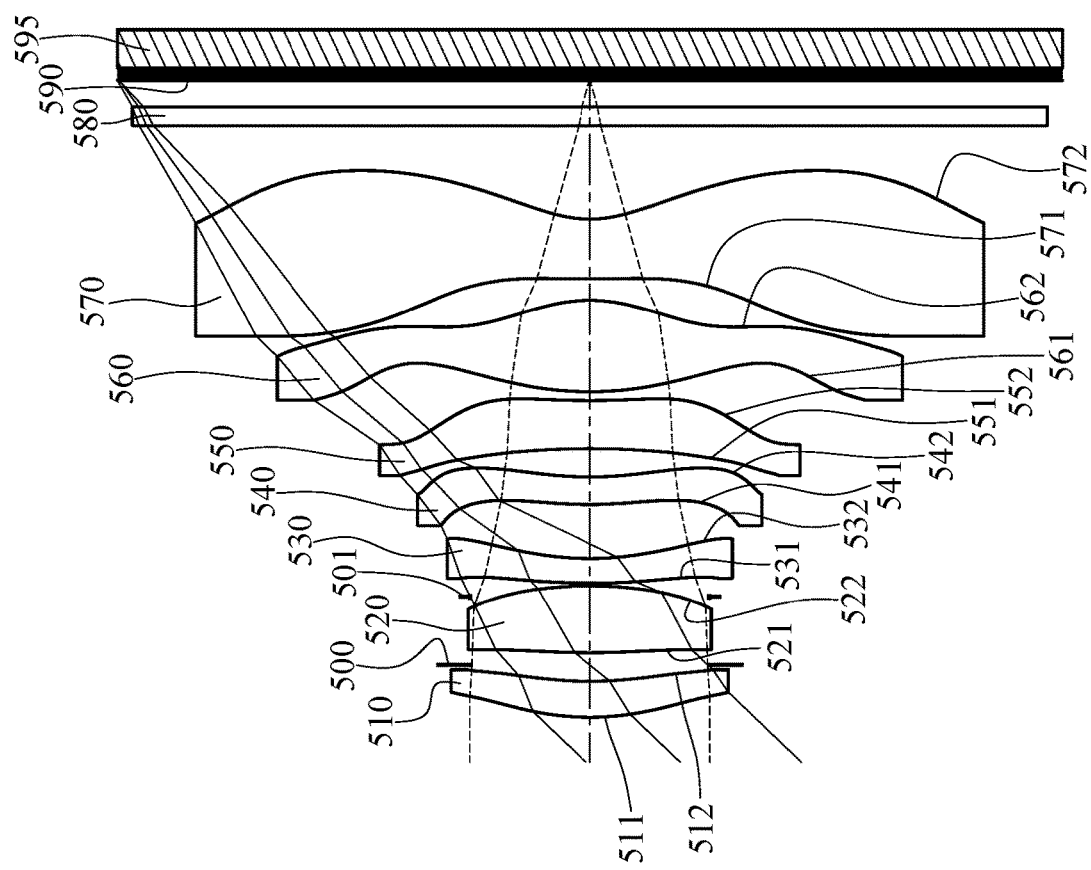
FIG. 9 is a schematic view of an image capturing unit according to the 5th embodiment of the present disclosure.
Figure 10:
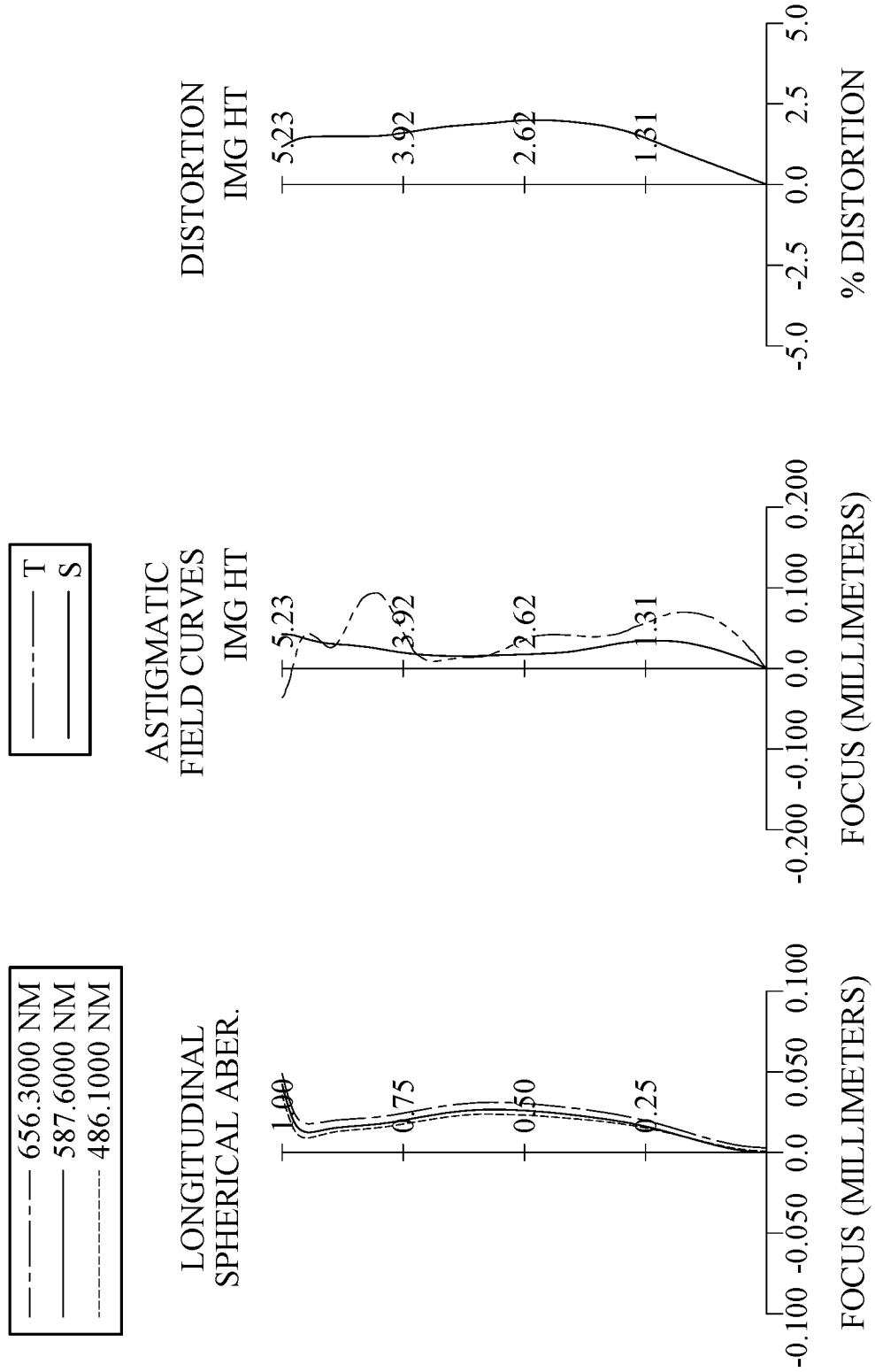
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the imaging lens assembly (its reference numeral is omitted) of the present disclosure and an image sensor 595. The imaging lens assembly includes, in order from an object side to an image side along an optical path, a first lens element 510, an aperture stop 500, a second lens element 520, a stop 501, a third lens element 530, a fourth lens element 540, a fifth lens element 550, a sixth lens element 560, a seventh lens element 570, a filter 580 and an image surface 590. The imaging lens assembly includes seven lens elements (510, 520, 530, 540, 550, 560 and 570) with no additional lens element disposed between each of the adjacent seven lens elements.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric. The object-side surface 511 of the first lens element 510 has two inflection points. The image-side surface 512 of the first lens element 510 has two inflection points.

The second lens element 520 with positive refractive power has an object-side surface 521 being convex in a paraxial region thereof and an image-side surface 522 being convex in a paraxial region thereof. The second lens element 520 is made of plastic material and has the object-side surface 521 and the image-side surface 522 being both aspheric. The object-side surface 521 of the second lens element 520 has two inflection points. The object-side surface 521 of the second lens element 520 has two critical points in an off-axis region thereof.

The third lens element 530 with negative refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric. The object-side surface 531 of the third lens element 530 has one inflection point. The image-side surface 532 of the third lens element 530 has one inflection point. The object-side surface 531 of the third lens element 530 has one critical point in an off-axis region thereof. The image-side surface 532 of the third lens element 530 has one critical point in an off-axis region thereof.

The fourth lens element 540 with negative refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric. The object-side surface 541 of the fourth lens element 540 has one inflection point. The image-side surface 542 of the fourth lens element 540 has two inflection points. The object-side surface 541 of the fourth lens element 540 has one critical point in an off-axis region thereof. The image-side surface 542 of the fourth lens element 540 has one critical point in an off-axis region thereof.

The fifth lens element 550 with negative refractive power has an object-side surface 551 being concave in a paraxial region thereof and an image-side surface 552 being concave in a paraxial region thereof. The fifth lens element 550 is made of plastic material and has the object-side surface 551 and the image-side surface 552 being both aspheric. The object-side surface 551 of the fifth lens element 550 has two inflection points. The image-side surface 552 of the fifth lens element 550 has three inflection points. The image-side surface 552 of the fifth lens element 550 has one critical point in an off-axis region thereof.

The sixth lens element 560 with positive refractive power has an object-side surface 561 being convex in a paraxial region thereof and an image-side surface 562 being convex in a paraxial region thereof. The sixth lens element 560 is made of plastic material and has the object-side surface 561 and the image-side surface 562 being both aspheric. The object-side surface 561 of the sixth lens element 560 has three inflection points. The image-side surface 562 of the sixth lens element 560 has four inflection points. The object-side surface 561 of the sixth lens element 560 has one critical point in an off-axis region thereof. The image-side surface 562 of the sixth lens element 560 has two critical points in an off-axis region thereof.

The seventh lens element 570 with negative refractive power has an object-side surface 571 being convex in a paraxial region thereof and an image-side surface 572 being concave in a paraxial region thereof. The seventh lens element 570 is made of plastic material and has the object-side surface 571 and the image-side surface 572 being both aspheric. The object-side surface 571 of the seventh lens element 570 has three inflection points. The image-side surface 572 of the seventh lens element 570 has two inflection points. The object-side surface 571 of the seventh lens element 570 has three critical points in an off-axis region thereof. The image-side surface 572 of the seventh lens element 570 has one critical point in an off-axis region thereof.

The filter 580 is made of glass material and located between the seventh lens element 570 and the image surface 590, and will not affect the focal length of the imaging lens assembly. The image sensor 595 is disposed on or near the image surface 590 of the imaging lens assembly.

The detailed optical data of the 5th embodiment are shown in Table 9 and the aspheric surface data are shown in Table 10 below.

TABLE 9

5th Embodiment
f = 4.94 mm, Fno = 1.85, HFOV = 46.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.9726 | (ASP) | 0.400 | Plastic | 1.545 | 56.1 | 16.52 |
| 2 | | 4.2274 | (ASP) | 0.183 | | | | |
| 3 | Ape. Stop | Plano | | 0.137 | | | | |
| 4 | Lens 2 | 8.5870 | (ASP) | 0.747 | Plastic | 1.544 | 56.0 | 5.39 |
| 5 | | −4.3107 | (ASP) | −0.124 | | | | |
| 6 | Stop | Plano | | 0.154 | | | | |
| 7 | Lens 3 | 7.2717 | (ASP) | 0.274 | Plastic | 1.669 | 19.5 | −9.20 |
| 8 | | 3.2837 | (ASP) | 0.600 | | | | |
| 9 | Lens 4 | 4.4977 | (ASP) | 0.307 | Plastic | 1.587 | 28.3 | −84.69 |
| 10 | | 4.0205 | (ASP) | 0.314 | | | | |
| 11 | Lens 5 | −7.8603 | (ASP) | 0.536 | Plastic | 1.566 | 37.4 | −7.83 |
| 12 | | 10.4273 | (ASP) | 0.097 | | | | |
| 13 | Lens 6 | 3.9703 | (ASP) | 1.020 | Plastic | 1.544 | 56.0 | 2.28 |
| 14 | | −1.6405 | (ASP) | 0.240 | | | | |
| 15 | Lens 7 | 14.5071 | (ASP) | 0.662 | Plastic | 1.534 | 55.9 | −2.62 |
| 16 | | 1.2542 | (ASP) | 1.043 | | | | |
| 17 | Filter | Plano | | 0.210 | Glass | 1.517 | 64.2 | — |
| 18 | | Plano | | 0.292 | | | | |
| 19 | Image | Plano | | — | | | | |

Note:
Reference wavelength is 587.6 nm (d-line).
An effective radius of the stop 501 (Surface 6) is 1.330 mm.

TABLE 10

Aspheric Coefficients

| Surface # | 1 | 2 | 4 | 5 | 7 |
|---|---|---|---|---|---|
| k= | −5.40449E−03 | 7.26621E+00 | 5.71304E+00 | 0.00000E+00 | 0.00000E+00 |
| A4= | −1.10865728E−02 | −3.77669321E−02 | −2.39533682E−02 | 2.73195582E−02 | 2.28229010E−03 |
| A6= | −1.69718548E−02 | −6.14215554E−03 | −7.65623216E−03 | −8.86678573E−02 | −3.09248117E−02 |
| A8= | 1.68077278E−02 | −4.80579369E−03 | 3.17057821E−03 | 1.07656829E−01 | 3.13051993E−02 |
| A10= | −1.39509770E−02 | −6.43845614E−06 | −8.81844206E−04 | −8.77842832E−02 | −2.01404953E−02 |
| A12= | 5.09567969E−03 | 1.75033041E−03 | 1.02336319E−03 | 4.48817197E−02 | 5.96003953E−03 |
| A14= | −6.08549819E−04 | −4.61193310E−04 | −7.73137428E−05 | −1.28756088E−02 | −3.86473505E−04 |
| A16= | — | — | — | 1.58228684E−03 | −1.19176921E−04 |

| Surface # | 8 | 9 | 10 | 11 | 12 |
|---|---|---|---|---|---|
| k= | 0.00000E+00 | −9.50000E+01 | 0.00000E+00 | 0.00000E+00 | 0.00000E+00 |
| A4= | −3.94222169E−02 | 4.17300416E−02 | −2.91405221E−02 | 4.36884639E−02 | 8.24194856E−03 |
| A6= | 3.44974445E−02 | −1.24276229E−01 | −2.02347590E−02 | −8.72317845E−02 | −8.23522361E−02 |
| A8= | −3.47285913E−02 | 1.04336338E−01 | 6.08782673E−03 | 9.20176367E−02 | 4.44827311E−02 |
| A10= | 2.20408772E−02 | −4.41930034E−02 | 1.05572192E−02 | −6.77801981E−02 | −1.38487502E−02 |
| A12= | −9.58337432E−03 | −6.07597975E−04 | −1.12920617E−02 | 3.70785293E−02 | 2.85184813E−03 |
| A14= | 2.45295457E−03 | 8.41135169E−03 | 4.83342501E−03 | −1.38676949E−02 | −3.30187109E−04 |
| A16= | −2.84764739E−04 | −3.03837186E−03 | −1.05562796E−03 | 3.17915954E−03 | 1.54433017E−05 |
| A18= | — | 3.42555594E−04 | 1.02418887E−04 | −3.94684367E−04 | 1.73633655E−08 |
| A20= | — | — | −1.82051366E−06 | 2.01949261E−05 | — |

| Surface # | 13 | 14 | 15 | 16 |
|---|---|---|---|---|
| k= | 0.00000E+00 | −7.14374E+00 | 0.00000E+00 | −4.30919E+00 |
| A4= | 1.89329058E−02 | −3.69412992E−02 | −6.16761174E−02 | −4.12321579E−02 |
| A6= | −2.82432233E−02 | 6.00316427E−02 | 6.15307148E−03 | 1.17186578E−02 |
| A8= | 1.37528298E−02 | −2.38814463E−02 | 1.76769554E−03 | −2.33252625E−03 |
| A10= | −4.08288852E−03 | 4.76271281E−03 | −5.28924264E−04 | 3.15486219E−04 |
| A12= | 6.75679797E−04 | −5.49088177E−04 | 6.13866223E−05 | −2.86169923E−05 |
| A14= | −6.10052303E−05 | 3.72134266E−05 | −3.74753443E−06 | 1.69463270E−06 |
| A16= | 2.82144786E−06 | −1.37830356E−06 | 1.18871313E−07 | −6.25135540E−08 |
| A18= | −5.23554633E−08 | 2.15094521E−08 | −1.54718552E−09 | 1.30195816E−09 |
| A20= | — | 2.59404148E−13 | — | −1.16890212E−11 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 4.94 | TD/EPD | 2.08 |
| Fno | 1.85 | TL/f | 1.44 |
| HFOV [deg.] | 46.2 | |R4/R3| | 0.50 |
| (V1 + V2 + V6 + V7)/ (V3 + V4 + V5) | 2.63 | f/CT6 | 4.84 |
| V3 + V4 + V5 | 85.2 | |f/f4| | 0.06 |
| (V3 + V4 + V5)/V6 | 1.52 | f/R1 | 1.66 |
| (V3 + V4 + V5)/(V6 + V7) | 0.76 | f/|R11| + f/|R12| | 4.26 |
| CT1/CT5 | 0.75 | f2/f6 | 2.36 |
| CT1/T12 | 1.25 | f6/CT6 | 2.24 |
| (CT1 + CT2)/T12 | 3.58 | ImgH/f | 1.06 |
| (CT3 + CT4)/T34 | 0.97 | Y11/Y72 | 0.35 |
| CT6/T67 | 4.25 | Yc61/Y61 | 0.62 |
| T12/T67 | 1.33 | Yc72/Y72 | 0.58 |
| T34/T45 | 1.91 | — | — |

6th Embodiment

Figure 11:
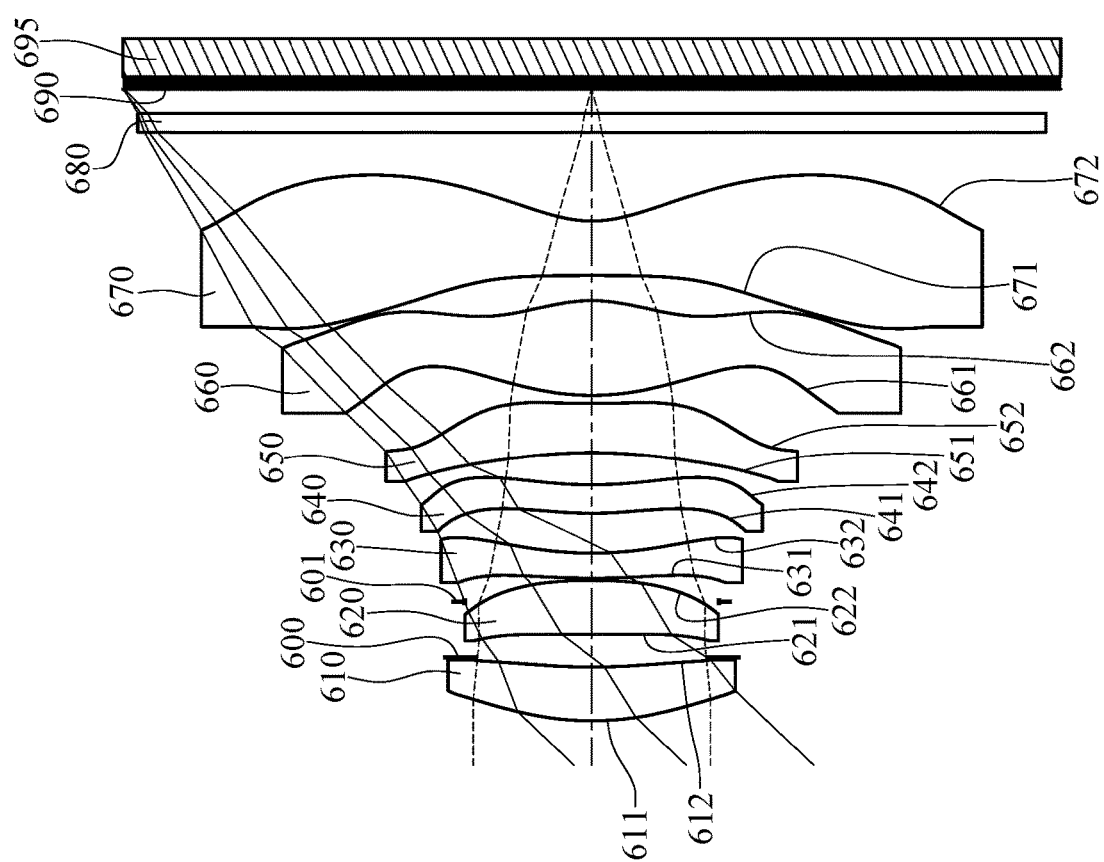
FIG. 11 is a schematic view of an image capturing unit according to the 6th embodiment of the present disclosure.
Figure 12:
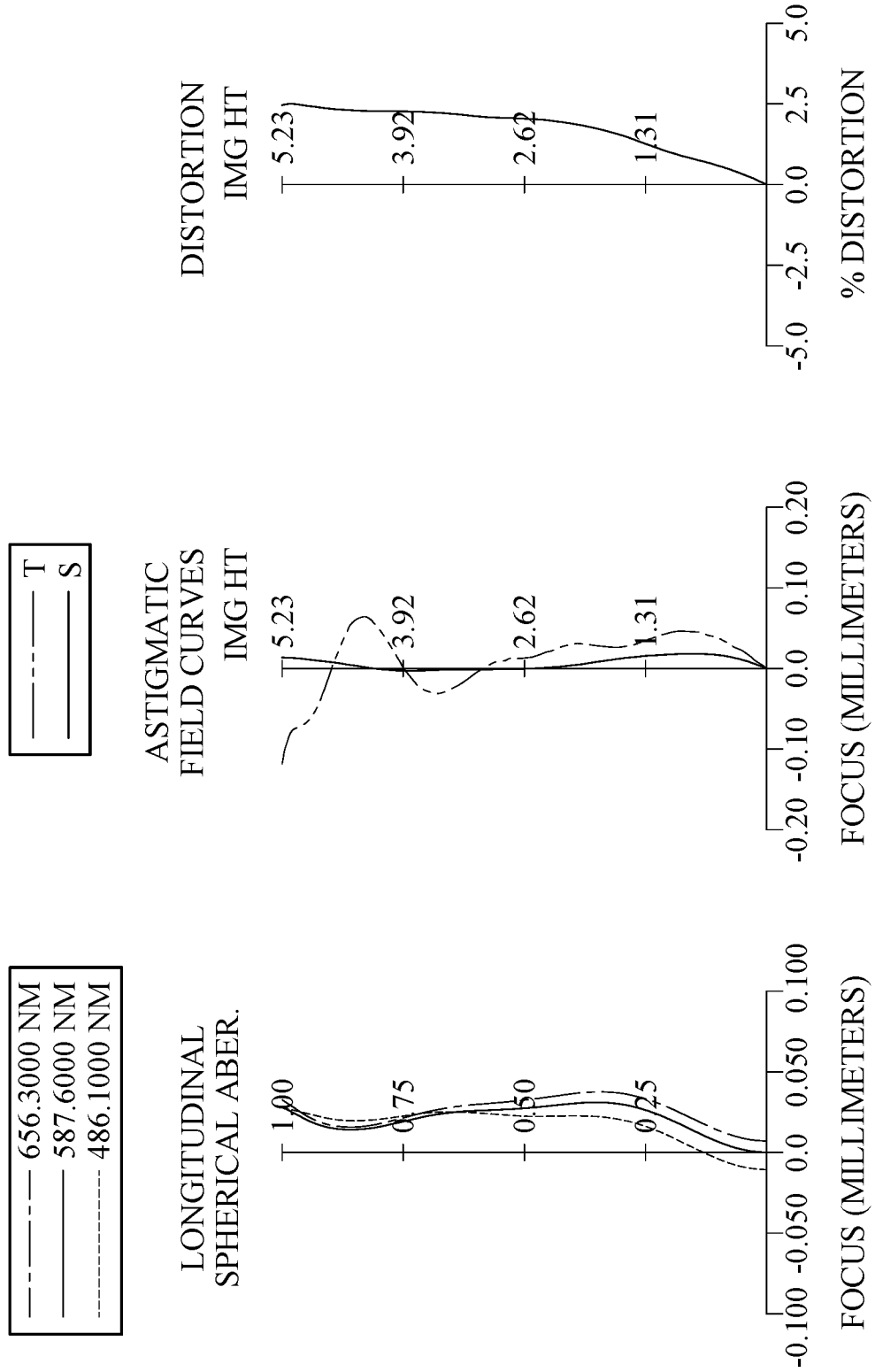
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the imaging lens assembly (its reference numeral is omitted) of the present disclosure and an image sensor 695. The imaging lens assembly includes, in order from an object side to an image side along an optical path, a first lens element 610, an aperture stop 600, a second lens element 620, a stop 601, a third lens element 630, a fourth lens element 640, a fifth lens element 650, a sixth lens element 660, a seventh lens element 670, a filter 680 and an image surface 690. The imaging lens assembly includes seven lens elements (610, 620, 630, 640, 650, 660 and 670) with no additional lens element disposed between each of the adjacent seven lens elements.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric. The image-side surface 612 of the first lens element 610 has two inflection points.

The second lens element 620 with positive refractive power has an object-side surface 621 being convex in a paraxial region thereof and an image-side surface 622 being convex in a paraxial region thereof. The second lens element 620 is made of plastic material and has the object-side surface 621 and the image-side surface 622 being both aspheric. The object-side surface 621 of the second lens element 620 has two inflection points. The object-side surface 621 of the second lens element 620 has one critical point in an off-axis region thereof.

The third lens element 630 with negative refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric. The object-side surface 631 of the third lens element 630 has one inflection point. The image-side surface 632 of the third lens element 630 has one inflection point. The object-side surface 631 of the third lens element 630 has one critical point in an off-axis region thereof. The image-side surface 632 of the third lens element 630 has one critical point in an off-axis region thereof.

The fourth lens element 640 with positive refractive power has an object-side surface 641 being convex in a paraxial region thereof and an image-side surface 642 being concave in a paraxial region thereof. The fourth lens element 640 is made of plastic material and has the object-side surface 641 and the image-side surface 642 being both aspheric. The object-side surface 641 of the fourth lens element 640 has one inflection point. The image-side surface 642 of the fourth lens element 640 has two inflection points. The object-side surface 641 of the fourth lens element 640 has one critical point in an off-axis region thereof. The image-side surface 642 of the fourth lens element 640 has one critical point in an off-axis region thereof.

The fifth lens element 650 with negative refractive power has an object-side surface 651 being concave in a paraxial region thereof and an image-side surface 652 being concave in a paraxial region thereof. The fifth lens element 650 is made of plastic material and has the object-side surface 651 and the image-side surface 652 being both aspheric. The object-side surface 651 of the fifth lens element 650 has two inflection points. The image-side surface 652 of the fifth lens element 650 has three inflection points. The image-side surface 652 of the fifth lens element 650 has one critical point in an off-axis region thereof.

The sixth lens element 660 with positive refractive power has an object-side surface 661 being convex in a paraxial region thereof and an image-side surface 662 being convex in a paraxial region thereof. The sixth lens element 660 is made of plastic material and has the object-side surface 661 and the image-side surface 662 being both aspheric. The object-side surface 661 of the sixth lens element 660 has three inflection points. The image-side surface 662 of the sixth lens element 660 has four inflection points. The object-side surface 661 of the sixth lens element 660 has one critical point in an off-axis region thereof. The image-side surface 662 of the sixth lens element 660 has two critical points in an off-axis region thereof.

The seventh lens element 670 with negative refractive power has an object-side surface 671 being concave in a paraxial region thereof and an image-side surface 672 being concave in a paraxial region thereof. The seventh lens element 670 is made of plastic material and has the object-side surface 671 and the image-side surface 672 being both aspheric. The object-side surface 671 of the seventh lens element 670 has one inflection point. The image-side surface 672 of the seventh lens element 670 has two inflection points. The object-side surface 671 of the seventh lens element 670 has one critical point in an off-axis region thereof. The image-side surface 672 of the seventh lens element 670 has one critical point in an off-axis region thereof.

The filter 680 is made of glass material and located between the seventh lens element 670 and the image surface 690, and will not affect the focal length of the imaging lens assembly. The image sensor 695 is disposed on or near the image surface 690 of the imaging lens assembly.

The detailed optical data of the 6th embodiment are shown in Table 11 and the aspheric surface data are shown in Table 12 below.

TABLE 11

6th Embodiment
f = 4.88 mm, Fno = 1.84, HFOV = 46.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.2706 | (ASP) | 0.601 | Plastic | 1.545 | 56.1 | 10.54 |
| 2 | | 7.0996 | (ASP) | 0.109 | | | | |
| 3 | Ape. Stop | Plano | | 0.251 | | | | |
| 4 | Lens 2 | 24.8155 | (ASP) | 0.605 | Plastic | 1.545 | 56.1 | 7.76 |
| 5 | | −5.0547 | (ASP) | −0.238 | | | | |
| 6 | Stop | Plano | | 0.263 | | | | |
| 7 | Lens 3 | 9.0319 | (ASP) | 0.280 | Plastic | 1.669 | 19.5 | −11.72 |
| 8 | | 4.1454 | (ASP) | 0.447 | | | | |
| 9 | Lens 4 | 4.7749 | (ASP) | 0.315 | Plastic | 1.639 | 23.5 | 292.22 |
| 10 | | 4.7743 | (ASP) | 0.364 | | | | |
| 11 | Lens 5 | −4.8708 | (ASP) | 0.554 | Plastic | 1.566 | 37.4 | −6.71 |
| 12 | | 17.9477 | (ASP) | 0.087 | | | | |
| 13 | Lens 6 | 2.9440 | (ASP) | 1.056 | Plastic | 1.544 | 56.0 | 2.16 |
| 14 | | −1.7123 | (ASP) | 0.280 | | | | |
| 15 | Lens 7 | −46.2421 | (ASP) | 0.606 | Plastic | 1.534 | 55.9 | −2.40 |
| 16 | | 1.3222 | (ASP) | 1.000 | | | | |
| 17 | Filter | Plano | | 0.210 | Glass | 1.517 | 64.2 | — |
| 18 | | Plano | | 0.269 | | | | |
| 19 | Image | Plano | | — | | | | |

Note:
Reference wavelength is 587.6 nm (d-line).
An effective radius of the stop 601 (Surface 6) is 1.420 mm.

TABLE 12

Aspheric Coefficients

| Surface # | 1 | 2 | 4 | 5 | 7 |
|---|---|---|---|---|---|
| k= | 0.00000E+00 | 0.00000E+00 | −7.31623E+01 | 2.25553E+00 | 0.00000E+00 |
| A4= | −8.01612643E−03 | −1.07186586E−02 | −2.71609618E−02 | −2.10445117E−03 | 1.18912865E−02 |
| A6= | −3.19979219E−03 | −3.37548144E−02 | −1.76942831E−02 | −1.16043806E−01 | −9.35926542E−02 |
| A8= | −5.51502769E−05 | 7.17235143E−02 | 2.50667894E−02 | 1.75127088E−01 | 1.12952301E−01 |
| A10= | 4.15525846E−04 | −9.21422308E−02 | −2.79872999E−02 | −1.51684917E−01 | −8.18574670E−02 |
| A12= | −5.25808245E−04 | 6.85915898E−02 | 2.10475378E−02 | 7.70397246E−02 | 3.35112519E−02 |
| A14= | 1.71487910E−04 | −2.70400148E−02 | −9.06135162E−03 | −2.16891128E−02 | −7.38590673E−03 |
| A16= | — | 4.50868053E−03 | 1.69815423E−03 | 2.61091786E−03 | 7.02877379E−04 |

| Surface # | 8 | 9 | 10 | 11 | 12 |
|---|---|---|---|---|---|
| k= | 0.00000E+00 | −5.18150E+01 | 0.00000E+00 | 0.00000E+00 | 0.00000E+00 |
| A4= | −5.09230792E−03 | 1.09237038E−02 | 9.23565995E−05 | 7.71132502E−02 | 6.23636144E−03 |
| A6= | −1.47064575E−02 | −6.44034840E−02 | −7.49114461E−02 | −1.22402961E−01 | −1.30001568E−01 |
| A8= | 7.71992771E−03 | 2.57963270E−02 | 7.37393478E−02 | 1.17477504E−01 | 9.82886942E−02 |
| A10= | −1.82657964E−03 | 3.71209216E−02 | −4.08433802E−02 | −7.19891901E−02 | −4.13946109E−02 |
| A12= | −8.17087476E−04 | −6.49994944E−02 | 1.17379168E−02 | 3.13968365E−02 | 1.13314911E−02 |
| A14= | 5.08592874E−04 | 4.47539390E−02 | −1.03390554E−03 | −9.98695074E−03 | −1.97938959E−03 |
| A16= | −7.67731465E−05 | −1.61661571E−02 | −3.39778413E−04 | 2.13273467E−03 | 2.10996616E−04 |
| A18= | — | 2.99290624E−03 | 9.55221814E−05 | −2.62223542E−04 | −1.27482654E−05 |
| A20= | — | −2.23375308E−04 | −6.48940236E−06 | 1.37048047E−05 | 3.49436914E−07 |

| Surface # | 13 | 14 | 15 | 16 |
|---|---|---|---|---|
| k= | 0.00000E+00 | −9.81662E+00 | 0.00000E+00 | −4.42420E+00 |
| A4= | 4.25969539E−03 | −3.06888025E−02 | −1.16055568E−02 | −4.10493019E−02 |
| A6= | −4.01329465E−02 | 1.27098005E−01 | −2.03386377E−02 | 1.35006570E−02 |
| A8= | 3.68388560E−02 | −9.82523302E−02 | 1.38331685E−02 | −3.84959577E−03 |
| A10= | −2.82780496E−02 | 4.42447650E−02 | −4.74266245E−03 | 9.29882548E−04 |
| A12= | 1.73544061E−02 | −1.38711902E−02 | 1.14198832E−03 | −1.85703929E−04 |
| A14= | −8.15184736E−03 | 3.17518590E−03 | −2.10053492E−04 | 2.91984382E−05 |
| A16= | 2.80311410E−03 | −5.35671765E−04 | 2.94191559E−05 | −3.45487301E−06 |
| A18= | −6.89483773E−04 | 6.62069319E−05 | −3.04614324E−06 | 2.98224638E−07 |
| A20= | 1.19292637E−04 | −5.89524224E−06 | 2.25966017E−07 | −1.83150833E−08 |
| A22= | −1.41416778E−05 | 3.66792910E−07 | −1.15877499E−08 | 7.75278755E−10 |
| A24= | 1.09193012E−06 | −1.50935505E−08 | 3.88804494E−10 | −2.14349166E−11 |
| A26= | −4.94197221E−08 | 3.68404129E−10 | −7.66951150E−12 | 3.47703983E−13 |
| A28= | 9.93828428E−10 | −4.03300311E−12 | 6.74060818E−14 | −2.50599855E−15 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 4.88 | TD/EPD | 2.11 |
| Fno | 1.84 | TL/f | 1.45 |
| HFOV [deg.] | 46.2 | |R4/R3| | 0.20 |
| (V1 + V2 + V6 + V7)/ (V3 + V4 + V5) | 2.79 | f/CT6 | 4.62 |
| V3 + V4 + V5 | 80.4 | |f/f4| | 0.02 |
| (V3 + V4 + V5)/V6 | 1.44 | f/R1 | 1.49 |
| (V3 + V4 + V5)/(V6 + V7) | 0.72 | f/|R11| + f/|R12| | 4.50 |
| CT1/CT5 | 1.08 | f2/f6 | 3.59 |
| CT1/T12 | 1.67 | f6/CT6 | 2.05 |
| (CT1 + CT2)/T12 | 3.35 | ImgH/f | 1.07 |
| (CT3 + CT4)/T34 | 1.33 | Y11/Y72 | 0.37 |
| CT6/T67 | 3.77 | Yc61/Y61 | 0.64 |
| T12/T67 | 1.29 | Yc72/Y72 | 0.56 |
| T34/T45 | 1.23 | — | — |

7th Embodiment

Figure 13:
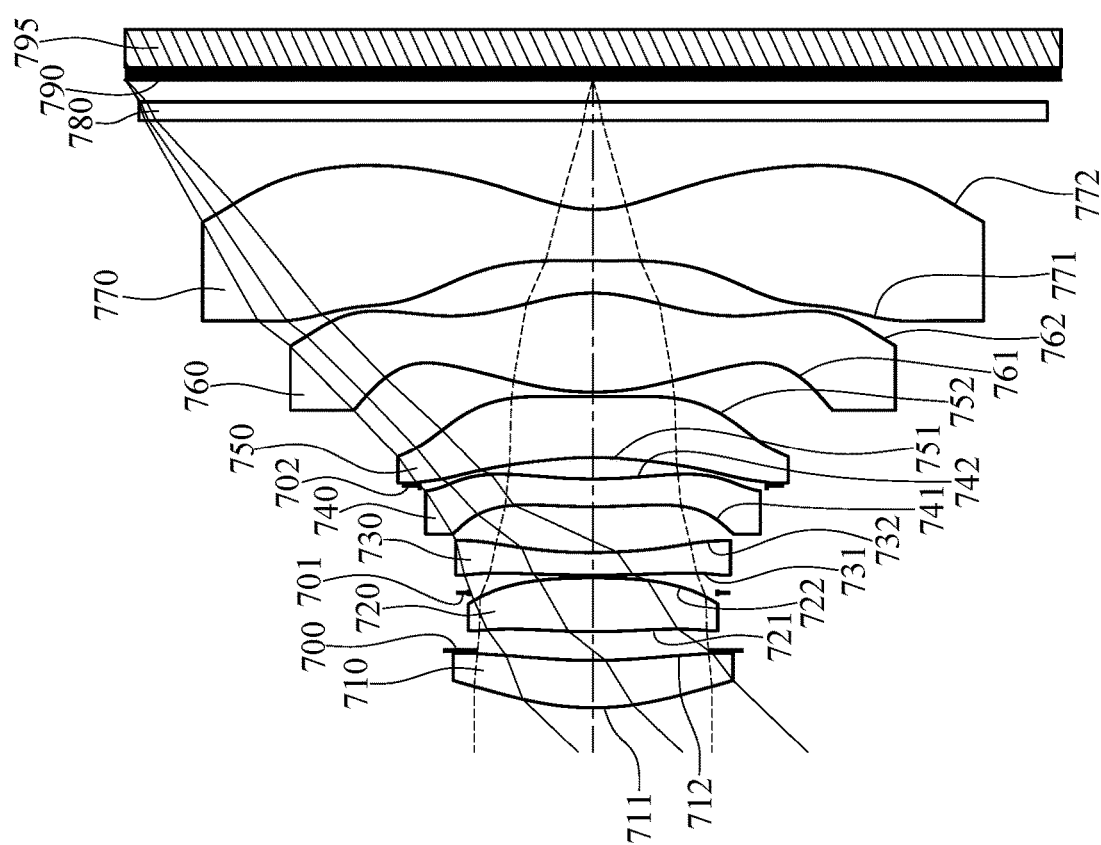
FIG. 13 is a schematic view of an image capturing unit according to the 7th embodiment of the present disclosure.
Figure 14:
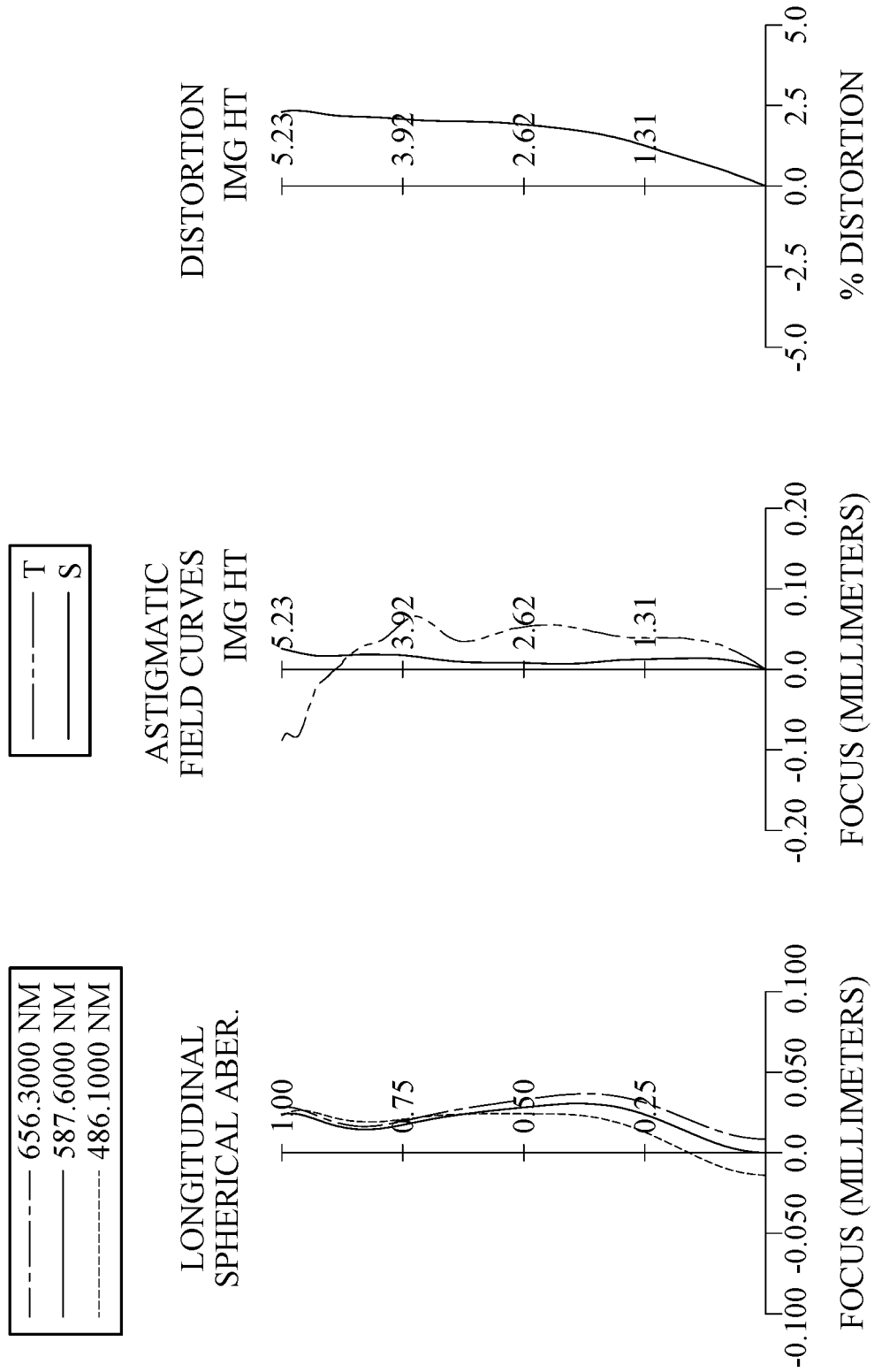
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the imaging lens assembly (its reference numeral is omitted) of the present disclosure and an image sensor 795. The imaging lens assembly includes, in order from an object side to an image side along an optical path, a first lens element 710, an aperture stop 700, a second lens element 720, a stop 701, a third lens element 730, a fourth lens element 740, a stop 702, a fifth lens element 750, a sixth lens element 760, a seventh lens element 770, a filter 780 and an image surface 790. The imaging lens assembly includes seven lens elements (710, 720, 730, 740, 750, 760 and 770) with no additional lens element disposed between each of the adjacent seven lens elements.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric. The object-side surface 711 of the first lens element 710 has two inflection points. The image-side surface 712 of the first lens element 710 has two inflection points.

The second lens element 720 with positive refractive power has an object-side surface 721 being convex in a paraxial region thereof and an image-side surface 722 being convex in a paraxial region thereof. The second lens element 720 is made of plastic material and has the object-side surface 721 and the image-side surface 722 being both aspheric. The object-side surface 721 of the second lens element 720 has two inflection points. The object-side surface 721 of the second lens element 720 has one critical point in an off-axis region thereof.

The third lens element 730 with negative refractive power has an object-side surface 731 being convex in a paraxial region thereof and an image-side surface 732 being concave in a paraxial region thereof. The third lens element 730 is made of plastic material and has the object-side surface 731 and the image-side surface 732 being both aspheric. The object-side surface 731 of the third lens element 730 has two inflection points. The image-side surface 732 of the third lens element 730 has two inflection points. The object-side surface 731 of the third lens element 730 has one critical point in an off-axis region thereof.

The fourth lens element 740 with negative refractive power has an object-side surface 741 being convex in a paraxial region thereof and an image-side surface 742 being concave in a paraxial region thereof. The fourth lens element 740 is made of plastic material and has the object-side surface 741 and the image-side surface 742 being both aspheric. The object-side surface 741 of the fourth lens element 740 has two inflection points. The image-side surface 742 of the fourth lens element 740 has two inflection points. The object-side surface 741 of the fourth lens element 740 has one critical point in an off-axis region thereof. The image-side surface 742 of the fourth lens element 740 has one critical point in an off-axis region thereof.

The fifth lens element 750 with negative refractive power has an object-side surface 751 being concave in a paraxial region thereof and an image-side surface 752 being concave in a paraxial region thereof. The fifth lens element 750 is made of plastic material and has the object-side surface 751 and the image-side surface 752 being both aspheric. The object-side surface 751 of the fifth lens element 750 has two inflection points. The image-side surface 752 of the fifth lens element 750 has two inflection points. The image-side surface 752 of the fifth lens element 750 has one critical point in an off-axis region thereof.

The sixth lens element 760 with positive refractive power has an object-side surface 761 being convex in a paraxial region thereof and an image-side surface 762 being convex in a paraxial region thereof. The sixth lens element 760 is made of plastic material and has the object-side surface 761 and the image-side surface 762 being both aspheric. The object-side surface 761 of the sixth lens element 760 has two inflection points. The image-side surface 762 of the sixth lens element 760 has three inflection points. The object-side surface 761 of the sixth lens element 760 has one critical point in an off-axis region thereof. The image-side surface 762 of the sixth lens element 760 has two critical points in an off-axis region thereof.

The seventh lens element 770 with negative refractive power has an object-side surface 771 being concave in a paraxial region thereof and an image-side surface 772 being concave in a paraxial region thereof. The seventh lens element 770 is made of plastic material and has the object-side surface 771 and the image-side surface 772 being both aspheric. The object-side surface 771 of the seventh lens element 770 has three inflection points. The image-side surface 772 of the seventh lens element 770 has two inflection points. The object-side surface 771 of the seventh lens element 770 has one critical point in an off-axis region thereof. The image-side surface 772 of the seventh lens element 770 has one critical point in an off-axis region thereof.

The filter 780 is made of glass material and located between the seventh lens element 770 and the image surface 790, and will not affect the focal length of the imaging lens assembly. The image sensor 795 is disposed on or near the image surface 790 of the imaging lens assembly.

The detailed optical data of the 7th embodiment are shown in Table 13 and the aspheric surface data are shown in Table 14 below.

TABLE 13

7th Embodiment
f = 4.92 mm, Fno = 1.85, HFOV = 46.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.1636 | (ASP) | 0.529 | Plastic | 1.545 | 56.1 | 11.00 |
| 2 | | 6.3065 | (ASP) | 0.112 | | | | |
| 3 | Ape. Stop | Plano | | 0.213 | | | | |
| 4 | Lens 2 | 7.9730 | (ASP) | 0.600 | Plastic | 1.545 | 56.1 | 7.48 |
| 5 | | −8.1104 | (ASP) | −0.168 | | | | |
| 6 | Stop | Plano | | 0.198 | | | | |
| 7 | Lens 3 | 17.2525 | (ASP) | 0.250 | Plastic | 1.669 | 19.5 | −14.93 |
| 8 | | 6.2895 | (ASP) | 0.511 | | | | |
| 9 | Lens 4 | 6.5125 | (ASP) | 0.313 | Plastic | 1.639 | 23.5 | −168.00 |
| 10 | | 6.0248 | (ASP) | −0.074 | | | | |
| 11 | Stop | Plano | | 0.314 | | | | |
| 12 | Lens 5 | −3.6222 | (ASP) | 0.688 | Plastic | 1.566 | 37.4 | −6.27 |
| 13 | | 194.9706 | (ASP) | 0.050 | | | | |
| 14 | Lens 6 | 3.1164 | (ASP) | 1.107 | Plastic | 1.544 | 56.0 | 2.29 |
| 15 | | −1.8184 | (ASP) | 0.363 | | | | |
| 16 | Lens 7 | −98.1926 | (ASP) | 0.570 | Plastic | 1.534 | 55.9 | −2.54 |
| 17 | | 1.3767 | (ASP) | 1.000 | | | | |
| 18 | Filter | Plano | | 0.210 | Glass | 1.517 | 64.2 | — |
| 19 | | Plano | | 0.244 | | | | |
| 20 | Image | Plano | | — | | | | |

Note:
Reference wavelength is 587.6 nm (d-line).
An effective radius of the stop 701 (Surface 6) is 1.390 mm.
An effective radius of the stop 702 (Surface 11) is 1.940 mm.

TABLE 14

Aspheric Coefficients

| Surface # | 1 | 2 | 4 | 5 | 7 |
|---|---|---|---|---|---|
| k= | 0.00000E+00 | 0.00000E+00 | 2.30908E+00 | 1.14754E+01 | 7.07825E+01 |
| A4= | −1.15923629E−02 | −2.23885391E−02 | −3.52094040E−02 | −4.56787458E−02 | −8.23370909E−03 |
| A6= | 9.16582980E−04 | −1.76319501E−03 | 8.88842659E−04 | 5.18957305E−03 | 3.29563799E−02 |
| A8= | −7.04715448E−03 | 5.37372059E−03 | −3.72176871E−03 | −7.59546031E−03 | −8.76159392E−02 |
| A10= | 5.74662385E−03 | −1.48354040E−02 | −3.26876251E−03 | 3.47093685E−03 | 1.02294562E−01 |
| A12= | −3.08550533E−03 | 1.66971698E−02 | 1.00981025E−02 | 3.81156504E−03 | −7.85183293E−02 |
| A14= | 8.86855922E−04 | −8.17562043E−03 | −6.54277398E−03 | −3.93657944E−03 | 4.45961423E−02 |
| A16= | −8.13805142E−05 | 1.61304270E−03 | 1.43632157E−03 | 9.43623067E−04 | −1.86995309E−02 |
| A18= | — | — | — | — | 4.90365845E−03 |
| A20= | — | — | — | — | −5.60654314E−04 |

| Surface # | 8 | 9 | 10 | 12 | 13 |
|---|---|---|---|---|---|
| k= | 5.50349E+00 | −9.65646E+01 | 2.63892E+00 | 0.00000E+00 | 0.00000E+00 |
| A4= | 8.79518668E−03 | −7.02944264E−03 | 2.02554438E−02 | 1.19044647E−01 | 5.30935119E−02 |
| A6= | 8.53913888E−03 | −1.16711383E−01 | −1.46361356E−01 | −1.48205005E−01 | −1.78685646E−01 |
| A8= | −2.85380424E−02 | 1.72578488E−01 | 1.89910201E−01 | 1.06732602E−01 | 1.40935849E−01 |
| A10= | 1.92590093E−02 | −1.75994658E−01 | −1.59586841E−01 | −2.71854510E−02 | −6.57688332E−02 |
| A12= | −6.57990026E−03 | 1.13107490E−01 | 8.93367722E−02 | −1.58571505E−02 | 1.94079471E−02 |
| A14= | 1.33684106E−03 | −4.39480035E−02 | −3.34302192E−02 | 1.52381927E−02 | −3.64226905E−03 |
| A16= | −4.04592886E−04 | 9.16504182E−03 | 7.97669194E−03 | −5.28319636E−03 | 4.53750723E−04 |
| A18= | 9.81469100E−05 | −7.54551624E−04 | −1.07730959E−03 | 9.25038791E−04 | −4.11022385E−05 |
| A20= | — | — | 6.17608862E−05 | −7.87254401E−05 | 2.73029625E−06 |
| A22= | — | — | — | 2.38160400E−06 | −9.39766095E−08 |

| Surface # | 14 | 15 | 16 | 17 |
|---|---|---|---|---|
| k= | 0.00000E+00 | −1.00791E+01 | 0.00000E+00 | −3.52444E+00 |
| A4= | 3.38882907E−02 | −4.79769402E−02 | −3.21921409E−02 | −7.22593063E−02 |
| A6= | −1.10582876E−01 | 1.08396289E−01 | −3.89710955E−02 | 2.99291783E−02 |
| A8= | 1.16278304E−01 | −9.31960852E−02 | 3.78996122E−02 | −8.61294038E−03 |
| A10= | −8.71419433E−02 | 5.20463657E−02 | −1.77178982E−02 | 1.74345083E−03 |
| A12= | 4.99523526E−02 | −1.96777880E−02 | 5.41501799E−03 | −2.49424353E−04 |
| A14= | −2.17574332E−02 | 5.11840718E−03 | −1.12910482E−03 | 2.51650489E−05 |

TABLE 14-continued

| Aspheric Coefficients | | | |
|---|---|---|---|
| A16= | 7.02726073E−03 | −9.30699969E−04 | 1.62494392E−04 | −1.77779765E−06 |
| A18= | −1.64913591E−03 | 1.19301262E−04 | −1.62432647E−05 | 8.65533043E−08 |
| A20= | 2.75143130E−04 | −1.07403109E−05 | 1.12478030E−06 | −2.81547708E−09 |
| A22= | −3.16005280E−05 | 6.65137584E−07 | −5.29533395E−08 | 5.77208837E−11 |
| A24= | 2.36384787E−06 | −2.70031900E−08 | 1.61857175E−09 | −6.63043250E−13 |
| A26= | −1.03312558E−07 | 6.47429129E−10 | −2.89889655E−11 | 3.16496867E−15 |
| A28= | 1.99609494E−09 | −6.95165019E−12 | 2.31047030E−13 | — |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 4.92 | TD/EPD | 2.10 |
| Fno | 1.85 | TL/f | 1.43 |
| HFOV [deg.] | 46.0 | |R4/R3| | 1.02 |
| (V1 + V2 + V6 + V7)/ (V3 + V4 + V5) | 2.79 | f/CT6 | 4.44 |
| V3 + V4 + V5 | 80.4 | |f/f4| | 0.03 |
| (V3 + V4 + V5)/V6 | 1.44 | f/R1 | 1.56 |
| (V3 + V4 + V5)/(V6 + V7) | 0.72 | f/|R11| + f/|R12| | 4.28 |
| CT1/CT5 | 0.77 | f2/f6 | 3.26 |
| CT1/T12 | 1.63 | f6/CT6 | 2.07 |
| (CT1 + CT2)/T12 | 3.47 | ImgH/f | 1.06 |
| (CT3 + CT4)/T34 | 1.10 | Y11/Y72 | 0.36 |
| CT6/T67 | 3.05 | Yc61/Y61 | 0.70 |
| T12/T67 | 0.90 | Yc72/Y72 | 0.57 |
| T34/T45 | 2.13 | — | — |

8th Embodiment

Figure 15:
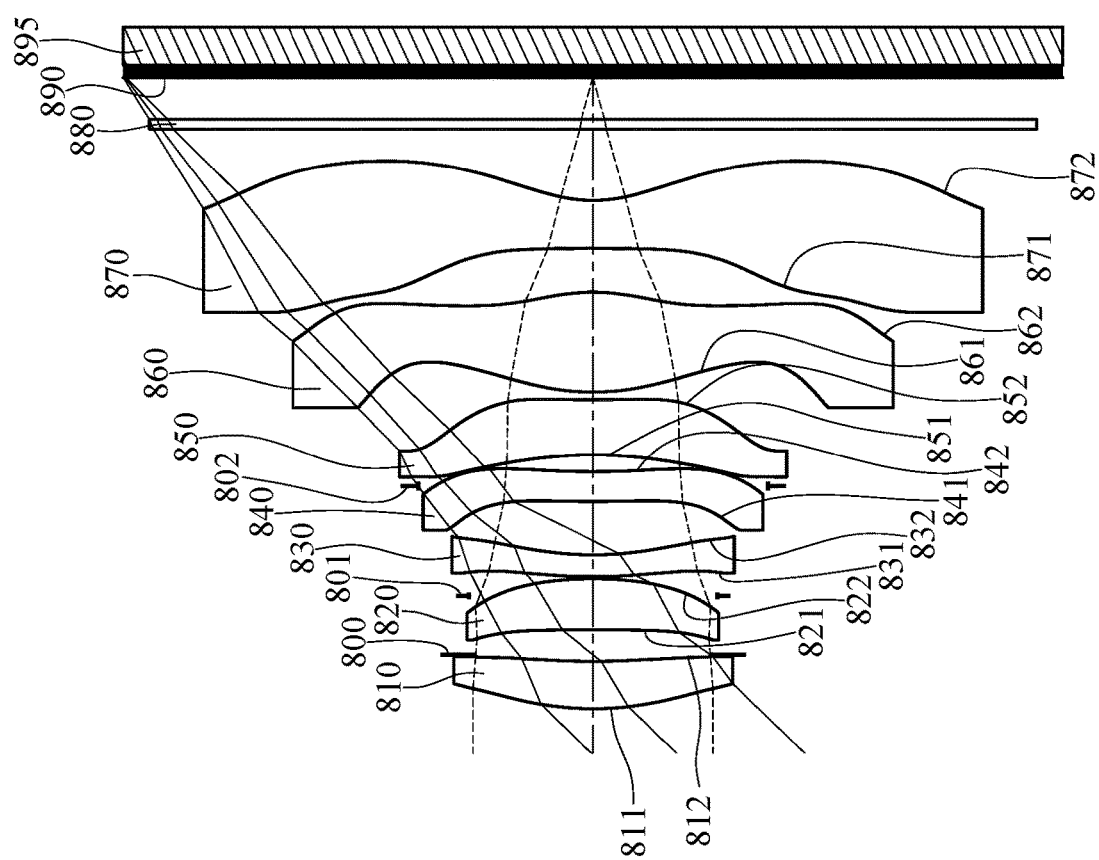
FIG. 15 is a schematic view of an image capturing unit according to the 8th embodiment of the present disclosure.
Figure 16:
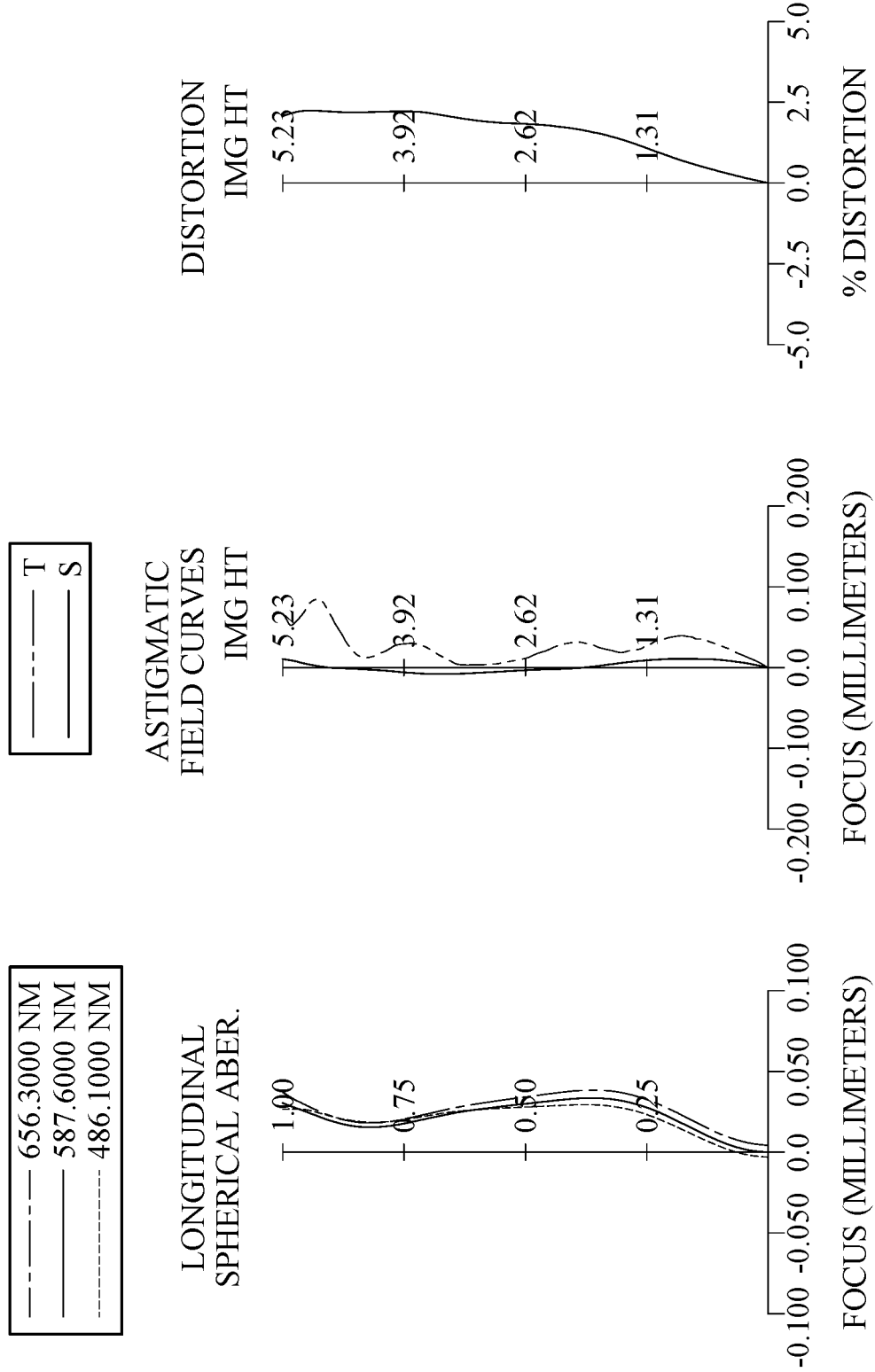
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the imaging lens assembly (its reference numeral is omitted) of the present disclosure and an image sensor 895. The imaging lens assembly includes, in order from an object side to an image side along an optical path, a first lens element 810, an aperture stop 800, a second lens element 820, a stop 801, a third lens element 830, a fourth lens element 840, a stop 802, a fifth lens element 850, a sixth lens element 860, a seventh lens element 870, a filter 880 and an image surface 890. The imaging lens assembly includes seven lens elements (810, 820, 830, 840, 850, 860 and 870) with no additional lens element disposed between each of the adjacent seven lens elements.

The first lens element 810 with positive refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric. The object-side surface 811 of the first lens element 810 has two inflection points. The image-side surface 812 of the first lens element 810 has two inflection points.

The second lens element 820 with positive refractive power has an object-side surface 821 being concave in a paraxial region thereof and an image-side surface 822 being convex in a paraxial region thereof. The second lens element 820 is made of glass material and has the object-side surface 821 and the image-side surface 822 being both aspheric.

The third lens element 830 with negative refractive power has an object-side surface 831 being convex in a paraxial region thereof and an image-side surface 832 being concave in a paraxial region thereof. The third lens element 830 is made of plastic material and has the object-side surface 831 and the image-side surface 832 being both aspheric. The object-side surface 831 of the third lens element 830 has one inflection point. The image-side surface 832 of the third lens element 830 has two inflection points. The object-side surface 831 of the third lens element 830 has one critical point in an off-axis region thereof.

The fourth lens element 840 with negative refractive power has an object-side surface 841 being convex in a paraxial region thereof and an image-side surface 842 being concave in a paraxial region thereof. The fourth lens element 840 is made of plastic material and has the object-side surface 841 and the image-side surface 842 being both aspheric. The object-side surface 841 of the fourth lens element 840 has two inflection points. The image-side surface 842 of the fourth lens element 840 has one inflection point. The object-side surface 841 of the fourth lens element 840 has one critical point in an off-axis region thereof. The image-side surface 842 of the fourth lens element 840 has one critical point in an off-axis region thereof.

The fifth lens element 850 with negative refractive power has an object-side surface 851 being concave in a paraxial region thereof and an image-side surface 852 being concave in a paraxial region thereof. The fifth lens element 850 is made of plastic material and has the object-side surface 851 and the image-side surface 852 being both aspheric. The object-side surface 851 of the fifth lens element 850 has two inflection points. The image-side surface 852 of the fifth lens element 850 has two inflection points. The object-side surface 851 of the fifth lens element 850 has two critical points in an off-axis region thereof. The image-side surface 852 of the fifth lens element 850 has two critical points in an off-axis region thereof.

The sixth lens element 860 with positive refractive power has an object-side surface 861 being convex in a paraxial region thereof and an image-side surface 862 being convex in a paraxial region thereof. The sixth lens element 860 is made of plastic material and has the object-side surface 861 and the image-side surface 862 being both aspheric. The object-side surface 861 of the sixth lens element 860 has two inflection points. The image-side surface 862 of the sixth lens element 860 has four inflection points. The object-side surface 861 of the sixth lens element 860 has one critical point in an off-axis region thereof. The image-side surface 862 of the sixth lens element 860 has two critical points in an off-axis region thereof.

The seventh lens element 870 with negative refractive power has an object-side surface 871 being concave in a paraxial region thereof and an image-side surface 872 being concave in a paraxial region thereof. The seventh lens element 870 is made of plastic material and has the object-side surface 871 and the image-side surface 872 being both aspheric. The object-side surface 871 of the seventh lens element 870 has three inflection points. The image-side surface 872 of the seventh lens element 870 has two inflection points. The object-side surface 871 of the seventh lens element 870 has one critical point in an off-axis region thereof. The image-side surface 872 of the seventh lens element 870 has one critical point in an off-axis region thereof.

The filter 880 is made of glass material and located between the seventh lens element 870 and the image surface 890, and will not affect the focal length of the imaging lens assembly. The image sensor 895 is disposed on or near the image surface 890 of the imaging lens assembly.

The detailed optical data of the 8th embodiment are shown in Table 15 and the aspheric surface data are shown in Table 16 below.

TABLE 15

8th Embodiment
f = 4.97 mm, Fno = 1.85, HFOV = 45.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.2781 | (ASP) | 0.531 | Plastic | 1.544 | 56.0 | 9.84 |
| 2 | | 7.9690 | (ASP) | 0.075 | | | | |
| 3 | Ape. Stop | Plano | | 0.275 | | | | |
| 4 | Lens 2 | −1000.0000 | (ASP) | 0.572 | Glass | 1.542 | 62.9 | 7.43 |
| 5 | | −4.0170 | (ASP) | −0.190 | | | | |
| 6 | Stop | Plano | | 0.215 | | | | |
| 7 | Lens 3 | 6.4933 | (ASP) | 0.244 | Plastic | 1.686 | 18.4 | −12.75 |
| 8 | | 3.6695 | (ASP) | 0.596 | | | | |
| 9 | Lens 4 | 12.4481 | (ASP) | 0.338 | Plastic | 1.614 | 26.0 | −123.41 |
| 10 | | 10.5806 | (ASP) | −0.165 | | | | |
| 11 | Stop | Plano | | 0.353 | | | | |
| 12 | Lens 5 | −3.8994 | (ASP) | 0.617 | Plastic | 1.566 | 37.4 | −6.02 |
| 13 | | 28.4026 | (ASP) | 0.087 | | | | |
| 14 | Lens 6 | 2.9504 | (ASP) | 1.119 | Plastic | 1.544 | 56.0 | 2.39 |
| 15 | | −2.0143 | (ASP) | 0.489 | | | | |
| 16 | Lens 7 | −39.4297 | (ASP) | 0.537 | Plastic | 1.544 | 56.0 | −2.72 |
| 17 | | 1.5437 | (ASP) | 0.800 | | | | |
| 18 | Filter | Plano | | 0.110 | Glass | 1.517 | 64.2 | — |
| 19 | | Plano | | 0.467 | | | | |
| 20 | Image | Plano | | — | | | | |

Note:
Reference wavelength is 587.6 nm (d-line).
An effective radius of the stop 801 (Surface 6) is 1.390 mm.
An effective radius of the stop 802 (Surface 11) is 1.955 mm.

TABLE 16

Aspheric Coefficients

| Surface # | 1 | 2 | 4 | 5 | 7 |
|---|---|---|---|---|---|
| k= | 0.00000E+00 | 0.00000E+00 | 9.80000E+01 | −2.26526E+00 | 1.21207E+01 |
| A4= | −1.26296645E−02 | −1.28629830E−02 | −2.90570498E−02 | 1.97195550E−02 | 1.69898143E−02 |
| A6= | 5.75445641E−03 | −2.98572882E−02 | −1.07094654E−02 | −1.40279156E−01 | −1.03839857E−01 |
| A8= | −1.65211484E−02 | 6.10241495E−02 | 1.67538949E−02 | 2.00739486E−01 | 1.00901091E−01 |
| A10= | 1.49745342E−02 | −7.94500811E−02 | −2.14176129E−02 | −1.74713741E−01 | −2.08600501E−02 |
| A12= | −8.03909757E−03 | 5.93027789E−02 | 1.74496163E−02 | 9.01431754E−02 | −6.63700530E−02 |
| A14= | 2.20359749E−03 | −2.32169502E−02 | −7.68635473E−03 | −2.56553221E−02 | 7.94817126E−02 |
| A16= | −2.14201178E−04 | 3.82457149E−03 | 1.39170599E−03 | 3.07800757E−03 | −4.17186246E−02 |
| A18= | — | — | — | — | 1.10063418E−02 |
| A20= | — | — | — | — | −1.18238681E−03 |

| Surface # | 8 | 9 | 10 | 12 | 13 |
|---|---|---|---|---|---|
| k= | 2.96658E−01 | −7.73227E+01 | 1.48842E+01 | 0.00000E+00 | 0.00000E+00 |
| A4= | −1.91887859E−02 | −3.88799362E−02 | 3.81846403E−02 | 1.20562550E−01 | 8.09420420E−02 |
| A6= | 1.63826270E−02 | −2.23082323E−02 | −1.62684430E−01 | −2.46388286E−01 | −3.50076970E−01 |
| A8= | −8.22518203E−02 | 1.19502728E−02 | 2.22297176E−01 | 3.02859413E−01 | 4.07097544E−01 |
| A10= | 1.50566360E−01 | 1.63290159E−02 | −1.90325043E−01 | −2.14658574E−01 | −3.02501338E−01 |
| A12= | −1.57477624E−01 | −4.69784499E−02 | 1.03893163E−01 | 8.98599566E−02 | 1.56077746E−01 |
| A14= | 9.96885264E−02 | 4.72206062E−02 | −3.64837668E−02 | −2.23047031E−02 | −5.59798361E−02 |
| A16= | −3.78502231E−02 | −2.38997398E−02 | 7.96926846E−03 | 3.17095609E−03 | 1.35382346E−02 |
| A18= | 7.94143800E−03 | 6.00318467E−03 | −9.79639933E−04 | −2.29897874E−04 | −2.07806165E−03 |

TABLE 16-continued

| Aspheric Coefficients | | | | |
|---|---|---|---|---|
| A20= | −7.04878147E−04 | −5.89372246E−04 | 5.14196013E−05 | 5.96163792E−06 | 1.81032156E−04 |
| A22= | — | — | — | — | −6.77642599E−06 |

| Surface # | 14 | 15 | 16 | 17 |
|---|---|---|---|---|
| k= | 0.00000E+00 | −1.04791E+01 | 0.00000E+00 | −3.50015E+00 |
| A4= | 8.14072164E−02 | −1.94458324E−03 | 4.89973444E−03 | −5.70350636E−02 |
| A6= | −2.18269689E−01 | 9.92890887E−02 | −4.55646790E−02 | 1.91225913E−02 |
| A8= | 2.57794219E−01 | −9.35591028E−02 | 3.12853083E−02 | −5.05506514E−03 |
| A10= | −2.10212109E−01 | 4.62808539E−02 | −1.37098452E−02 | 1.01373041E−03 |
| A12= | 1.22388483E−01 | −1.47602181E−02 | 4.25011684E−03 | −1.49206547E−04 |
| A14= | −5.16035309E−02 | 3.25598910E−03 | −9.07710307E−04 | 1.59059439E−05 |
| A16= | 1.58344477E−02 | −5.11346885E−04 | 1.32944739E−04 | −1.21753994E−06 |
| A18= | −3.52436737E−03 | 5.76054987E−05 | −1.34425676E−05 | 6.58739223E−08 |
| A20= | 5.61124881E−04 | −4.61639560E−06 | 9.38564006E−07 | −2.44457742E−09 |
| A22= | −6.20787736E−05 | 2.56425463E−07 | −4.45167866E−08 | 5.88793288E−11 |
| A24= | 4.51969727E−06 | −9.36082016E−09 | 1.37198970E−09 | −8.24634709E−13 |
| A26= | −1.94219432E−07 | 2.01284331E−10 | −2.48235763E−11 | 5.06795532E−15 |
| A28= | 3.72426177E−09 | −1.92261931E−12 | 2.00395679E−13 | — |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 4.97 | TD/EPD | 2.12 |
| Fno | 1.85 | TL/f | 1.42 |
| HFOV [deg.] | 45.8 | |R4/R3| | 0.00402 |
| (V1 + V2 + V6 + V7)/(V3 + V4 + V5) | 2.82 | f/CT6 | 4.44 |
| V3 + V4 + V5 | 81.8 | |f/f4| | 0.04 |
| (V3 + V4 + V5)/V6 | 1.46 | f/R1 | 1.52 |
| (V3 + V4 + V5)/(V6 + V7) | 0.73 | f/|R11| + f/|R12| | 4.15 |
| CT1/CT5 | 0.86 | f2/f6 | 3.11 |
| CT1/T12 | 1.52 | f6/CT6 | 2.14 |
| (CT1 + CT2)/T12 | 3.15 | ImgH/f | 1.05 |
| (CT3 + CT4)/T34 | 0.98 | Y11/Y72 | 0.36 |
| CT6/T67 | 2.29 | Yc61/Y61 | 0.69 |
| T12/T67 | 0.72 | Yc72/Y72 | 0.53 |
| T34/T45 | 3.17 | — | — |

9th Embodiment

Figure 17:
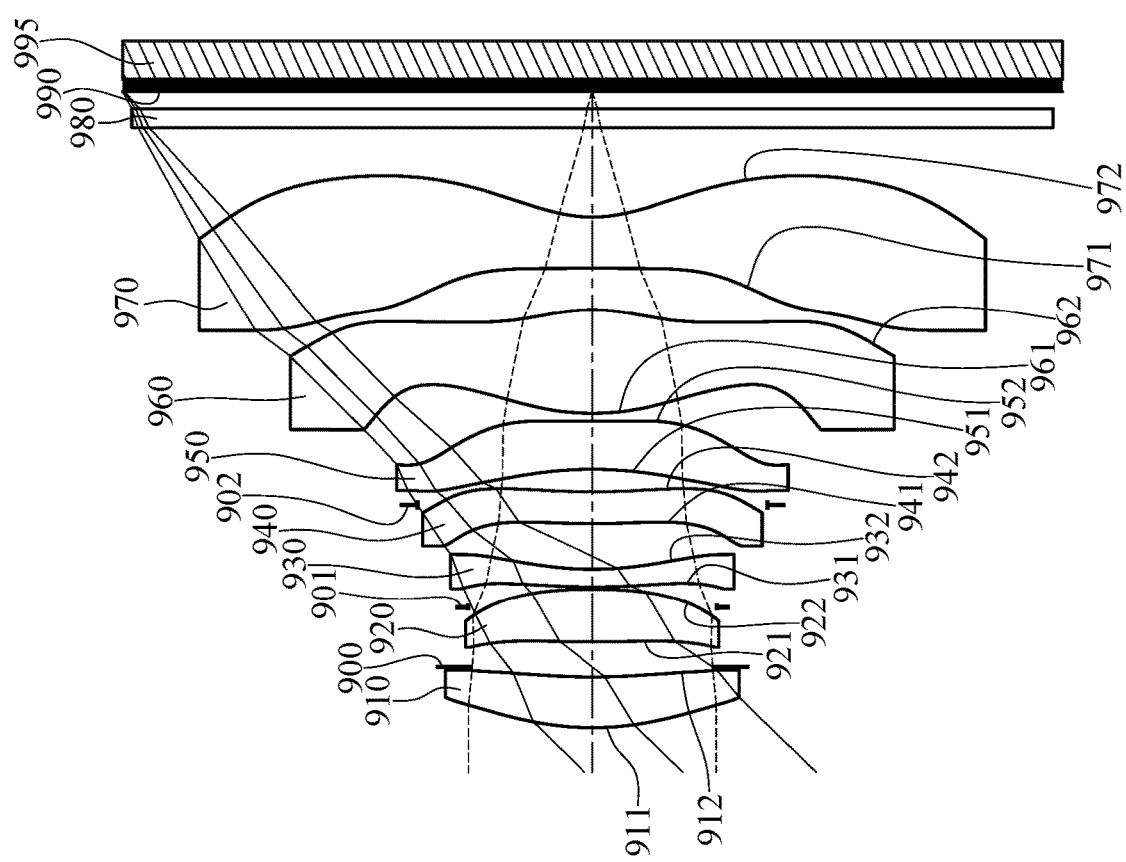
FIG. 17 is a schematic view of an image capturing unit according to the 9th embodiment of the present disclosure.
Figure 18:
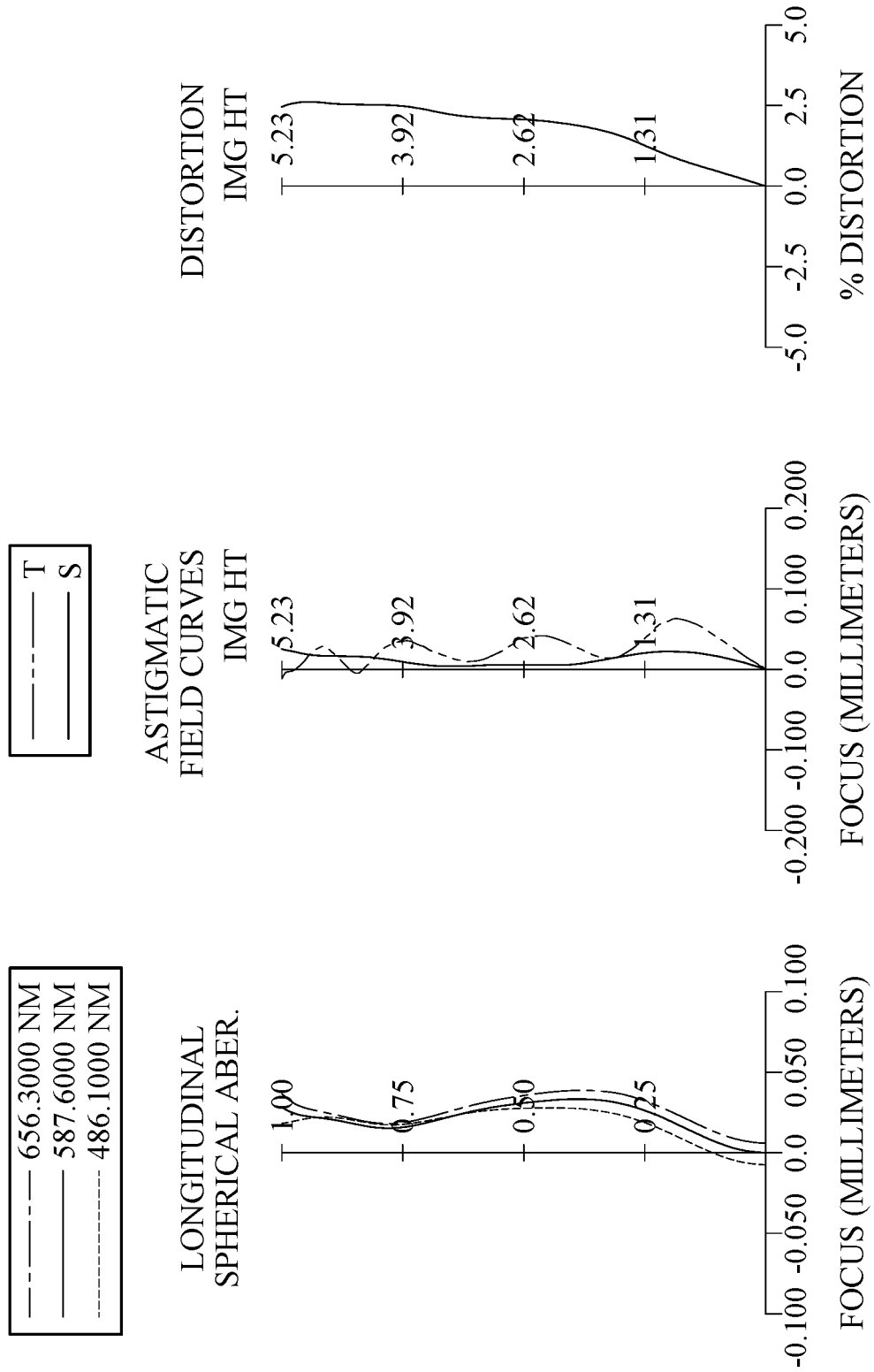
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the imaging lens assembly (its reference numeral is omitted) of the present disclosure and an image sensor 995. The imaging lens assembly includes, in order from an object side to an image side along an optical path, a first lens element 910, an aperture stop 900, a second lens element 920, a stop 901, a third lens element 930, a fourth lens element 940, a stop 902, a fifth lens element 950, a sixth lens element 960, a seventh lens element 970, a filter 980 and an image surface 990. The imaging lens assembly includes seven lens elements (910, 920, 930, 940, 950, 960 and 970) with no additional lens element disposed between each of the adjacent seven lens elements.

The first lens element 910 with positive refractive power has an object-side surface 911 being convex in a paraxial region thereof and an image-side surface 912 being concave in a paraxial region thereof. The first lens element 910 is made of plastic material and has the object-side surface 911 and the image-side surface 912 being both aspheric. The object-side surface 911 of the first lens element 910 has two inflection points. The image-side surface 912 of the first lens element 910 has two inflection points.

The second lens element 920 with positive refractive power has an object-side surface 921 being convex in a paraxial region thereof and an image-side surface 922 being convex in a paraxial region thereof. The second lens element 920 is made of plastic material and has the object-side surface 921 and the image-side surface 922 being both aspheric. The object-side surface 921 of the second lens element 920 has two inflection points. The object-side surface 921 of the second lens element 920 has one critical point in an off-axis region thereof.

The third lens element 930 with negative refractive power has an object-side surface 931 being convex in a paraxial region thereof and an image-side surface 932 being concave in a paraxial region thereof. The third lens element 930 is made of plastic material and has the object-side surface 931 and the image-side surface 932 being both aspheric. The object-side surface 931 of the third lens element 930 has one inflection point. The image-side surface 932 of the third lens element 930 has two inflection points. The object-side surface 931 of the third lens element 930 has one critical point in an off-axis region thereof.

The fourth lens element 940 with positive refractive power has an object-side surface 941 being convex in a paraxial region thereof and an image-side surface 942 being concave in a paraxial region thereof. The fourth lens element 940 is made of plastic material and has the object-side surface 941 and the image-side surface 942 being both aspheric. The object-side surface 941 of the fourth lens element 940 has two inflection points. The image-side surface 942 of the fourth lens element 940 has one inflection point. The object-side surface 941 of the fourth lens element 940 has one critical point in an off-axis region thereof. The image-side surface 942 of the fourth lens element 940 has one critical point in an off-axis region thereof.

The fifth lens element 950 with negative refractive power has an object-side surface 951 being concave in a paraxial region thereof and an image-side surface 952 being concave in a paraxial region thereof. The fifth lens element 950 is made of plastic material and has the object-side surface 951 and the image-side surface 952 being both aspheric. The object-side surface 951 of the fifth lens element 950 has two inflection points. The image-side surface 952 of the fifth lens element 950 has two inflection points. The object-side surface 951 of the fifth lens element 950 has two critical points in an off-axis region thereof. The image-side surface 952 of the fifth lens element 950 has two critical points in an off-axis region thereof.

The sixth lens element 960 with positive refractive power has an object-side surface 961 being convex in a paraxial region thereof and an image-side surface 962 being convex in a paraxial region thereof. The sixth lens element 960 is made of plastic material and has the object-side surface 961 and the image-side surface 962 being both aspheric. The object-side surface 961 of the sixth lens element 960 has two inflection points. The image-side surface 962 of the sixth lens element 960 has two inflection points. The object-side surface 961 of the sixth lens element 960 has one critical point in an off-axis region thereof. The image-side surface 962 of the sixth lens element 960 has two critical points in an off-axis region thereof.

The seventh lens element 970 with negative refractive power has an object-side surface 971 being concave in a paraxial region thereof and an image-side surface 972 being concave in a paraxial region thereof. The seventh lens element 970 is made of plastic material and has the object-side surface 971 and the image-side surface 972 being both aspheric. The object-side surface 971 of the seventh lens element 970 has three inflection points. The image-side surface 972 of the seventh lens element 970 has two inflection points. The image-side surface 972 of the seventh lens element 970 has one critical point in an off-axis region thereof.

The filter 980 is made of glass material and located between the seventh lens element 970 and the image surface 990, and will not affect the focal length of the imaging lens assembly. The image sensor 995 is disposed on or near the image surface 990 of the imaging lens assembly.

The detailed optical data of the 9th embodiment are shown in Table 17 and the aspheric surface data are shown in Table 18 below.

TABLE 17

9th Embodiment
f = 4.96 mm, Fno = 1.79, HFOV = 45.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.3211 | (ASP) | 0.567 | Plastic | 1.545 | 56.1 | 10.44 |
| 2 | | 7.4980 | (ASP) | 0.110 | | | | |
| 3 | Ape. Stop | Plano | | 0.282 | | | | |
| 4 | Lens 2 | 16.0062 | (ASP) | 0.591 | Plastic | 1.545 | 56.1 | 7.31 |
| 5 | | −5.2365 | (ASP) | −0.205 | | | | |
| 6 | Stop | Plano | | 0.230 | | | | |
| 7 | Lens 3 | 7.7941 | (ASP) | 0.200 | Plastic | 1.669 | 19.5 | −11.58 |
| 8 | | 3.8451 | (ASP) | 0.510 | | | | |
| 9 | Lens 4 | 8.2809 | (ASP) | 0.354 | Plastic | 1.614 | 26.0 | 293.93 |
| 10 | | 8.5382 | (ASP) | −0.147 | | | | |
| 11 | Stop | Plano | | 0.400 | | | | |
| 12 | Lens 5 | −4.0225 | (ASP) | 0.536 | Plastic | 1.566 | 37.4 | −6.11 |
| 13 | | 25.9926 | (ASP) | 0.088 | | | | |
| 14 | Lens 6 | 2.9447 | (ASP) | 1.159 | Plastic | 1.544 | 56.0 | 2.42 |
| 15 | | −2.0537 | (ASP) | 0.467 | | | | |
| 16 | Lens 7 | −67.4736 | (ASP) | 0.571 | Plastic | 1.544 | 56.0 | −2.77 |
| 17 | | 1.5450 | (ASP) | 1.000 | | | | |
| 18 | Filter | Plano | | 0.210 | Glass | 1.517 | 64.2 | — |
| 19 | | Plano | | 0.189 | | | | |
| 20 | Image | Plano | | — | | | | |

Note:
Reference wavelength is 587.6 nm (d-line).
An effective radius of the stop 901 (Surface 6) is 1.390 mm.
An effective radius of the stop 902 (Surface 11) is 1.955 mm.

TABLE 18

Aspheric Coefficients

| Surface # | 1 | 2 | 4 | 5 | 7 |
|---|---|---|---|---|---|
| k= | 0.00000E+00 | 0.00000E+00 | −8.73672E+00 | 1.16016E+00 | 9.43074E+00 |
| A4= | −9.66704774E−03 | −1.26998291E−02 | −2.93458368E−02 | −3.31035749E−03 | 4.66788414E−03 |
| A6= | 2.23317795E−03 | −2.17005059E−02 | −9.27291139E−03 | −9.84698751E−02 | −7.05840845E−02 |
| A8= | −7.81157811E−03 | 4.73749306E−02 | 1.07980049E−02 | 1.41665151E−01 | 4.38161986E−02 |
| A10= | 6.38675657E−03 | −6.17925278E−02 | −1.25610734E−02 | −1.18741185E−01 | 3.70181283E−02 |
| A12= | −3.09311106E−03 | 4.53331023E−02 | 1.03045610E−02 | 5.86681726E−02 | −9.46900863E−02 |
| A14= | 7.45601171E−04 | −1.72336159E−02 | −4.61368466E−03 | −1.60964469E−02 | 8.03751999E−02 |

TABLE 18-continued

| Aspheric Coefficients | | | | | |
|---|---|---|---|---|---|
| A16= | −5.42639162E−05 | 2.73066928E−03 | 8.48191953E−04 | 1.88138431E−03 | −3.61493825E−02 |
| A18= | — | — | — | — | 8.62618892E−03 |
| A20= | — | — | — | — | −8.57652745E−04 |

| Surface # | 8 | 9 | 10 | 12 | 13 |
|---|---|---|---|---|---|
| k= | −1.16690E−01 | −5.79884E+01 | 8.03023E+00 | 0.00000E+00 | 0.00000E+00 |
| A4= | −1.90679147E−02 | −4.28816344E−02 | −5.25630648E−04 | 5.65010019E−02 | 1.98895982E−02 |
| A6= | 3.60375380E−02 | 2.62917970E−02 | −7.06888017E−02 | −9.50456201E−02 | −1.77729383E−01 |
| A8= | −1.34077330E−01 | −8.80339733E−02 | 9.49313751E−02 | 8.14697470E−02 | 1.56015044E−01 |
| A10= | 2.20743302E−01 | 1.44759719E−01 | −7.94899462E−02 | −1.14676088E−02 | −7.88505776E−02 |
| A12= | −2.13415515E−01 | −1.53883268E−01 | 4.17614217E−02 | −2.56729127E−02 | 2.83413604E−02 |
| A14= | 1.26441759E−01 | 1.03100873E−01 | −1.41609821E−02 | 1.89836297E−02 | −8.00218575E−03 |
| A16= | −4.53224163E−02 | −4.12875668E−02 | 2.97185290E−03 | −6.12571486E−03 | 1.77602013E−03 |
| A18= | 9.02687426E−03 | 8.93135363E−03 | −3.39397698E−04 | 1.04970930E−03 | −2.75325342E−04 |
| A20= | −7.63930184E−04 | −7.95979361E−04 | 1.54298515E−05 | −9.22325713E−05 | 2.49375530E−05 |
| A22= | — | — | — | 3.21379881E−06 | −9.65941383E−07 |

| Surface # | 14 | 15 | 16 | 17 |
|---|---|---|---|---|
| k= | 0.00000E+00 | −1.43081E+01 | 0.00000E+00 | −4.20989E+00 |
| A4= | 4.37851060E−02 | −3.23183189E−02 | 1.50982958E−02 | −2.91410686E−02 |
| A6= | −1.08845857E−01 | 1.63332810E−01 | −3.70716242E−02 | 2.36623765E−03 |
| A8= | 1.04565345E−01 | −1.55745613E−01 | 1.69386479E−02 | 6.78656502E−04 |
| A10= | −7.91768721E−02 | 7.97719765E−02 | −6.15209681E−03 | −2.69857930E−04 |
| A12= | 4.60675171E−02 | −2.61456369E−02 | 2.03106582E−03 | 4.89090057E−05 |
| A14= | −1.98576085E−02 | 5.87194107E−03 | −4.89243405E−04 | −5.71251872E−06 |
| A16= | 6.24956345E−03 | −9.32056191E−04 | 7.91951323E−05 | 4.64636714E−07 |
| A18= | −1.42575750E−03 | 1.05640927E−04 | −8.62080910E−06 | −2.68405022E−08 |
| A20= | 2.32358216E−04 | −8.50131201E−06 | 6.35340804E−07 | 1.08597954E−09 |
| A22= | −2.62567434E−05 | 4.74593118E−07 | −3.13730104E−08 | −2.92813599E−11 |
| A24= | 1.94631707E−06 | −1.74815997E−08 | 9.96814900E−10 | 4.71481625E−13 |
| A26= | −8.47827189E−08 | 3.82298861E−10 | −1.84588512E−11 | −3.41784874E−15 |
| A28= | 1.63866106E−09 | −3.76179363E−12 | 1.51655766E−13 | — |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 4.96 | TD/EPD | 2.06 |
| Fno | 1.79 | TL/f | 1.43 |
| HFOV [deg.] | 45.8 | |R4/R3| | 0.33 |
| (V1 + V2 + V6 + V7)/(V3 + V4 + V5) | 2.70 | f/CT6 | 4.28 |
| V3 + V4 + V5 | 82.9 | |f/f4| | 0.02 |
| (V3 + V4 + V5)/V6 | 1.48 | f/R1 | 1.49 |
| (V3 + V4 + V5)/(V6 + V7) | 0.74 | f/|R11| + f/|R12| | 4.10 |
| CT1/CT5 | 1.06 | f2/f6 | 3.02 |
| CT1/T12 | 1.45 | f6/CT6 | 2.09 |
| (CT1 + CT2)/T12 | 2.95 | ImgH/f | 1.06 |
| (CT3 + CT4)/T34 | 1.09 | Y11/Y72 | 0.37 |
| CT6/T67 | 2.48 | Yc61/Y61 | 0.70 |
| T12/T67 | 0.84 | Yc72/Y72 | 0.53 |
| T34/T45 | 2.02 | — | — |

10th Embodiment

Figure 19:
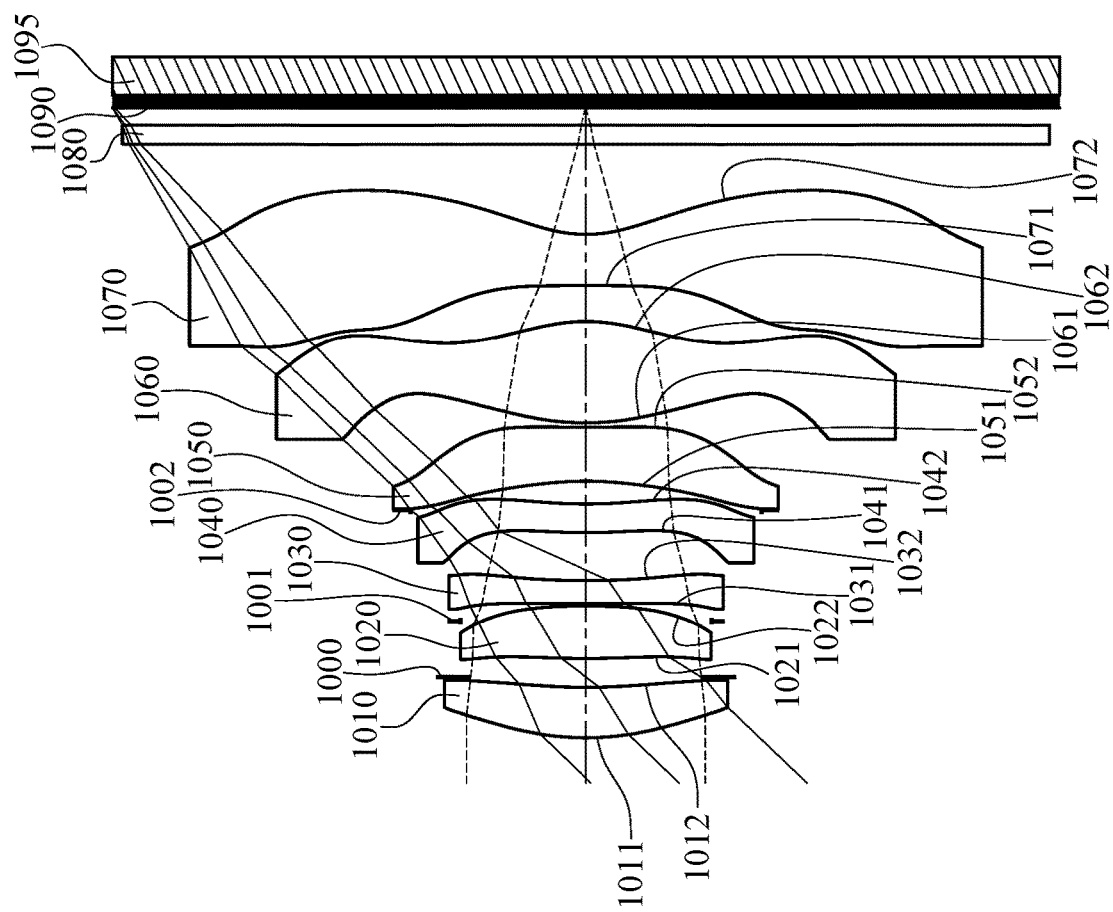
FIG. 19 is a schematic view of an image capturing unit according to the 10th embodiment of the present disclosure.
Figure 20:
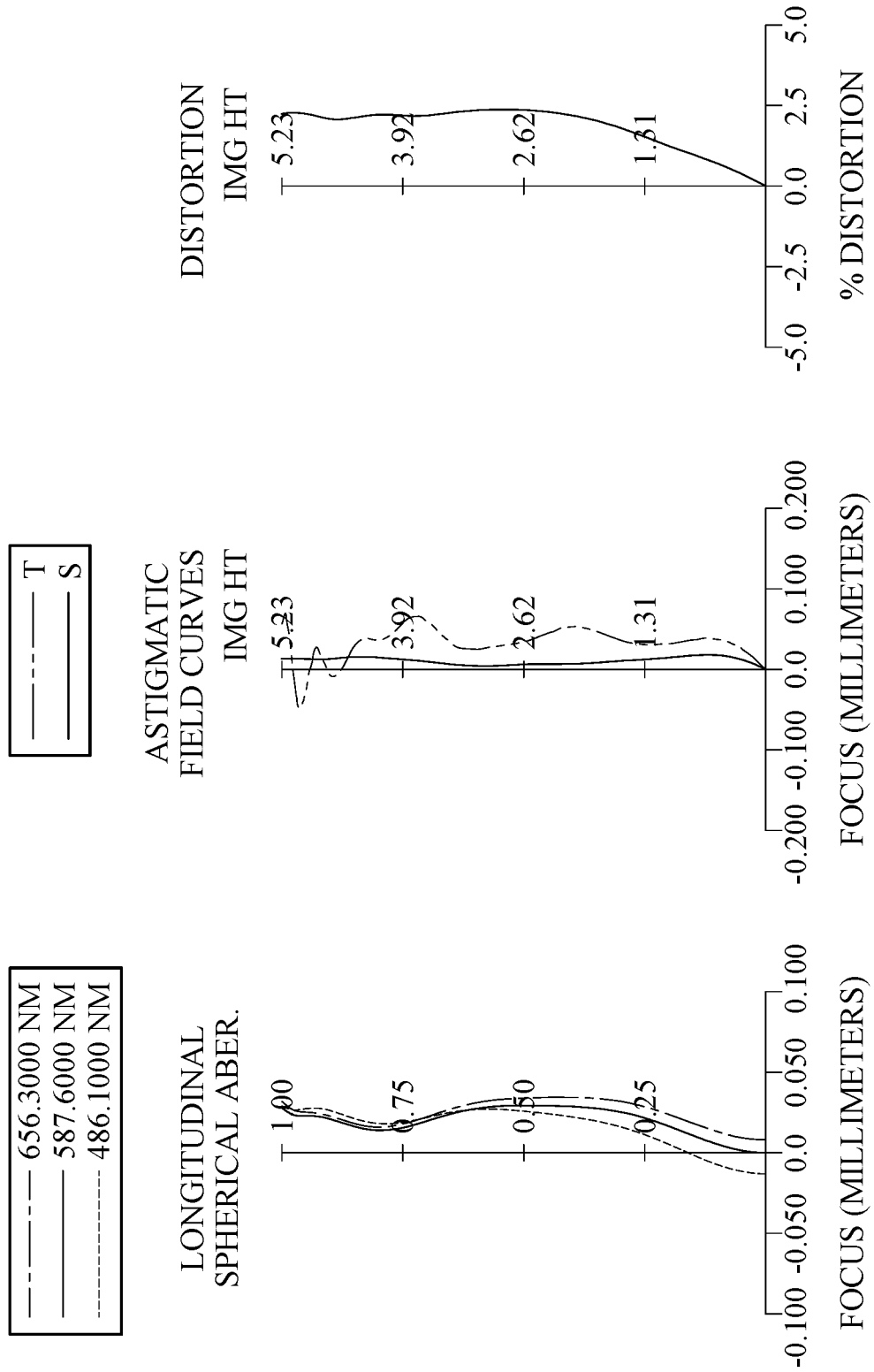
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the imaging lens assembly (its reference numeral is omitted) of the present disclosure and an image sensor 1095. The imaging lens assembly includes, in order from an object side to an image side along an optical path, a first lens element 1010, an aperture stop 1000, a second lens element 1020, a stop 1001, a third lens element 1030, a fourth lens element 1040, a stop 1002, a fifth lens element 1050, a sixth lens element 1060, a seventh lens element 1070, a filter 1080 and an image surface 1090. The imaging lens assembly includes seven lens elements (1010, 1020, 1030, 1040, 1050, 1060 and 1070) with no additional lens element disposed between each of the adjacent seven lens elements.

The first lens element 1010 with positive refractive power has an object-side surface 1011 being convex in a paraxial region thereof and an image-side surface 1012 being concave in a paraxial region thereof. The first lens element 1010 is made of plastic material and has the object-side surface 1011 and the image-side surface 1012 being both aspheric. The image-side surface 1012 of the first lens element 1010 has two inflection points.

The second lens element 1020 with positive refractive power has an object-side surface 1021 being convex in a paraxial region thereof and an image-side surface 1022 being convex in a paraxial region thereof. The second lens element 1020 is made of plastic material and has the object-side surface 1021 and the image-side surface 1022 being both aspheric. The object-side surface 1021 of the second lens element 1020 has two inflection points. The image-side surface 1022 of the second lens element 1020 has one inflection point. The object-side surface 1021 of the second lens element 1020 has one critical point in an off-axis region thereof.

The third lens element 1030 with negative refractive power has an object-side surface 1031 being concave in a paraxial region thereof and an image-side surface 1032 being concave in a paraxial region thereof. The third lens element 1030 is made of plastic material and has the object-side surface 1031 and the image-side surface 1032 being both aspheric. The object-side surface 1031 of the third lens element 1030 has one inflection point. The image-side surface 1032 of the third lens element 1030 has two inflection points. The image-side surface 1032 of the third lens element 1030 has two critical points in an off-axis region thereof.

The fourth lens element 1040 with negative refractive power has an object-side surface 1041 being convex in a paraxial region thereof and an image-side surface 1042 being concave in a paraxial region thereof. The fourth lens element 1040 is made of plastic material and has the object-side surface 1041 and the image-side surface 1042 being both aspheric. The object-side surface 1041 of the fourth lens element 1040 has two inflection points. The image-side surface 1042 of the fourth lens element 1040 has two inflection points. The object-side surface 1041 of the fourth lens element 1040 has one critical point in an off-axis region thereof. The image-side surface 1042 of the fourth lens element 1040 has one critical point in an off-axis region thereof.

The fifth lens element 1050 with negative refractive power has an object-side surface 1051 being concave in a paraxial region thereof and an image-side surface 1052 being convex in a paraxial region thereof. The fifth lens element 1050 is made of plastic material and has the object-side surface 1051 and the image-side surface 1052 being both aspheric. The object-side surface 1051 of the fifth lens element 1050 has two inflection points. The image-side surface 1052 of the fifth lens element 1050 has three inflection points. The image-side surface 1052 of the fifth lens element 1050 has two critical points in an off-axis region thereof.

The sixth lens element 1060 with positive refractive power has an object-side surface 1061 being convex in a paraxial region thereof and an image-side surface 1062 being convex in a paraxial region thereof. The sixth lens element 1060 is made of plastic material and has the object-side surface 1061 and the image-side surface 1062 being both aspheric. The object-side surface 1061 of the sixth lens element 1060 has two inflection points. The image-side surface 1062 of the sixth lens element 1060 has three inflection points. The object-side surface 1061 of the sixth lens element 1060 has one critical point in an off-axis region thereof. The image-side surface 1062 of the sixth lens element 1060 has two critical points in an off-axis region thereof.

The seventh lens element 1070 with negative refractive power has an object-side surface 1071 being concave in a paraxial region thereof and an image-side surface 1072 being concave in a paraxial region thereof. The seventh lens element 1070 is made of plastic material and has the object-side surface 1071 and the image-side surface 1072 being both aspheric. The object-side surface 1071 of the seventh lens element 1070 has three inflection points. The image-side surface 1072 of the seventh lens element 1070 has three inflection points. The object-side surface 1071 of the seventh lens element 1070 has one critical point in an off-axis region thereof. The image-side surface 1072 of the seventh lens element 1070 has one critical point in an off-axis region thereof.

The filter 1080 is made of glass material and located between the seventh lens element 1070 and the image surface 1090, and will not affect the focal length of the imaging lens assembly. The image sensor 1095 is disposed on or near the image surface 1090 of the imaging lens assembly.

The detailed optical data of the 10th embodiment are shown in Table 19 and the aspheric surface data are shown in Table 20 below.

TABLE 19

10th Embodiment
f = 4.89 mm, Fno = 1.85, HFOV = 46.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.0765 | (ASP) | 0.560 | Plastic | 1.545 | 56.1 | 9.95 |
| 2 | | 6.6510 | (ASP) | 0.111 | | | | |
| 3 | Ape. Stop | Plano | | 0.208 | | | | |
| 4 | Lens 2 | 9.7448 | (ASP) | 0.585 | Plastic | 1.545 | 56.1 | 7.84 |
| 5 | | −7.4509 | (ASP) | −0.173 | | | | |
| 6 | Stop | Plano | | 0.203 | | | | |
| 7 | Lens 3 | −200.0000 | (ASP) | 0.250 | Plastic | 1.669 | 19.5 | −14.63 |
| 8 | | 10.2935 | (ASP) | 0.528 | | | | |
| 9 | Lens 4 | 6.4997 | (ASP) | 0.317 | Plastic | 1.639 | 23.5 | −213.33 |
| 10 | | 6.0858 | (ASP) | −0.064 | | | | |
| 11 | Stop | Plano | | 0.317 | | | | |
| 12 | Lens 5 | −3.4726 | (ASP) | 0.599 | Plastic | 1.566 | 37.4 | −6.25 |
| 13 | | −200.0000 | (ASP) | 0.046 | | | | |
| 14 | Lens 6 | 3.1830 | (ASP) | 1.127 | Plastic | 1.544 | 56.0 | 2.33 |
| 15 | | −1.8503 | (ASP) | 0.396 | | | | |
| 16 | Lens 7 | −110.8579 | (ASP) | 0.563 | Plastic | 1.534 | 55.9 | −2.60 |
| 17 | | 1.4080 | (ASP) | 1.000 | | | | |
| 18 | Filter | Plano | | 0.210 | Glass | 1.517 | 64.2 | — |
| 19 | | Plano | | 0.192 | | | | |
| 20 | Image | Plano | | — | | | | |

Note:
Reference wavelength is 587.6 nm (d-line).
An effective radius of the stop 1001 (Surface 6) is 1.390 mm.
An effective radius of the stop 1002 (Surface 11) is 1.940 mm.

TABLE 20

Aspheric Coefficients

| Surface # | 1 | 2 | 4 | 5 | 7 |
|---|---|---|---|---|---|
| k= | 0.00000E+00 | 0.00000E+00 | 1.72636E+00 | 1.07566E+01 | −9.80000E+01 |
| A4= | −9.69300076E−03 | −1.82157644E−02 | −3.58299196E−03 | −4.22601688E−02 | 3.89693357E−04 |
| A6= | 8.95739951E−04 | −1.05047867E−03 | −4.74317193E−04 | −9.44101057E−03 | 2.32872354E−02 |
| A8= | −6.33457737E−03 | 2.18078607E−02 | −7.77153246E−03 | 1.96395088E−02 | −9.78798831E−02 |
| A10= | 4.76190317E−03 | −3.34161238E−02 | 9.44616589E−03 | −2.00192725E−02 | 1.74210708E−01 |
| A12= | −2.27855931E−03 | 2.95573908E−02 | −1.45147275E−03 | 1.47028221E−02 | −2.01642425E−01 |
| A14= | 5.54449257E−04 | −1.31134210E−02 | −1.97268192E−03 | −6.94774006E−03 | 1.51989008E−01 |
| A16= | −2.86433247E−05 | 2.43269775E−03 | 7.71827099E−04 | 1.37798039E−03 | −7.18852189E−02 |
| A18= | — | — | — | — | 1.91564125E−02 |
| A20= | — | — | — | — | −2.15679492E−03 |

| Surface # | 8 | 9 | 10 | 12 | 13 |
|---|---|---|---|---|---|
| k= | 8.01996E+00 | −9.31009E+01 | 1.90244E+00 | 0.00000E+00 | 0.00000E+00 |
| A4= | 1.24840391E−02 | 4.06492840E−03 | 2.66635472E−02 | 1.23146435E−01 | 8.69942356E−02 |
| A6= | 9.31899092E−03 | −1.62454524E−01 | −1.78498311E−01 | −1.64789657E−01 | −2.61584567E−01 |
| A8= | −3.96781185E−02 | 2.77331918E−01 | 2.50557286E−01 | 9.88029601E−02 | 2.40671591E−01 |
| A10= | 4.21421062E−02 | −3.12994445E−01 | −2.21135094E−01 | 2.18806034E−02 | −1.43328699E−01 |
| A12= | −3.00361573E−02 | 2.15431522E−01 | 1.27645075E−01 | −6.98955110E−02 | 6.14050356E−02 |
| A14= | 1.39858962E−02 | −8.76407881E−02 | −4.86628803E−02 | 4.52021609E−02 | −1.94488869E−02 |
| A16= | −3.95693438E−03 | 1.90303224E−02 | 1.17750711E−02 | −1.49444039E−02 | 4.43128725E−03 |
| A18= | 5.20916360E−04 | −1.66159195E−03 | −1.61968642E−03 | 2.76931525E−03 | −6.69467051E−04 |
| A20= | — | — | 9.55291003E−05 | −2.73175487E−04 | 5.85634723E−05 |
| A22= | — | — | — | 1.11498096E−05 | −2.21185735E−06 |

| Surface # | 14 | 15 | 16 | 17 |
|---|---|---|---|---|
| k= | 0.00000E+00 | −1.14036E+01 | 0.00000E+00 | −3.24186E+00 |
| A4= | 5.57370332E−02 | −6.55118264E−02 | −2.53699318E−02 | −7.32642700E−02 |
| A6= | −1.59371628E−01 | 1.40809240E−01 | −4.20012910E−02 | 2.83697247E−02 |
| A8= | 1.78815264E−01 | −1.21535771E−01 | 3.81897927E−02 | −7.32017031E−03 |
| A10= | −1.40384553E−01 | 6.72581191E−02 | −1.78224334E−02 | 1.21252015E−03 |
| A12= | 8.18975783E−02 | −2.52333740E−02 | 5.51227518E−03 | −1.14711122E−04 |
| A14= | −3.55354798E−02 | 6.56038022E−03 | −1.15899936E−03 | 2.75093534E−06 |
| A16= | 1.13227668E−02 | −1.20022407E−03 | 1.66897238E−04 | 7.29154389E−07 |
| A18= | −2.61450745E−03 | 1.55482867E−04 | −1.65711831E−05 | −1.02806470E−07 |
| A20= | 4.29541900E−04 | −1.41795825E−05 | 1.13257678E−06 | 6.69254273E−09 |
| A22= | −4.86858237E−05 | 8.90146386E−07 | −5.23306781E−08 | −2.45782081E−10 |
| A24= | 3.60298874E−06 | −3.66110519E−08 | 1.56131408E−09 | 4.90199387E−12 |
| A26= | −1.56136854E−07 | 8.87948764E−10 | −2.71404224E−11 | −4.14093842E−14 |
| A28= | 2.99664445E−09 | −9.62429576E−12 | 2.08619109E−13 | — |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 4.89 | TD/EPD | 2.11 |
| Fno | 1.85 | TL/f | 1.43 |
| HFOV [deg.] | 46.2 | |R4/R3| | 0.76 |
| (V1 + V2 + V6 + V7)/ (V3 + V4 + V5) | 2.79 | f/CT6 | 4.34 |
| V3 + V4 + V5 | 80.4 | |f/f4| | 0.02 |
| (V3 + V4 + V5)/V6 | 1.44 | f/R1 | 1.59 |
| (V3 + V4 + V5)/(V6 + V7) | 0.72 | f/|R11| + f/|R12| | 4.18 |
| CT1/CT5 | 0.93 | f2/f6 | 3.36 |
| CT1/T12 | 1.76 | f6/CT6 | 2.07 |
| (CT1 + CT2)/T12 | 3.59 | ImgH/f | 1.07 |
| (CT3 + CT4)/T34 | 1.07 | Y11/Y72 | 0.36 |

-continued

| 10th Embodiment | | | |
|---|---|---|---|
| CT6/T67 | 2.85 | Yc61/Y61 | 0.69 |
| T12/T67 | 0.81 | Yc72/Y72 | 0.56 |
| T34/T45 | 2.09 | — | — |

11th Embodiment

Figure 21:
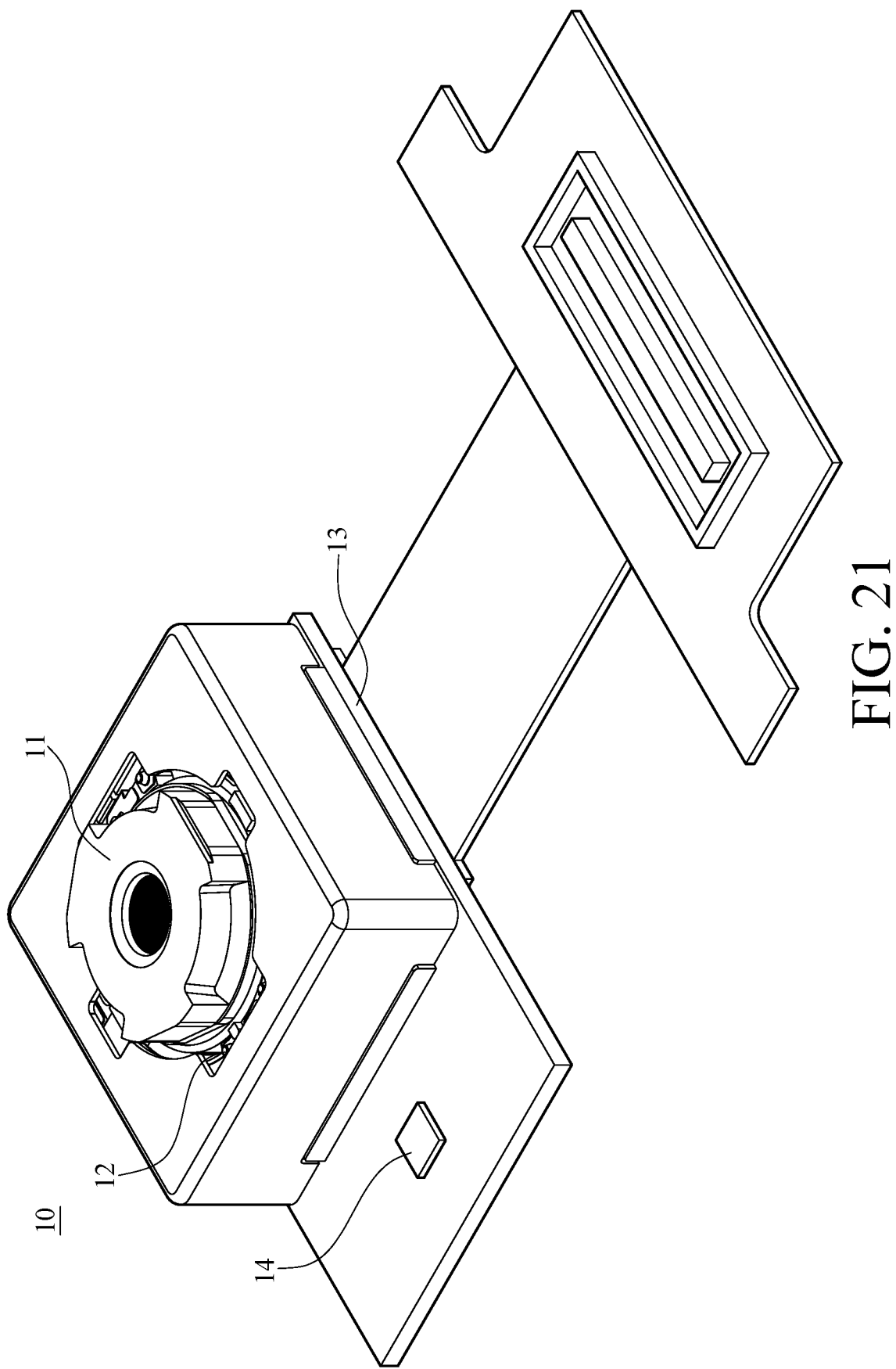
FIG. 21 is a perspective view of an image capturing unit according to the 11th embodiment of the present disclosure.

FIG. 21 is a perspective view of an image capturing unit according to the 11th embodiment of the present disclosure. In this embodiment, an image capturing unit 10 is a camera module including a lens unit 11, a driving device 12, an image sensor 13 and an image stabilizer 14. The lens unit 11 includes the imaging lens assembly disclosed in the 1st embodiment, a barrel and a holder member (their reference numerals are omitted) for holding the imaging lens assembly. However, the lens unit 11 may alternatively be provided with the imaging lens assembly disclosed in other above-mentioned embodiments, and the present disclosure is not limited thereto. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the imaging lens assembly to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

12th Embodiment

Figure 22:
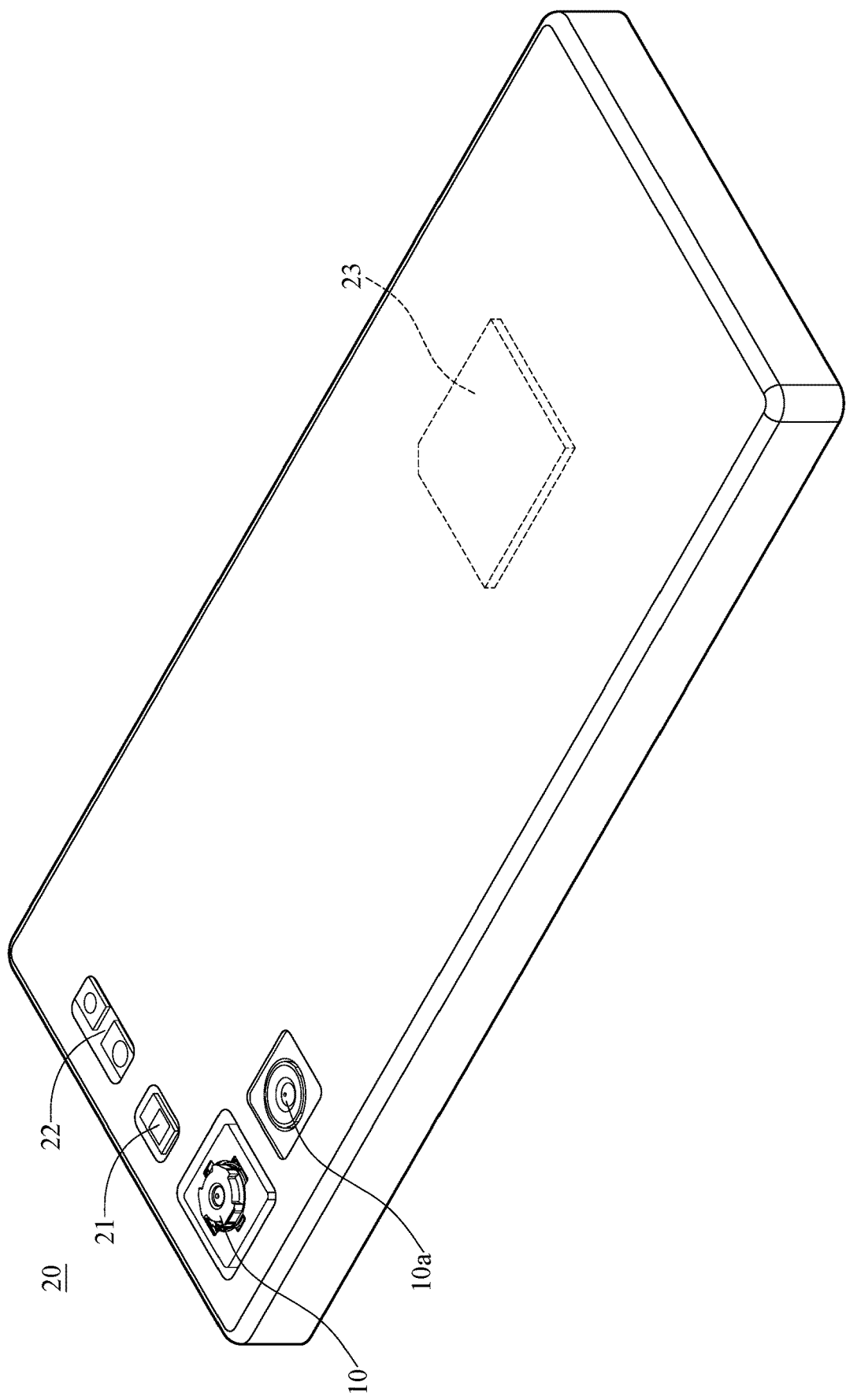
FIG. 22 is one perspective view of an electronic device according to the 12th embodiment of the present disclosure.
Figure 23:
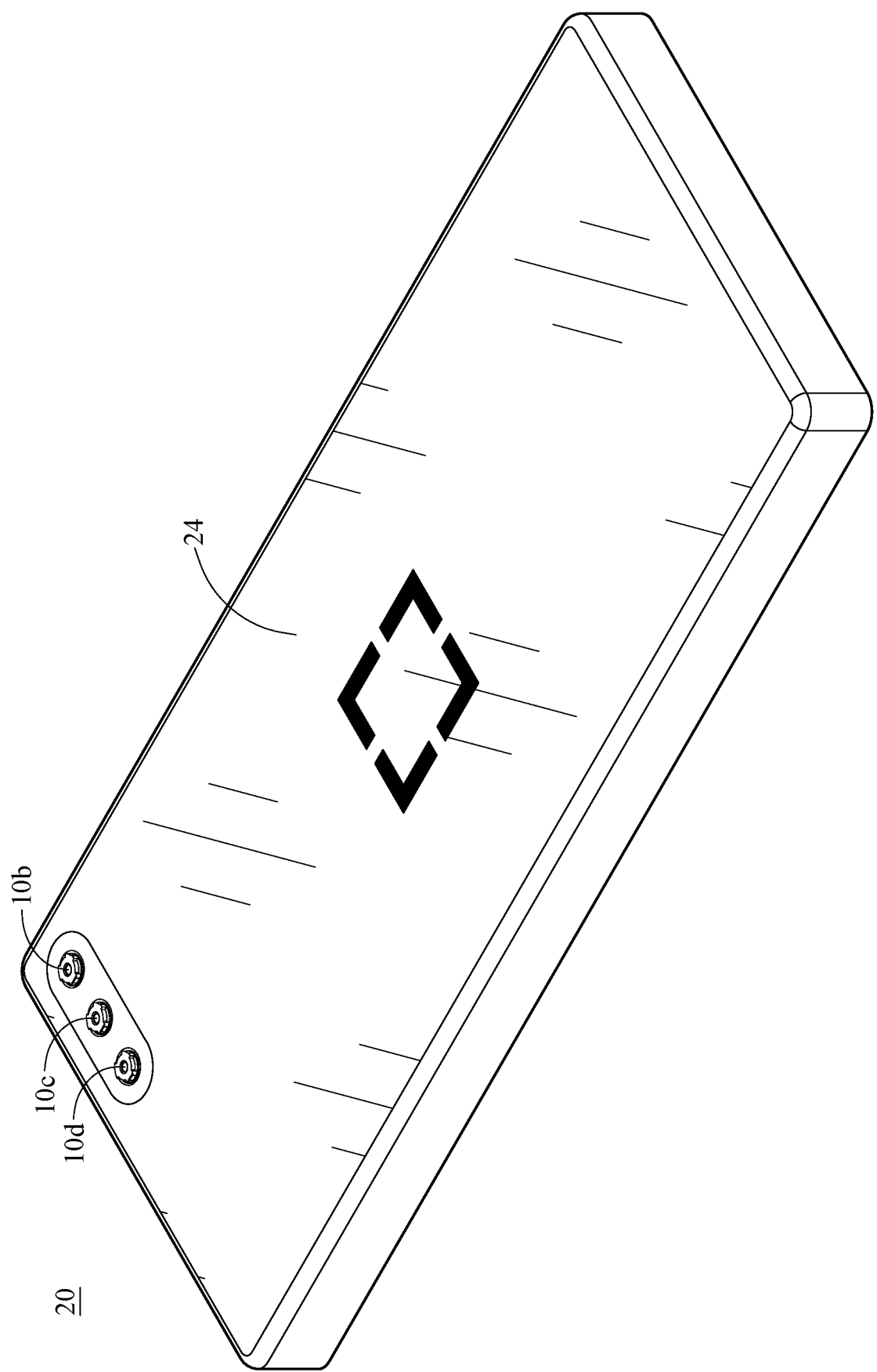
FIG. 23 is another perspective view of the electronic device in FIG. 22.
Figure 24:
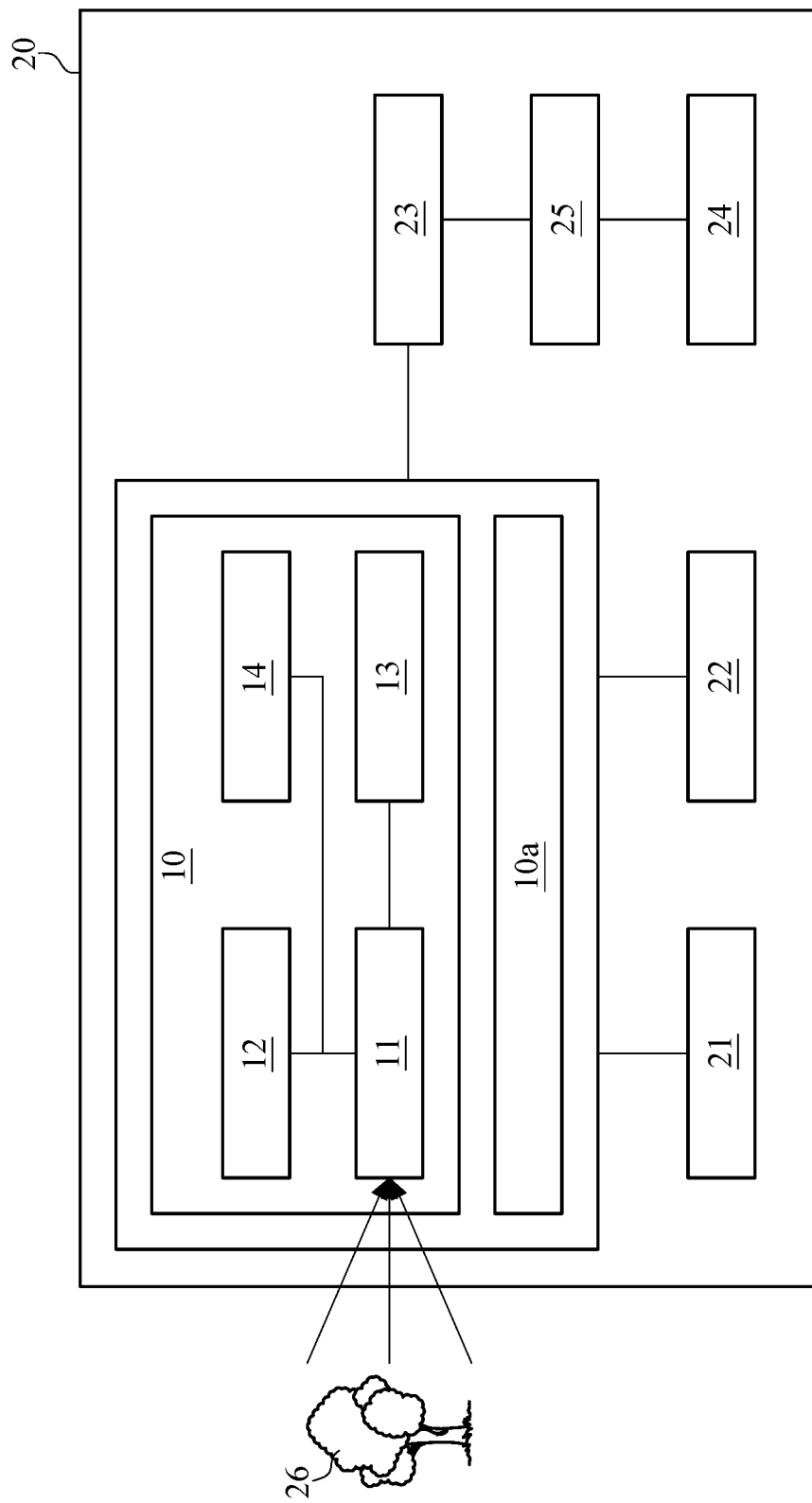
FIG. 24 is a block diagram of the electronic device in FIG. 22.

FIG. 22 is one perspective view of an electronic device according to the 12th embodiment of the present disclosure. FIG. 23 is another perspective view of the electronic device in FIG. 22. FIG. 24 is a block diagram of the electronic device in FIG. 22.

In this embodiment, an electronic device 20 is a smartphone including the image capturing unit 10 disclosed in the 11th embodiment, an image capturing unit 10a, an image capturing unit 10b, an image capturing unit 10c, an image capturing unit 10d, a flash module 21, a focus assist module 22, an image signal processor 23, a user interface 24 and an image software processor 25. The image capturing unit 10 and the image capturing unit 10a are disposed on the same side of the electronic device 20 and each of the image capturing units 10 and 10a has a single focal point. The image capturing unit 10b, the image capturing unit 10c, the image capturing unit 10d and the user interface 24 are disposed on the opposite side of the electronic device 20 and the user interface 24 is a display unit, such that the image capturing units 10b, 10c, 10d can be front-facing cameras of the electronic device 20 for taking selfies, but the present disclosure is not limited thereto. Furthermore, each of the image capturing units 10a, 10b, 10c and 10d can include the imaging lens assembly of the present disclosure and can have a configuration similar to that of the image capturing unit 10. In detail, each of the image capturing units 10a, 10b, 10c and 10d can include a lens unit, a driving device, an image sensor and an image stabilizer, and each of the lens unit can include an optical lens assembly such as the imaging lens assembly of the present disclosure, a barrel and a holder member for holding the optical lens assembly.

The image capturing unit 10 is a wide-angle image capturing unit, the image capturing unit 10a is an ultra-wide-angle image capturing unit, the image capturing unit 10b is a wide-angle image capturing unit, the image capturing unit 10c is an ultra-wide-angle image capturing unit, and the image capturing unit 10d is a ToF (time of flight) image capturing unit, such that the electronic device 20 can have various magnification ratios so as to meet the requirement of optical zoom functionality. In addition, the image capturing unit 10d can determine depth information of the imaged object. In this embodiment, the electronic device 20 includes multiple image capturing units 10, 10a, 10b, 10c and 10d, but the present disclosure is not limited to the number and arrangement of image capturing units.

When a user captures images of an object 26, the light rays converge in the image capturing unit 10 or the image capturing unit 10a to generate an image(s), and the flash module 21 is activated for light supplement. The focus assist module 22 detects the object distance of the imaged object 26 to achieve fast auto focusing. The image signal processor 23 is configured to optimize the captured image to improve image quality. The light beam emitted from the focus assist module 22 can be either conventional infrared or laser. In addition, the light rays may converge in the image capturing unit 10b, 10c or 10d to generate an image(s). The user interface 24 can be a touch screen or a physical button. The user is able to interact with the user interface 24 and the image software processor 25 having multiple functions to capture images and complete image processing. The image processed by the image software processor 25 can be displayed on the user interface 24.

13th Embodiment

Figure 25:
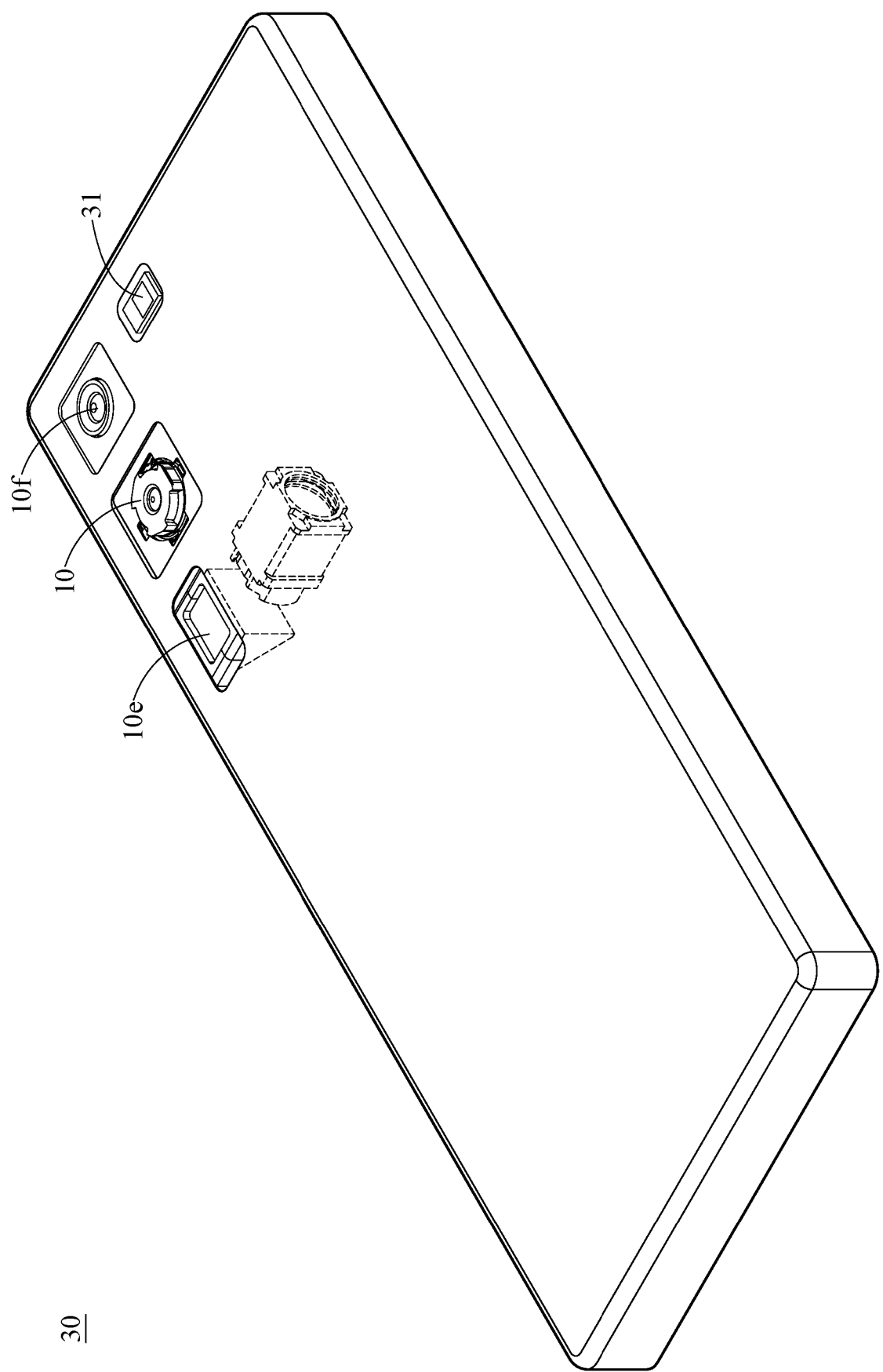
FIG. 25 is one perspective view of an electronic device according to the 13th embodiment of the present disclosure.

FIG. 25 is one perspective view of an electronic device according to the 13th embodiment of the present disclosure.

In this embodiment, an electronic device 30 is a smartphone including the image capturing unit 10 disclosed in the 11th embodiment, an image capturing unit 10e, an image capturing unit 10f, a flash module 31, a focus assist module, an image signal processor, a display unit and an image software processor (not shown). The image capturing unit 10, the image capturing unit 10e and the image capturing unit 10f are disposed on the same side of the electronic device 30, while the display unit is disposed on the opposite side of the electronic device 30. Furthermore, each of the image capturing units 10e and 10f can include the imaging lens assembly of the present disclosure and can have a configuration similar to that of the image capturing unit 10, so the details in this regard will not be provided again.

The image capturing unit 10 is a wide-angle image capturing unit, the image capturing unit 10e is a telephoto image capturing unit, and the image capturing unit 10f is an ultra-wide-angle image capturing unit. In this embodiment, the image capturing units 10, 10e and 10f have different fields of view, such that the electronic device 30 can have various magnification ratios so as to meet the requirement of optical zoom functionality. Moreover, the image capturing unit 10e can be a telephoto image capturing unit having a light-folding element configuration, such that the total track length of the image capturing unit 10e is not limited by the thickness of the electronic device 30. Moreover, the light-folding element configuration of the image capturing unit 10e can be similar to, for example, one of the structures shown in FIG. 28 to FIG. 30 which can be referred to foregoing descriptions corresponding to FIG. 28 to FIG. 30 so the details in this regard will not be provided again. In this embodiment, the electronic device 30 includes multiple image capturing units 10, 10e and 10f, but the present disclosure is not limited to the number and arrangement of image capturing units. When a user captures images of an object, light rays converge in the image capturing unit 10, 10e or 10f to generate images, and the flash module 31 is activated for light supplement. Further, the subsequent processes are performed in a manner similar to the abovementioned embodiment, so the details in this regard will not be provided again.

14th Embodiment

Figure 26:
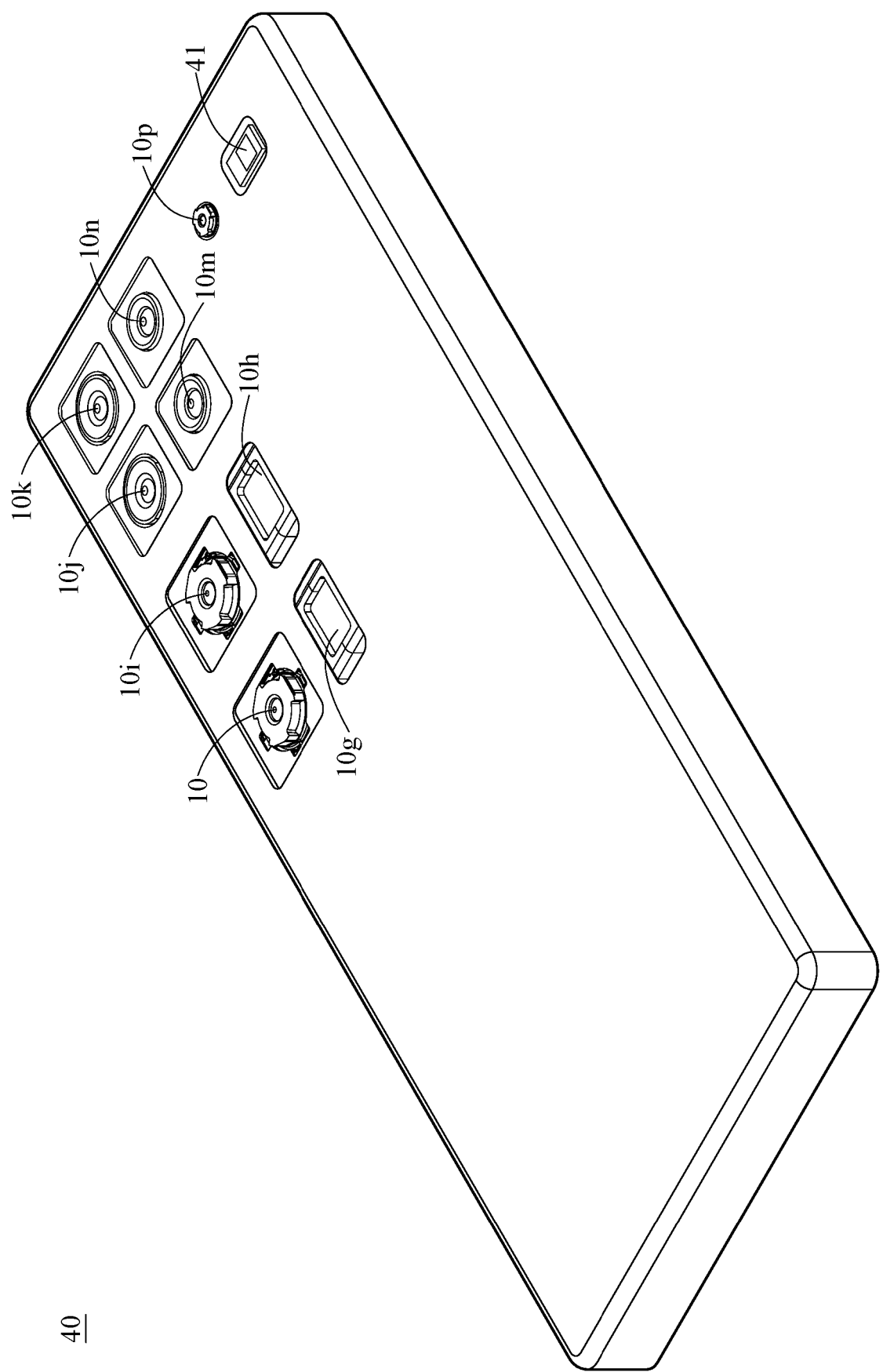
FIG. 26 is one perspective view of an electronic device according to the 14th embodiment of the present disclosure.

FIG. 26 is one perspective view of an electronic device according to the 14th embodiment of the present disclosure.

In this embodiment, an electronic device 40 is a smartphone including the image capturing unit 10 disclosed in the 11th embodiment, an image capturing unit 10g, an image capturing unit 10h, an image capturing unit 10i, an image capturing unit 10j, an image capturing unit 10k, an image capturing unit 10m, an image capturing unit 10n, an image capturing unit 10p, a flash module 41, a focus assist module, an image signal processor, a display unit and an image software processor (not shown). The image capturing unit 10, 10g, 10h, 10i, 10j, 10k, 10m, 10n and 10p are disposed on the same side of the electronic device 40, while the display unit is disposed on the opposite side of the electronic device 40. Furthermore, each of the image capturing units 10g, 10h, 10i, 10j, 10k, 10m, 10n and 10p can include the imaging lens assembly of the present disclosure and can have a configuration similar to that of the image capturing unit 10, so the details in this regard will not be provided again.

The image capturing unit 10 is a wide-angle image capturing unit, the image capturing unit 10g is a telephoto image capturing unit, the image capturing unit 10h is a telephoto image capturing unit, the image capturing unit 10i is a wide-angle image capturing unit, the image capturing unit 10j is an ultra-wide-angle image capturing unit, the image capturing unit 10k is an ultra-wide-angle image capturing unit, the image capturing unit 10m is a telephoto image capturing unit, the image capturing unit 10n is a telephoto image capturing unit, and the image capturing unit 10p is a ToF image capturing unit. In this embodiment, the image capturing units 10, 10g, 10h, 10i, 10j, 10k, 10m and 10n have different fields of view, such that the electronic device 40 can have various magnification ratios so as to meet the requirement of optical zoom functionality. Moreover, each of the image capturing units 10g and 10h can be a telephoto image capturing unit having a light-folding element configuration. Moreover, the light-folding element configuration of each of the image capturing unit 10g and 10h can be similar to, for example, one of the structures shown in FIG. 28 to FIG. 30 which can be referred to foregoing descriptions corresponding to FIG. 28 to FIG. 30 so the details in this regard will not be provided again. In addition, the image capturing unit 10p can determine depth information of the imaged object. In this embodiment, the electronic device 40 includes multiple image capturing units 10, 10g, 10h, 10i, 10j, 10k, 10m, 10n and 10p, but the present disclosure is not limited to the number and arrangement of image capturing units. When a user captures images of an object, the light rays converge in the image capturing unit 10, 10g, 10h, 10i, 10j, 10k, 10m, 10n or 10p to generate an image(s), and the flash module 41 is activated for light supplement. Further, the subsequent processes are performed in a manner similar to the abovementioned embodiments, so the details in this regard will not be provided again.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the imaging lens assembly of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly comprising seven lens elements, the seven lens elements being, in order from an object side to an image side along an optical path, a first lens element, a second lens element, a third lens element, a fourth lens element, a fifth lens element, a sixth lens element and a seventh lens element, and each of the seven lens elements having an object-side surface facing toward the object side and an image-side surface facing toward the image side;
   wherein the second lens element has positive refractive power, the image-side surface of the second lens element is convex in a paraxial region thereof, the sixth lens element has positive refractive power, the object-side surface of the sixth lens element is convex in a paraxial region thereof, the image-side surface of the sixth lens element is convex in a paraxial region thereof, the seventh lens element has negative refractive power, the image-side surface of the seventh lens element is concave in a paraxial region thereof, and at least one of the object-side surface and the image-side surface of at least one lens element of the imaging lens assembly is aspheric and has at least one inflection point;
   wherein an Abbe number of the third lens element is V3, an Abbe number of the fourth lens element is V4, an Abbe number of the fifth lens element is V5, a central thickness of the first lens element is CT1, a central thickness of the fifth lens element is CT5, and the following conditions are satisfied:

$30.0 < V3+V4+V5 < 90.0$; and $0.10 < CT1/CT5 < 1.5$.

2. The imaging lens assembly of claim 1, wherein the Abbe number of the third lens element is V3, the Abbe number of the fourth lens element is V4, the Abbe number of the fifth lens element is V5, an Abbe number of the sixth lens element is V6, an Abbe number of the seventh lens element is V7, and the following conditions are satisfied:

$45.0 < V3+V4+V5 < 87.0$; and $0.45 < (V3+V4+V5)/(V6+V7) < 0.80$.

3. The imaging lens assembly of claim 1, wherein the central thickness of the first lens element is CT1, the central thickness of the fifth lens element is CT5, an axial distance between the first lens element and the second lens element is T12, and the following conditions are satisfied:

0.60<CT1/CT5<1.3; and 0.55<CT1/T12<2.3.

4. The imaging lens assembly of claim 1, wherein an axial distance between the first lens element and the second lens element is T12, an axial distance between the sixth lens element and the seventh lens element is T67, a maximum effective radius of the object-side surface of the first lens element is Y11, a maximum effective radius of the image-side surface of the seventh lens element is Y72, and the following conditions are satisfied:

0.60<T12/T67<2.2; and 0.20<Y11/Y72<0.50.

5. The imaging lens assembly of claim 1, wherein a curvature radius of the object-side surface of the second lens element is R3, a curvature radius of the image-side surface of the second lens element is R4, and the following condition is satisfied:

|R4/R3|<1.50.

6. The imaging lens assembly of claim 1, wherein the object-side surface of the sixth lens element has at least one critical point in an off-axis region thereof, a focal length of the imaging lens assembly is f, a curvature radius of the object-side surface of the sixth lens element is R11, a curvature radius of the image-side surface of the sixth lens element is R12, a vertical distance between the at least one critical point on the object-side surface of the sixth lens element and an optical axis is Yc61, a maximum effective radius of the object-side surface of the sixth lens element is Y61, and the following conditions are satisfied:

2.0<f/|R11|+f/|R12|<8.0; and 0.50<Yc61/Y61<0.80.

7. The imaging lens assembly of claim 1, wherein a focal length of the sixth lens element is f6, a central thickness of the sixth lens element is CT6, half of a maximum field of view of the imaging lens assembly is HFOV, and the following conditions are satisfied:

1.0<f6/CT6<2.5; and 42.5 [deg.]<HFOV<60.0 [deg.].

8. The imaging lens assembly of claim 1, wherein the object-side surface of the first lens element is convex in a paraxial region thereof, the image-side surface of the third lens element is concave in a paraxial region thereof, the fifth lens element has negative refractive power, and the object-side surface of the fifth lens element is concave in a paraxial region thereof;
wherein a focal length of the imaging lens assembly is f, a curvature radius of the object-side surface of the first lens element is R1, and the following condition is satisfied:

1.20<f/R1<1.85.

9. An imaging lens assembly comprising seven lens elements, the seven lens elements being, in order from an object side to an image side along an optical path, a first lens element, a second lens element, a third lens element, a fourth lens element, a fifth lens element, a sixth lens element and a seventh lens element, and each of the seven lens elements having an object-side surface facing toward the object side and an image-side surface facing toward the image side;
wherein the second lens element has positive refractive power, the image-side surface of the third lens element is concave in a paraxial region thereof, the sixth lens element has positive refractive power, the image-side surface of the sixth lens element is convex in a paraxial region thereof, the seventh lens element has negative refractive power, and at least one of the object-side surface and the image-side surface of at least one lens element of the imaging lens assembly is aspheric and has at least one inflection point;
wherein an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, an Abbe number of the seventh lens element is V7, a central thickness of the first lens element is CT1, a central thickness of the second lens element is CT2, an axial distance between the first lens element and the second lens element is T12, and the following conditions are satisfied:

2.5<(V1+V2+V6+V7)/(V3+V4+V5)<5.0;

30.0<V3+V4+V5<90.0; and 0.20<(CT1+CT2)/T12<6.5.

10. The imaging lens assembly of claim 9, wherein the Abbe number of the third lens element is V3, the Abbe number of the fourth lens element is V4, the Abbe number of the fifth lens element is V5, the Abbe number of the sixth lens element is V6, the central thickness of the first lens element is CT1, the central thickness of the second lens element is CT2, the axial distance between the first lens element and the second lens element is T12, and the following conditions are satisfied:

45.0<V3+V4+V5<87.0;

0.80<(V3+V4+V5)/V6<1.6; and 1.5<(CT1+CT2)/T12<6.0.

11. The imaging lens assembly of claim 9, wherein the axial distance between the first lens element and the second lens element is T12, an axial distance between the sixth lens element and the seventh lens element is T67, and the following condition is satisfied:

0.60<T12/T67<2.2.

12. The imaging lens assembly of claim 9, wherein a focal length of the imaging lens assembly is f, a curvature radius of the object-side surface of the sixth lens element is R11, a curvature radius of the image-side surface of the sixth lens element is R12, and the following condition is satisfied:

2.0<f/|R11|+f/|R12|<8.0.

13. The imaging lens assembly of claim 9, wherein a focal length of the second lens element is f2, a focal length of the sixth lens element is f6, and the following condition is satisfied:

1.7<f2/f6<6.0.

14. The imaging lens assembly of claim 9, wherein a focal length of the sixth lens element is f6, a central thickness of the sixth lens element is CT6, and the following condition is satisfied:

$1.0<f6/CT6<2.5.$

15. The imaging lens assembly of claim 9, wherein the image-side surface of the seventh lens element has at least one critical point in an off-axis region thereof, an axial distance between the object-side surface of the first lens element and the image-side surface of the seventh lens element is TD, an entrance pupil diameter of the imaging lens assembly is EPD, a maximum image height of the imaging lens assembly is ImgH, a focal length of the imaging lens assembly is f, a vertical distance between the at least one critical point on the image-side surface of the seventh lens element and an optical axis is Yc72, a maximum effective radius of the image-side surface of the seventh lens element is Y72, and the following conditions are satisfied:

$1.0<TD/EPD<4.0;$ $0.80<ImgH/f<2.0;$ and $0.40<Yc72/Y72<0.75.$

16. The imaging lens assembly of claim 9, wherein the first lens element has positive refractive power, the image-side surface of the fourth lens element is concave in a paraxial region thereof, and the fifth lens element has negative refractive power.

17. The imaging lens assembly of claim 9, wherein the third lens element has negative refractive power, the object-side surface of the fourth lens element is convex in a paraxial region thereof, and the object-side surface of the fifth lens element is concave in a paraxial region thereof.

18. An image capturing unit, comprising:
the imaging lens assembly of claim 9; and
an image sensor disposed on an image surface of the imaging lens assembly.

19. An electronic device, comprising:
the image capturing unit of claim 18.

20. An imaging lens assembly comprising seven lens elements, the seven lens elements being, in order from an object side to an image side along an optical path, a first lens element, a second lens element, a third lens element, a fourth lens element, a fifth lens element, a sixth lens element and a seventh lens element, and each of the seven lens elements having an object-side surface facing toward the object side and an image-side surface facing toward the image side;
wherein the second lens element has positive refractive power, the image-side surface of the second lens element is convex in a paraxial region thereof, the sixth lens element has positive refractive power, the image-side surface of the sixth lens element is convex in a paraxial region thereof, the seventh lens element has negative refractive power, and at least one of the object-side surface and the image-side surface of at least one lens element of the imaging lens assembly is aspheric and has at least one inflection point;
wherein an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, an Abbe number of the seventh lens element is V7, a focal length of the imaging lens assembly is f, a central thickness of the sixth lens element is CT6, and the following conditions are satisfied:

$2.5<(V1+V2+V6+V7)/(V3+V4+V5)<5.0;$ $30.0<V3+V4+V5<90.0;$ and $0.50<f/CT6<6.3.$

21. The imaging lens assembly of claim 20, wherein the Abbe number of the third lens element is V3, the Abbe number of the fourth lens element is V4, the Abbe number of the fifth lens element is V5, and the following condition is satisfied:

$45.0<V3+V4+V5<87.0.$

22. The imaging lens assembly of claim 20, wherein the focal length of the imaging lens assembly is f, a central thickness of the first lens element is CT1, the central thickness of the sixth lens element is CT6, an axial distance between the first lens element and the second lens element is T12, and the following conditions are satisfied:

$3.1<f/CT6<5.8;$ and $0.55<CT1/T12<2.3.$

23. The imaging lens assembly of claim 20, wherein a central thickness of the third lens element is CT3, a central thickness of the fourth lens element is CT4, an axial distance between the third lens element and the fourth lens element is T34, an axial distance between the fourth lens element and the fifth lens element is T45, the focal length of the imaging lens assembly is f, a focal length of the fourth lens element is f4, and the following conditions are satisfied:

$0.50<(CT3+CT4)/T34<1.6;$ $1.0<T34/T45<3.2;$ and $|f/f4|<0.45.$

24. The imaging lens assembly of claim 20, wherein the central thickness of the sixth lens element is CT6, an axial distance between the sixth lens element and the seventh lens element is T67, and the following condition is satisfied:

$2.0<CT6/T67<8.0.$

25. The imaging lens assembly of claim 20, wherein a focal length of the second lens element is f2, a focal length of the sixth lens element is f6, and the following condition is satisfied:

$1.7<f2/f6<6.0.$

26. The imaging lens assembly of claim 20, wherein at least one of the object-side surface and the image-side surface of at least one lens element of the imaging lens assembly has at least one critical point in an off-axis region thereof;
wherein an f-number of the imaging lens assembly is Fno, an axial distance between the object-side surface of the first lens element and an image surface is TL, the focal length of the imaging lens assembly is f, and the following conditions are satisfied:

$1.0<Fno<2.5;$ and $1.1<TL/f<3.0.$

27. The imaging lens assembly of claim 20, wherein at least one of the object-side surface and the image-side surface of each of at least two lens elements of the imaging lens assembly is aspheric and has at least one inflection point, the first lens element has positive refractive power, and the object-side surface of the fifth lens element is concave in a paraxial region thereof.

28. The imaging lens assembly of claim 20, wherein the object-side surface of the first lens element is convex in a paraxial region thereof, the image-side surface of the fourth lens element is concave in a paraxial region thereof, and the fifth lens element has negative refractive power;

wherein the focal length of the imaging lens assembly is f, a curvature radius of the object-side surface of the first lens element is R1, and the following condition is satisfied:

$1.20 < f/R1 < 1.85$.

29. An image capturing unit, comprising:
the imaging lens assembly of claim 20; and
an image sensor disposed on an image surface of the imaging lens assembly.

30. An electronic device, comprising:
the image capturing unit of claim 29.

* * * * *